US012611966B1

(12) United States Patent
Samiullah et al.

(10) Patent No.: US 12,611,966 B1
(45) Date of Patent: Apr. 28, 2026

(54) METHOD TO CONTROL BATTERY-BACKED HYBRID POWER SYSTEM IN A FUEL CELL ELECTRIC VEHICLE

(71) Applicant: King Fahd University of Petroleum and Minerals, Dhahran (SA)

(72) Inventors: Mohammad Samiullah, Al Khobar (SA); Syed Muhammad Amrr, Dhahran (SA); Ali Taleb A. Al Awami, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/357,274

(22) Filed: Oct. 14, 2025

(51) Int. Cl.
　　*G07C 5/00*　　　(2006.01)
　　*B60L 50/40*　　　(2019.01)
　　　　　(Continued)

(52) U.S. Cl.
　　CPC .............. B60L 58/40 (2019.02); B60L 50/40 (2019.02); B60L 50/75 (2019.02);
　　　　　(Continued)

(58) Field of Classification Search
　　CPC .......... B60L 58/40; B60L 50/40; B60L 50/75; B60L 2210/12; B60L 2210/14; B60L 2240/526; B60L 2260/42
　　See application file for complete search history.

(56) References Cited

U.S. PATENT DOCUMENTS

2021/0336538 A1 *　10/2021　Teirelbar ................. H02J 3/381
2023/0216308 A1　　7/2023　Khan et al.
　　　　　(Continued)

FOREIGN PATENT DOCUMENTS

CN　　117411079 A　　1/2024
CN　　117856196 A　　4/2024

OTHER PUBLICATIONS

Xiaorui et al., "A Hierarchical Energy Control Strategy for Hybrid Electric Vehicle with Fuel Cell/Battery/Ultracapacitor Combining Fuzzy Controller and Status Regulator", Electronics 2023, vol. 12, Issue 16, 3428, Aug. 14, 2023, 18 pages (Year: 2023).*

(Continued)

*Primary Examiner* — Kito R Robinson
*Assistant Examiner* — Anthony Gabriel Mora
(74) *Attorney, Agent, or Firm* — Oblon, McClelland, Maier & Neustadt, L.L.P.

(57)　　　　ABSTRACT

A method and system for controlling a hybrid power system comprising a plurality of energy sources includes obtaining, by at least one processor, a plurality of state variables associated with the hybrid power system, determining a reference value for each of the state variables, and computing an error vector representing a difference between the state variables and the reference values. An integral sliding surface is generated using the error vector, and at least one control input for respective power converters is determined based on the sliding surface and a system model of the hybrid power system to cause the state variables to converge to the reference values within a fixed time independent of initial conditions. The at least one control input is applied as pulse width modulation signals to regulate distribution of energy, thereby maintaining a stable DC bus voltage and ensuring real-time operation.

20 Claims, 33 Drawing Sheets

(51) Int. Cl.

| | |
|---|---|
| *B60L 50/75* | (2019.01) |
| *B60L 58/40* | (2019.01) |
| *G07C 5/02* | (2006.01) |
| *G07C 5/04* | (2006.01) |
| *G07C 5/08* | (2006.01) |

(52) U.S. Cl.
CPC ....... *B60L 2210/12* (2013.01); *B60L 2210/14* (2013.01); *B60L 2240/526* (2013.01); *B60L 2260/42* (2013.01)

(56) References Cited

U.S. PATENT DOCUMENTS

| | | | | |
|---|---|---|---|---|
| 2023/0246578 A1* | 8/2023 | Sun | ....................... | H02P 21/001 |
| | | | | 318/400.34 |
| 2025/0162465 A1* | 5/2025 | Michelotti | .............. | B60L 50/75 |

OTHER PUBLICATIONS

Jun et al., "Research on Power Control of Hybrid Power Supply EV", 2016 IEEE 11th Conference on Industrial Electronics and Applications (ICIEA), 4 pages (Year: 2016).*

Xiaorui Jia et al., "A Hierarchical Energy Control Strategy for Hybrid Electric Vehicle with Fuel Cell/Battery/Ultracapacitor Combining Fuzzy Controller and Status Regulator", Electronics 2023, vol. 12, Issue 16, 3428, Aug. 14, 2023, 18 pages.

\* cited by examiner

400

400

600

600

800

800

900

900

METHOD TO CONTROL BATTERY-BACKED HYBRID POWER SYSTEM IN A FUEL CELL ELECTRIC VEHICLE

STATEMENT REGARDING PRIOR DISCLOSURE BY THE INVENTORS

Aspects of the present disclosure are described in Md. Samiullah, Ali T. Al-Awami, Syed Muhammad Amrr, Mohamed Zaery, Mohammad A. Abido, "Advanced sliding mode control for battery-backed hybrid power system in a fuel cell electric vehicle with a fixed-time convergence" Energy Conversion and Management: X, Volume 27, 2025, 101174, ISSN 2590-1745, doi.org/10.1016/j.ecmx.2025.101174 which is incorporated herein by reference in its entirety.

BACKGROUND

Technical Field

The present disclosure is directed to control of hybrid power systems in fuel cell electric vehicles (FCEVs), and more particularly, to systems and methods configured for regulating energy flow and maintaining stable operation in battery and ultracapacitor-backed fuel cell hybrid architectures.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional gasoline-powered vehicles equipped with internal combustion engines are major contributors to greenhouse gas emissions, releasing significant amounts of carbon dioxide and other pollutants. These emissions are a major driver of climate change, contributing to global warming, deteriorating air quality, and causing environmental and public health concerns such as extreme weather conditions and respiratory diseases. To address these issues, governments and industries worldwide are moving towards sustainable propulsion technologies.

Fuel cell electric vehicles (FCEVs) have emerged as a promising alternative owing to their clean operation and high efficiency. FCEVs utilize proton exchange membrane fuel cells (PEMFCs) that generate electricity by converting hydrogen into electrical energy, producing only water and heat as byproducts. This results in zero tailpipe emissions while enabling efficient energy conversion. FCEVs are being investigated for a wide range of applications including passenger vehicles, buses, heavy trucks, ferries, and drones, underscoring their versatility across sectors.

Despite these advantages, PEMFCs face limitations in handling transient and rapidly fluctuating power demands. Due to their relatively slow dynamic response, PEMFCs alone are unable to adequately support events such as sudden acceleration or regenerative braking. To address these challenges, hybrid power systems have been developed that combine fuel cells with auxiliary energy storage devices such as lithium-ion batteries and ultracapacitors. Batteries provide high energy density, typically between 250 Wh/kg and 350 Wh/kg, making them suitable for sustained power delivery. However, batteries are less efficient at handling sudden power surges. Ultracapacitors, in contrast, offer high power density and rapid charge-discharge capabilities, which makes them ideal for transient load demands, although their overall energy storage capacity is limited. When integrated together, batteries are typically used to handle constant loads such as air conditioning and electronics, while ultracapacitors supply power for transient loads such as acceleration and braking, thereby complementing the slower dynamics of fuel cells.

The integration of multiple heterogeneous energy sources introduces additional complexity. Each energy source has different voltage characteristics and transient dynamics, necessitating the use of power converters to ensure proper operation. Multi-converter configurations are typically required, and coordinated control becomes critical for maintaining DC bus voltage stability, accurate current sharing, and reliable system performance. Advanced energy management strategies are needed to optimize performance, extend component life, and capture regenerative braking energy effectively.

Several control strategies have been proposed in the literature to address these challenges. Approaches such as fuzzy logic, neural networks, and model predictive control have been employed to manage power sharing in hybrid fuel cell systems. Sliding mode control (SMC) has gained particular attention due to its robustness against system uncertainties and disturbances. Variants such as observer-based controllers, first-order SMC with nonlinear barrier functions, and composite SMC schemes incorporating disturbance observers have demonstrated improvements in robustness and transient response. However, conventional SMC methods suffer from drawbacks including dependency on initial conditions for convergence, difficulties in parameter tuning, chattering phenomena that accelerate device wear and induce electromagnetic interference, and lack of guaranteed finite-time convergence. Finite-time sliding mode control (FT-SMC) methods attempt to address convergence but remain limited because settling time still depends on initial system conditions, which is undesirable in dynamic vehicle environments.

Recent prior art further highlights these challenges. CN117411079A describes an integrated energy system and a voltage-stabilizing control method using multiple subsystems such as wind, photovoltaic, fuel cells, and supercapacitors, with sliding mode-based voltage stabilization. While the reference addresses voltage fluctuation and system robustness, it primarily relates to large-scale integrated energy systems and does not resolve convergence independence from initial conditions. CN117856196A discloses a vertical control energy management method for hybrid energy storage using fractional-order sliding mode control, which enables stable current tracking of the fuel cell, supercapacitor, and lithium battery while maintaining DC bus voltage under dynamic conditions. However, fractional-order sliding mode control still inherits complexity in design and lacks guaranteed fixed-time convergence irrespective of initial operating states. US20230216308A1 presents a voltage regulation controller for microgrids incorporating batteries and supercapacitors for load balancing, employing power management strategies to separate high-frequency and low-frequency load components. While effective for microgrid applications, the reference focuses on distributed renewable systems rather than the strict transient demands of FCEVs.

These advancements, though significant, underscore that existing systems still fall short of delivering robust, fixed-time convergence for hybrid fuel cell vehicle applications. In highly dynamic driving conditions, where load requirements vary unpredictably, control approaches that remain dependent on initial states or exhibit chattering cannot ensure optimal stability or efficiency. Accordingly, there exists a need for control methodologies that ensure fixed-time convergence independent of initial conditions, provide stable DC bus regulation, and achieve robust energy management under uncertainties associated with fuel cells, batteries, and ultracapacitors.

SUMMARY

In one exemplary embodiment, a method for controlling a hybrid power system comprising a plurality of energy sources is described. The method comprises obtaining, by at least one processor, a plurality of state variables associated with the hybrid power system, determining a reference value for each of the state variables, computing an error vector comprising a difference between each of the state variables and the corresponding reference value, generating an integral sliding surface using the error vector, determining, based on the integral sliding surface and a system model of the hybrid power system, at least one control input for respective power converters associated with the plurality of energy sources to cause each of the plurality of state variables to converge to the corresponding reference value within a fixed time independent of an initial state of the hybrid power system, and applying the at least one control input to the respective power converters to control distribution of energy from the plurality of energy sources to the hybrid power system.

In another exemplary embodiment, a method for control of a hybrid power system comprising a plurality of energy sources in a fuel cell electric vehicle is described. The plurality of energy sources comprises a fuel cell, a battery and an ultracapacitor, each coupled to a DC bus via a respective power controller. The method comprises obtaining a plurality of state variables associated with the hybrid power system using at least one processor, the plurality of state variables comprising a fuel cell current, a battery current, an ultracapacitor current and a DC bus voltage, determining a reference value for each of the plurality of state variables, computing an error vector comprising a difference between each of the state variables and the corresponding reference value, the error vector comprises a fuel cell current error, a battery current error, an ultracapacitor current error and a DC bus voltage error, generating an integral sliding surface using the error vector, determining, based on the integral sliding surface and a system model of the hybrid power system, at least one control input for each of the respective power converters associated with the plurality of energy sources to cause each of the plurality of state variables to converge to the corresponding reference value within a fixed time independent of an initial state of the hybrid power system, and applying the at least one control input to the respective power converters to independently control a distribution of energy from the plurality of energy sources to the hybrid power system and to maintain a stable DC bus voltage at the reference value.

In another exemplary embodiment, a hybrid power system for a fuel cell electric vehicle is described. The hybrid power system comprises a plurality of energy sources, a plurality of measurement devices configured to measure a plurality of state variables of the plurality of energy sources, and at least one processor. The at least one processor is configured to determine a reference value for each of the state variables, compute an error vector comprising a difference between each of the state variables and the corresponding reference value, generate an integral sliding surface based on the error vector, determine, based on the integral sliding surface and a system model of the hybrid power system, at least one control input for respective power converters associated with the plurality of energy sources to cause each of the plurality of state variables to converge to the corresponding reference value within a fixed time independent of an initial state of the hybrid power system, and apply the at least one control input to the respective power converters to control distribution of energy from the plurality of energy sources to the hybrid power system.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
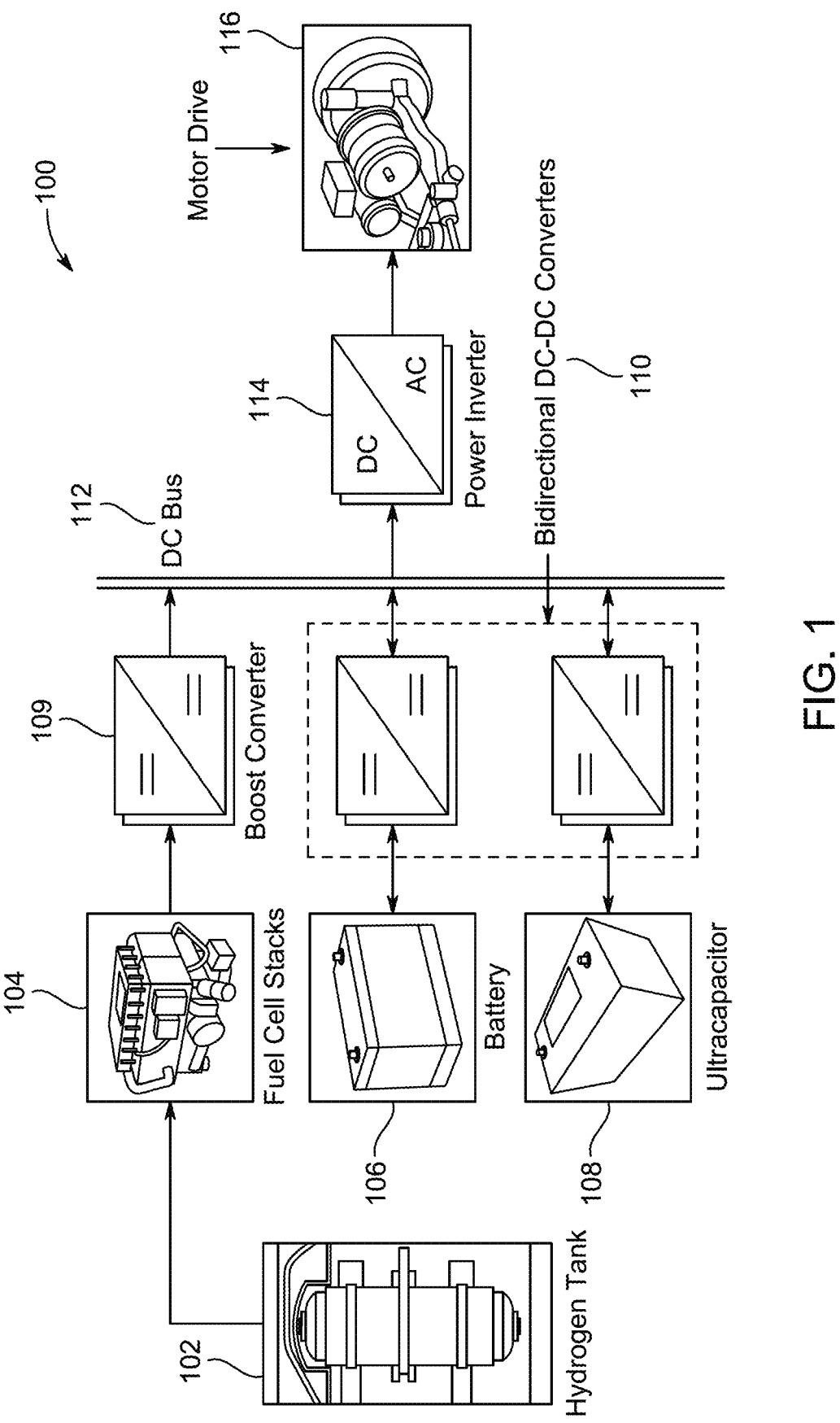
FIG. 1 is a block diagram of a hybrid power system for a fuel cell electric vehicle in accordance with an exemplary aspect of the disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and method for controlling a hybrid power system in a fuel cell electric vehicle. The disclosure addresses the technical challenge of ensuring stable DC bus voltage regulation and reliable energy distribution in the presence of dynamic operating conditions and multiple uncertainties arising from fuel cells, battery, and ultracapacitor sources. The method includes obtaining state variables of the hybrid power system, computing an error vector relative to reference values, and generating an integral sliding surface. A fixed-time control input is determined based on the sliding surface and applied to unidirectional and bidirectional converters through pulse-width modulation signals to ensure convergence of state variables within a fixed time independent of initial conditions. By integrating fuel cell, battery, and ultracapacitor operation through robust control, the disclosed system achieves enhanced stability, rapid convergence, real-time adaptability, and improved efficiency for fuel cell electric vehicles under varying load demands.

FIG. 1 illustrates a hybrid power system 100 configured for a fuel cell electric vehicle. The hybrid power system 100, also referred to as the system 100, is designed to integrate multiple energy sources into a coordinated architecture for vehicular propulsion. The system 100 incorporates a fuel cell stack 104, a rechargeable battery 106, and an ultracapacitor 108, each connected to a common DC bus through appropriate power converters. The configuration of the system 100 addresses the limitations of fuel cells in handling transient power demands by combining the sustained energy delivery capability of the battery with the rapid charge-discharge capability of the ultracapacitor, thereby enabling the fuel cell electric vehicle to meet both constant and transient power requirements.

The system 100 comprises a hydrogen tank 102 configured to store hydrogen fuel under pressurized conditions. A hydrogen tank is a vessel that contains hydrogen either in compressed gaseous form, or in cryogenic liquid form. The hydrogen tank 102 supplies hydrogen to the fuel cell stack 104 through a pressure regulation and distribution system.

The system 100 further comprises the fuel cell stack 104 configured to convert hydrogen into electrical energy through an electrochemical reaction with oxygen. The fuel cell stack 104 is a proton exchange membrane fuel cell (PEMFC), which employs a solid polymer electrolyte that permits proton conduction while being impermeable to gases. The fuel cell stack 104 comprises multiple individual fuel cells connected in series to increase voltage to a useful level. Each individual fuel cell consists of an anode, cathode, and electrolyte membrane. Hydrogen supplied from the hydrogen tank 102 is introduced at the anode, where it is catalytically dissociated into protons and electrons. The protons migrate through the electrolyte membrane, while the electrons are forced through an external circuit, thereby generating electrical current. At the cathode, oxygen from ambient air reacts with the protons and electrons to produce water as the sole by-product. The fuel cell stack 104 is configured to generate direct current electricity continuously as long as hydrogen and oxygen are supplied. In one implementation, the stack voltage ranges from 60 V to 120 V for passenger vehicles, but multiple stacks may be connected to provide higher voltages for heavy-duty applications. The fuel cell stack 104 is characterized by high efficiency in the range of 40 to 60% and zero harmful tailpipe emissions. However, due to inherent electrochemical dynamics, the transient response of the fuel cell stack 104 is relatively slow, limiting its ability to meet rapid variations in load demand.

The output of the fuel cell stack 104 is coupled to a boost converter 109. The boost converter 109 is a unidirectional DC-DC converter configured to elevate the relatively low voltage output of the fuel cell stack 104 to the higher regulated voltage required by the DC bus 112. The boost converter 109 comprises an inductor, a high-frequency switching device, also known as a switch, such as an insulated-gate bipolar transistor (IGBT) or a metal-oxide-semiconductor field-effect transistor (MOSFET), a diode, and a DC-link capacitor. In operation, the inductor stores energy when the switch is closed and releases energy through the diode into the capacitor when the switch is opened, resulting in a step-up in voltage. The output of the boost converter 109 is therefore a regulated DC voltage that is higher than the input voltage from the fuel cell stack 104. For example, a fuel cell producing 80 V may be stepped up to 400 V to supply the DC bus. The boost converter 109 ensures that the fuel cell operates in its optimal power region by controlling its current, while the DC bus 112 receives stable voltage suitable for traction drive.

The system 100 also includes a battery 106 coupled to the DC bus 112 through a bidirectional DC-DC converter 110. The battery 106 is a rechargeable electrochemical storage device, typically implemented using lithium-ion chemistry due to its high energy density, relatively long cycle life, and favorable weight-to-capacity ratio. Lithium-ion batteries exhibit specific energy values ranging from 250 Wh/kg to 350 Wh/kg, enabling them to store large amounts of energy for sustained supply to vehicular loads. The battery 106 provides power to the DC bus 112 during periods of high energy demand and is recharged during regenerative braking events or when excess energy is available from the fuel cell stack 104. Other battery chemistries such as nickel-metal hydride, lithium-iron phosphate, or solid-state batteries may also be employed depending on application requirements. The battery 106 supplies relatively constant power to loads such as lighting, air conditioning, and electronic systems of the vehicle.

The bidirectional DC-DC converter 110 interfacing the battery 106 with the DC bus 112 is a buck-boost converter configured to regulate power flow in both charging and discharging modes. During discharging, the converter 110 increases or decreases the battery voltage to match the DC bus voltage, while during charging, the converter 110 controls current flowing from the DC bus 112 into the battery 106 to manage charging rate and efficiency. The bidirectional nature of the converter 110 allows energy to flow in both directions, ensuring optimal utilization of the battery 106.

The system 100 further comprises an ultracapacitor 108 connected to the DC bus 112 through another bidirectional DC-DC converter 110. The ultracapacitor 108, also referred to as a supercapacitor, is an electrochemical capacitor characterized by extremely high power density and rapid charge-discharge capability. Ultracapacitors are implemented with electric double-layer capacitance and pseudocapacitance mechanisms that allow them to deliver or absorb very large currents over short durations. Although ultracapacitors typically store less total energy than batteries, they excel at providing instantaneous power to meet sudden acceleration demands and at capturing regenerative braking energy. For example, an ultracapacitor may charge and discharge within seconds, making it ideally suited for transient events that batteries alone cannot handle efficiently.

The bidirectional DC-DC converter 110 coupled to the ultracapacitor 108 operates in both charging and discharging modes. During acceleration, the converter 110 boosts the ultracapacitor voltage to the DC bus voltage, injecting power into the system. During regenerative braking, the converter 110 reduces the DC bus voltage to charge the ultracapacitor 108. This capability enhances vehicle efficiency by recycling energy that would otherwise be dissipated as heat.

The DC bus 112 serves as the central power distribution node of the system 100. The DC bus 112 is a regulated voltage rail that combines the contributions of the fuel cell stack 104, the battery 106, and the ultracapacitor 108. A DC-link capacitor is positioned across the DC bus 112 to stabilize voltage by absorbing ripple and transients arising from the switching of converters. In a practical implementation, the DC bus 112 may be maintained at approximately 400V for passenger vehicles or higher for heavy-duty vehicles. The stability of the DC bus 112 is critical because the DC bus 112 directly feeds the power inverter 114.

The power inverter 114 is a DC-AC conversion stage configured to synthesize alternating current waveforms from the regulated DC bus voltage. The power inverter 114 typically employs a three-phase bridge topology composed of IGBTs or MOSFETs controlled by pulse-width modulation. The inverter 114 produces three-phase AC of variable voltage and frequency, suitable for driving an electric traction motor. Control techniques such as field-oriented control or space vector modulation may be implemented to optimize inverter output.

The output of the power inverter 114 is delivered to a motor drive 116. The motor drive 116 comprises an electric traction motor that converts the AC electrical power into mechanical torque for propulsion of the fuel cell electric vehicle. The traction motor may be implemented as an induction motor, a permanent magnet synchronous motor, or a switched reluctance motor, depending on design objectives. For example, permanent magnet motors are commonly used due to their high efficiency and power density, while induction motors offer robustness and cost advantages. The motor drive 116 is operable to produce continuous torque for cruising as well as transient high torque for vehicle acceleration.

Figure 2A:
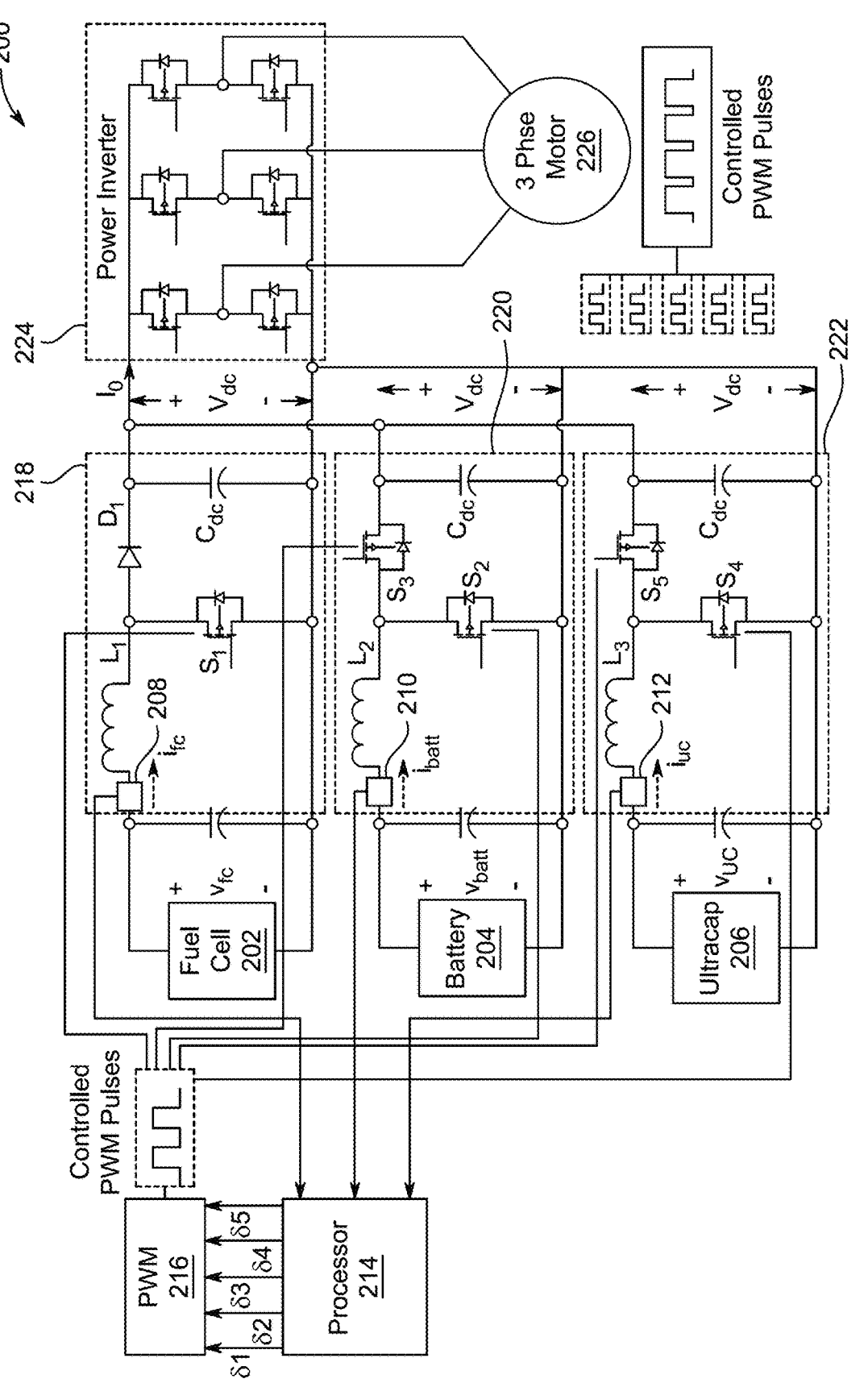
FIG. 2A is a schematic diagram of a control architecture of a hybrid power system with processor-based control in accordance with an exemplary aspect of the disclosure.

FIG. 2A illustrates a control architecture 200 of a hybrid power system for a fuel cell electric vehicle. The control architecture 200 comprises a fuel cell 202, a battery 204, and an ultracapacitor 206, each coupled to a DC bus through respective converter circuits. The control architecture 200 further comprises a measuring device 208, a measuring device 210, and a measuring device 212, a processor 214, and a pulse-width modulation (PWM) unit 216.

The measuring device 208 is configured to sense a fuel cell current and a fuel cell voltage associated with the fuel cell 202. The measuring device 210 is configured to sense a battery current and a battery voltage associated with the battery 204. The measuring device 212 is configured to sense an ultracapacitor current and an ultracapacitor voltage associated with the ultracapacitor 206. In one configuration, the measuring devices 208, 210, and 212 are implemented using Hall-effect sensors for non-intrusive current measurement, or low-resistance precision shunts with differential amplifiers for high-accuracy current sensing. For voltage sensing, resistor divider circuits combined with isolation amplifiers or opto-isolated feedback circuits are utilized. In automotive configurations, the measuring devices 208, 210, and 212 can be integrated into battery management systems or energy control modules to provide high-speed sampled values of current and voltage.

The processor 214 is a computational control unit configured to receive the measurement signals from the measuring devices 208, 210, and 212 and to execute a control sequence. In one example, the processor 214 is a digital signal processor (DSP) configured for real-time numerical computation. In another example, the processor 214 is a field-programmable gate array (FPGA) configured with parallel hardware logic blocks for deterministic execution of control algorithms. In yet another example, the processor 214 is a microcontroller with integrated analog-to-digital converters and PWM generation modules, such as those available in automotive-grade embedded systems. The processor 214 is configured to obtain the measured state variables, determine reference values for each state variable, compute an error vector from the difference between measured and reference values, generate an integral sliding surface based on the error vector, determine control inputs for the converter switches, and transmit the control inputs as duty-cycle command values $\delta1$, $\delta2$, $\delta3$, $\delta4$, and $\delta5$ to the PWM unit 216.

The PWM unit 216 is configured to generate pulse-width modulated switching signals from the duty-cycle commands received from the processor 214. The PWM unit 216 may be implemented as a peripheral block within a microcontroller, a standalone digital PWM controller, or a programmable logic module in an FPGA. The PWM unit 216 compares each duty-cycle value with a high-frequency triangular or sawtooth carrier waveform and generates rectangular switching pulses whose widths are proportional to the commanded duty cycles $\delta1$ to $\delta5$. The PWM unit 216 produces independent output channels that are transmitted to the gate terminals of the converter switches S1, S2, S3, S4, and S5.

The fuel cell 202 is coupled to the DC bus through a unidirectional boost converter 218. The unidirectional boost converter 218 comprises an inductor L1, a high-frequency switching device S1, a diode D1, and a DC-link capacitor $C_{dc}$. The switching device S1 may be an insulated-gate bipolar transistor (IGBT) or a metal-oxide semiconductor field-effect transistor (MOSFET) configured for high-efficiency switching at frequencies ranging from 10 kHz to 50 kHz. The inductor L1 is implemented as a high-current wound copper coil with ferrite or powdered iron core to store magnetic energy. The diode D1 is configured as a fast recovery or silicon carbide (SiC) diode for low switching losses. The DC-link capacitor $C_{dc}$ is configured as a film capacitor or electrolytic capacitor rated for high ripple current. In operation, the inductor L1 stores energy during the on-time of S1 and releases energy through D1 into $C_{dc}$ during the off-time, thereby stepping up the fuel cell voltage to a regulated DC bus voltage.

The battery 204 is coupled to the DC bus through a first bidirectional buck-boost converter 220. The first bidirectional buck-boost converter 220 comprises an inductor L2, a switching device S2, and a switching device S3. The switching devices S2 and S3 may be MOSFETs or IGBTs with body diodes that allow current commutation during bidirectional power flow. The inductor L2 is designed for bidirectional current flow, with low core saturation and high linearity. In a charging mode, the converter 220 directs current from the DC bus to the battery 204 under processor control. In a discharging mode, the converter 220 boosts the battery voltage to match the DC bus voltage. The battery 204 may be a lithium-ion battery with specific energy between 250 Wh/kg and 350 Wh/kg, or alternatively, a nickel-metal hydride, lithium-iron phosphate, or solid-state configuration depending on application.

The ultracapacitor 206 is coupled to the DC bus through a second bidirectional buck-boost converter 222. The second bidirectional buck-boost converter 222 comprises an inductor L3, a switching device S4, and a switching device S5. The switching devices S4 and S5 may be configured as wide-bandgap transistors such as silicon carbide MOSFETs to enable very high transient currents. The inductor L3 is designed with low resistance and minimal inductance value to allow fast current rise times. The ultracapacitor 206 is configured as an electric double-layer capacitor (EDLC) or hybrid ultracapacitor module, characterized by high capacitance and rapid charge-discharge cycles. During acceleration, the converter 222 injects power into the DC bus by boosting the ultracapacitor voltage. During regenerative braking, the converter 222 reduces the DC bus voltage to recharge the ultracapacitor 206.

The DC bus is configured as a regulated distribution rail that interconnects the outputs of the converters 218, 220, and 222. The DC-link capacitor $C_{dc}$ suppresses switching ripple and stabilizes the DC bus voltage. In a representative configuration, the DC bus voltage is regulated at approximately 400V for passenger vehicles and up to 750V for heavy-duty electric vehicles.

The DC bus is connected to a power inverter 224. The power inverter 224 is configured as a three-phase bridge inverter with six semiconductor switches controlled by modulation techniques such as space-vector modulation or field-oriented control. The power inverter 224 converts the regulated DC bus voltage into a three-phase alternating current output with variable frequency and amplitude. The switches of the power inverter 224 may be implemented as IGBTs for high-voltage operation or as silicon carbide MOSFETs for high-frequency, high-efficiency conversion.

The alternating current output of the power inverter 224 is provided to a traction motor 226. The motor 226 is configured as a three-phase electric machine, which may be a permanent magnet synchronous motor, an induction motor, or a switched reluctance motor. The motor 226 converts the three-phase alternating current into mechanical torque. For example, a permanent magnet synchronous motor provides high efficiency and power density, whereas an induction motor offers robustness and cost advantages. The motor 226 produces continuous torque for various applications, such as cruising and transient torque for acceleration and hill climbing.

Using the system described in FIG. 2A, in one embodiment, a method for controlling a hybrid power system is implemented. The method comprising a plurality of energy sources is described. The method comprises obtaining, by processor 214, a plurality of state variables associated with the hybrid power system through measuring devices 208, 210, and 212, the state variables including currents and voltages of fuel cell 202, battery 204, and ultracapacitor 206. Reference values are determined for each of the state variables, and processor 214 computes an error vector representing the difference between each of the measured state variables and the corresponding reference values. Based on this error vector, processor 214 generates an integral sliding surface, which is then used along with the hybrid power system model to determine at least one control input for respective power converters 218, 220, and 222. The control input is supplied as controlled pulse-width modulation signals from PWM block 216 to switches S1-S5 of the converters, thereby controlling the distribution of energy from fuel cell 202, battery 204, and ultracapacitor 206 to DC bus and ensuring convergence of the state variables to their reference values within a fixed time independent of initial system conditions.

In a second embodiment, a method for control of a hybrid power system comprising a plurality of energy sources in a fuel cell electric vehicle is described. The plurality of energy sources includes fuel cell 202, battery 204, and ultracapacitor 206, each coupled to a DC bus through a respective converter 218, 220, and 222. Processor 214 obtains a plurality of state variables comprising a fuel cell current, a battery current, an ultracapacitor current, and a DC bus voltage using measuring devices 208, 210, and 212. Reference values are determined for each of these state variables, and processor 214 computes an error vector comprising a fuel cell current error, a battery current error, an ultracapacitor current error, and a DC bus voltage error. The error vector is used to generate an integral sliding surface, and based on the generated surface and a model of the hybrid power system, processor 214 determines at least one control input for each of the converters 218, 220, and 222. Controlled PWM pulses generated by PWM block 216 are applied to switches S1-S5 of the converters 218, 220, and 222, thereby independently regulating the distribution of energy from fuel cell 202, battery 204, and ultracapacitor 206 to maintain a stable DC bus voltage while causing all state variables to converge to their reference values within a fixed time.

Figure 2B:
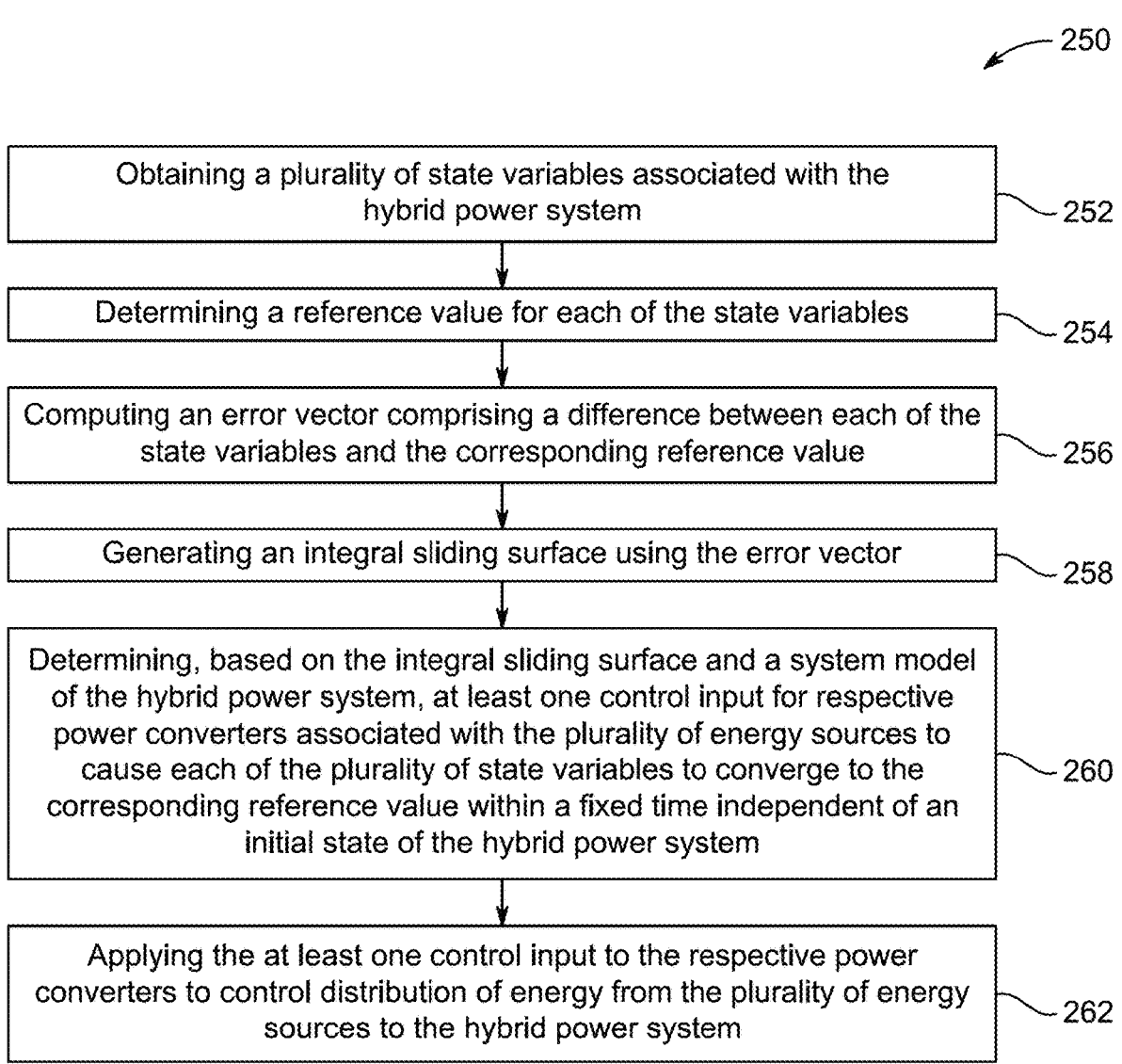
FIG. 2B is a flow chart illustrating a method for controlling a hybrid power system comprising a plurality of energy sources, according to certain embodiments.

FIG. 2B is a flow chart illustrating a method 250 for controlling a hybrid power system comprising a plurality of energy sources, according to certain embodiments. The method 250 is executed by at least one processor operatively coupled with the control architecture 200 of the hybrid power system of FIG. 2A.

At step 252, the method includes obtaining a plurality of state variables associated with the hybrid power system. In certain embodiments, the state variables comprise a fuel cell current, a battery current, an ultracapacitor current, and a DC bus voltage, each measured or estimated by corresponding sensors and communicated to the processor for evaluation.

At step 254, the method includes determining a reference value for each of the state variables. The reference values are selected based on the operating conditions of the hybrid power system and the load requirements of the fuel cell electric vehicle.

At step 256, the method includes computing an error vector comprising a difference between each of the state variables and the corresponding reference value. In certain embodiments, the error vector comprises a fuel cell current error, a battery current error, an ultracapacitor current error, and a DC bus voltage error.

At step 258, the method includes generating an integral sliding surface using the error vector. The integral sliding surface is formulated as a linear combination of the error vector and an integral of a nonlinear function of the error vector, thereby ensuring robust control under system uncertainties.

At step 260, the method includes determining, based on the integral sliding surface and a system model of the hybrid power system, at least one control input for respective power converters associated with the plurality of energy sources. The at least one control input is determined such that each of the plurality of state variables converges to the corresponding reference value within a fixed time independent of an initial state of the hybrid power system. In certain embodiments, the system model accounts for the dynamics of the fuel cell, the unidirectional boost converter, and the bidirectional converters associated with the battery and ultracapacitor.

At step 262, the method includes applying the at least one control input to the respective power converters to control distribution of energy from the plurality of energy sources to the hybrid power system. In certain embodiments, the control inputs comprise pulse-width modulation (PWM) duty cycle signals applied to the converters, thereby regulating the energy contribution of the fuel cell, the battery, and the ultracapacitor to maintain a stable DC bus voltage and balanced current distribution.

Figure 3:
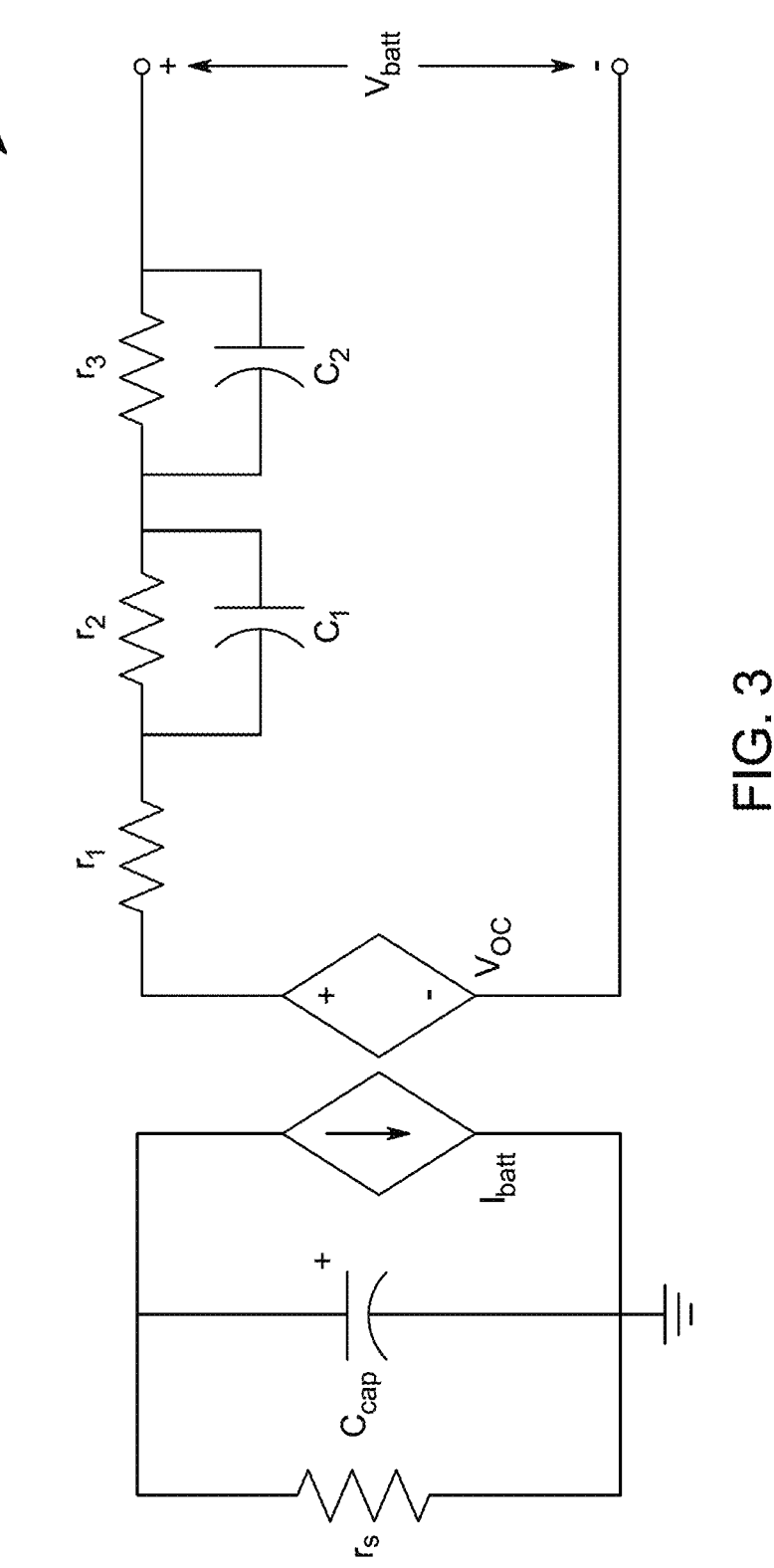
FIG. 3 is an equivalent circuit diagram of a dynamic battery model in accordance with an exemplary aspect of the disclosure.

FIG. 3 illustrates a dynamic battery model 300 configured to represent the electrical behavior of a rechargeable battery within a hybrid power system of a fuel cell electric vehicle. The dynamic battery model 300 provides a comprehensive representation of both steady-state and transient performance characteristics of a battery, enabling accurate control, energy management, and prediction of battery response under varying operational conditions.

The dynamic battery model 300 comprises a series of electrical elements arranged to emulate capacity, state of charge, runtime, and transient response of the battery. On the left-hand side of the model, the dynamic battery model 300 includes a series resistance $r_s$ connected in parallel with a capacitor $C_{cap}$. The series resistance $r_s$ represents the internal resistance of the battery that accounts for resistive voltage drops and energy losses occurring within battery electrodes, current collectors, and interconnections. The capacitor $C_{cap}$ represents the total charge storage capability of the battery, also referred to as the effective battery capacity. The capacitor $C_{cap}$ models the energy storage function of the battery and directly corresponds to the amount of charge that the battery can hold for sustained energy supply.

The dynamic battery model 300 further includes a current-controlled current source $I_{batt}$ arranged in parallel with the capacitor $C_{cap}$. The current-controlled current source $I_{batt}$ is defined by the load conditions of the battery and reflects the instantaneous charge or discharge current drawn from the battery terminals. The combination of the capacitor $C_{cap}$ and the current-controlled current source $I_{batt}$ models the charge balance within the battery and forms the basis for calculation of the state of charge (SOC). The SOC of the battery is expressed mathematically as:

$$SOC(t) = SOC_0 - \frac{1}{C_{Cap}} \int_{t_0}^{t} I_{Batt}(\tau) d\tau \tag{1}$$

where SOC(t) represents the state of charge at time t, $SOC_0$ is the initial state of charge, $I_{batt}(\tau)$ is the instantaneous battery current at time $\tau$, $C_{cap}$ is the total charge capacity of the battery, and $t_0$ is the initial time. The SOC quantifies the remaining usable charge in the battery relative to its maximum capacity and is a key parameter for energy management in fuel cell electric vehicles.

The dynamic battery model 300 includes a voltage-controlled voltage source Voc. The voltage-controlled voltage source Voc generates an open-circuit voltage that is dependent on the state of charge of the battery. The open-circuit voltage Voc is modeled as a nonlinear function of SOC and reflects the thermodynamic potential of the battery under no-load conditions. In practical battery systems, the voltage-controlled voltage source Voc may be characterized experimentally by measuring open-circuit voltages across a range of SOC values.

The voltage-controlled voltage source Voc is connected in series with resistive-capacitive (RC) networks that simulate the transient response of the battery. The dynamic battery model 300 includes a resistance $r_1$ in series with the voltage source Voc. Downstream, two RC pairs are connected to model electrochemical polarization and diffusion effects. A resistance $r_2$ connected in parallel with a capacitor $C_1$ forms a first RC network, and a resistance $r_s$ connected in parallel with a capacitor $C_2$ forms a second RC network. The RC networks represent polarization and diffusion effects within the battery and thereby enable the model to simulate transient responses in addition to steady-state behavior. The use of multiple RC pairs allows the model to approximate both short-term and medium-term dynamics that arise during battery operation under changing load conditions. The values of $r_2$, $r_3$, $C_1$, and $C_2$ are parameters of the model that depend on the characteristics of the particular battery being represented and these values may vary depending on operating conditions such as load or state of charge.

The parameters of the dynamic battery model 300, including $r_s$, $r_1$, $r_2$, $r_3$, $C_{cap}$, $C_1$, and $C_2$, are determined through experimental identification techniques such as pulse current testing or electrochemical impedance spectroscopy. The RC network parameters $r_2$, $r_3$, $C_1$, and $C_2$ remain relatively constant for state of charge levels above approximately 20% but decrease exponentially for lower state of charge levels due to nonlinear electrochemical phenomena within the electrodes. The dynamic battery model 300 thereby captures both the steady-state voltage response through Voc and the transient voltage response through the RC networks.

Figure 4A:
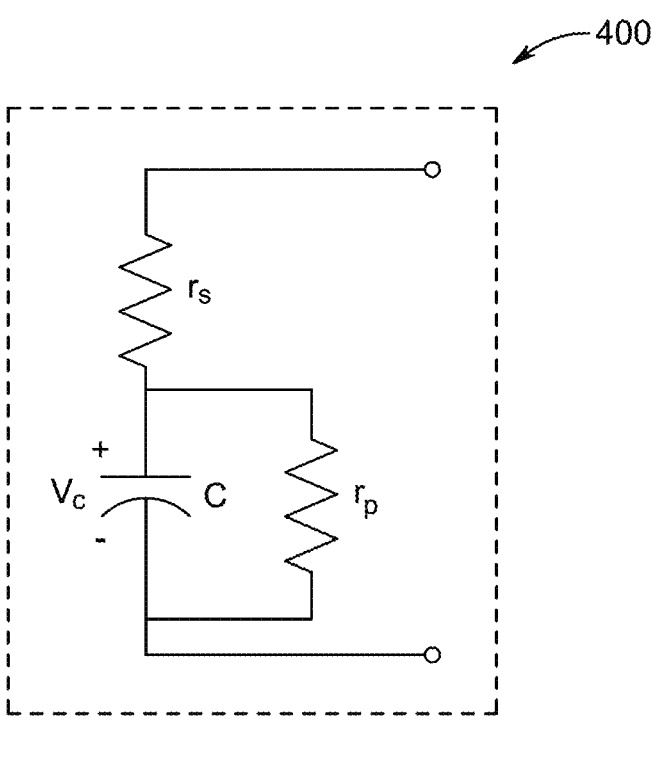
FIG. 4A is an equivalent circuit diagram of an ultracapacitor model in accordance with an exemplary aspect of the disclosure.

FIG. 4A illustrates an equivalent ultracapacitor model 402 configured to represent the dynamic electrical behavior of an ultracapacitor cell. The equivalent ultracapacitor model 402 comprises a series resistance $r_s$, a capacitance C, and a parallel resistance $r_p$. The series resistance $r_s$ models the internal resistance of the ultracapacitor cell and accounts for instantaneous voltage drops occurring when current flows through the device. The capacitance C models the electric double-layer storage characteristic of the ultracapacitor, representing its ability to store large amounts of charge and release it rapidly during discharge. The parallel resistance $r_p$ models leakage losses within the ultracapacitor cell, reflecting the tendency of the stored charge to dissipate over time.

The configuration of the equivalent ultracapacitor model 402 is such that the series resistance $r_s$ is connected in line with a parallel branch comprising the capacitance C and the resistance $r_p$. This configuration allows the ultracapacitor terminal voltage $V_t$ to be expressed as a function of current, time, capacitance, and leakage resistance. The terminal voltage $V_t$ of the ultracapacitor is given by:

$$V_t = I \cdot r_s + \left[ V_{c0} - \int_0^t \frac{I}{C} e^{t/(r_p \cdot C)} dt \right] e^{-(t/(r_p \cdot C))} \tag{2}$$

where $V_{c0}$ is the initial capacitor voltage at t=0. This expression models both the instantaneous voltage drops across the internal resistance $r_s$ and the exponential decay associated with leakage resistance $r_p$ and capacitance C. In practice, the parameters $r_s$, $r_p$, and C are determined experimentally through charge-discharge cycle testing or electrochemical impedance spectroscopy. The ultracapacitor model 402 therefore provides an accurate representation of both steady-state and transient voltage responses of ultracapacitors used in fuel cell electric vehicle hybrid power systems.

Figure 4B:
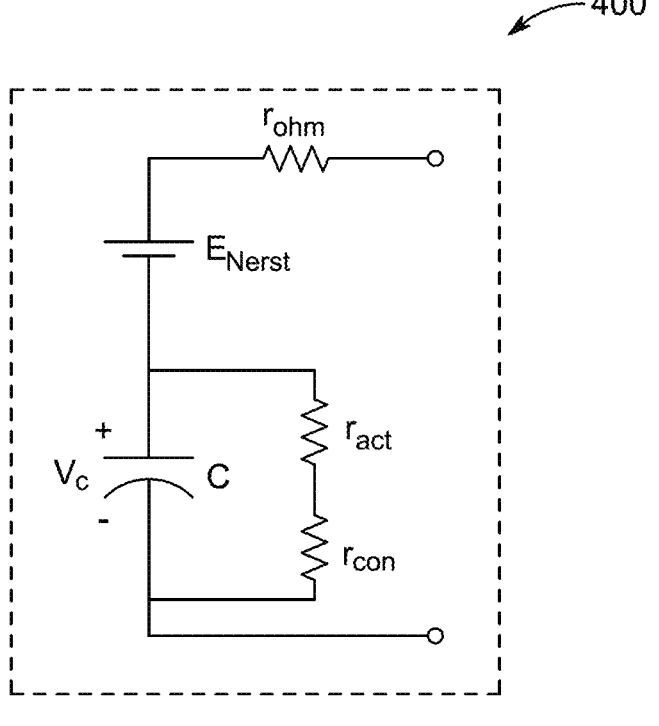
FIG. 4B is an equivalent circuit diagram of a fuel cell model in accordance with an exemplary aspect of the disclosure.

FIG. 4B illustrates an equivalent fuel cell model 404 configured to represent the electrical behavior of a proton exchange membrane fuel cell. The equivalent fuel cell model 404 comprises an open-circuit voltage source $E_{Nernst}$, a series resistance $r_{ohm}$, and a parallel network including a capacitance C, an activation resistance $r_{act}$, and a concentration resistance $r_{con}$. The voltage source $E_{Nernst}$ represents the thermodynamic potential of the fuel cell, calculated based on the Nernst equation, which accounts for standard electromotive force, temperature, and concentration gradients of reactants and products.

The series resistance $r_{ohm}$ in the equivalent fuel cell model 404 represents ohmic resistance associated with current conduction through the electrolyte membrane and electrode materials, accounting for voltage losses due to intrinsic material resistivity. The activation resistance $r_{act}$ models the activation polarization losses caused by energy barriers during electrochemical reactions at the electrode interfaces. The concentration resistance $r_{con}$ represents the mass transport losses that occur due to limitations in reactant diffusion and product removal at higher current densities. The capacitance C represents the double-layer capacitance that arises at the electrode-electrolyte interface, capturing the dynamic charging and discharging characteristics associated with ion accumulation.

The terminal cell voltage Vcell of the equivalent fuel cell model 404 is given by:

$$V_{cell} = E_{Nernst} - I \cdot (r_{act} + r_{con} + r_{ohm}); \tag{3}$$

where I denotes the current drawn from the fuel cell.

Here, $V_{cell}$ denotes the cell voltage, $E_{Nernst}$ signifies the Nernst voltage characterizing the thermodynamic potential of the cell. The Nernst equation provides a means to calculate the Nernst voltage ($E_{Nernst}$) for a fuel cell under non-standard conditions and is defined as:

$$E_{Nernst} = E_{cell}^0 - \frac{RT}{nF} \ln(Q); \tag{4}$$

where $$E_{cell}^0$$

represents the standard electromotive force of the cell, R is the universal gas constant, T is the absolute temperature in Kelvin, n is the number of moles of electrons transferred per reaction, F is Faraday's constant, and Q is the reaction quotient.

The model therefore captures the combined effects of thermodynamic voltage potential, ohmic resistance, activation losses, and concentration losses. In practical configurations, the parameters $r_{act}$, $r_{con}$, and $r_{ohm}$ are determined by empirical testing and depend on electrode material, operating temperature, pressure, and membrane thickness.

The equivalent ultracapacitor model 402 and the equivalent fuel cell model 404 together provide accurate dynamic representations of two critical components of a hybrid power system for a fuel cell electric vehicle. The ultracapacitor model 402 is used for predicting rapid transient responses and leakage characteristics, while the fuel cell model 404 is used for simulating steady-state voltage and polarization losses under various loading conditions. Both models are fundamental for system-level analysis, energy management strategies, and robust control design in hybrid fuel cell-battery-ultracapacitor architectures.

In accordance with the present embodiment, DC-DC converters are modelled and coupled to the respective energy sources.

The connection of the fuel cell to the vehicle powertrain is realized through a unidirectional boost converter. The unidirectional boost converter comprises a semiconductor switching device such as a MOSFET or an insulated-gate bipolar transistor (IGBT), a diode, an inductor, and a filter capacitor configured for energy storage. The voltage and current of the unidirectional boost converter are regulated by pulse width modulation (PWM) control signals with a duty cycle $\delta 1$. The average dynamic model of the unidirectional boost converter is expressed as:

$$\frac{di_{fc}}{dt} = -(1 - \delta_1)\frac{V_{dc}}{L_1} - \frac{R_1}{L_1}i_{fc} + \frac{v_{fc}}{L_1} \tag{5}$$

$$\frac{dv_{dc}}{dt} = (1 - \delta_1)\frac{i_{fc}}{C_{dc}} - \frac{1}{C_{dc}}\frac{di_{fc}}{dt} \tag{6}$$

where $i_{fc}$, $v_{fc}$ are the fuel cell current and voltage at the input of the converter and $V_{dc}$ is the dc link voltage at the output of the unidirectional boost converter.

The battery and ultracapacitor are interfaced to the DC bus voltage through bidirectional converters of a buck-boost topology. Each bidirectional converter comprises an inductor, a capacitor, and a pair of high-frequency switching devices. The switching devices are controlled by PWM signals, wherein the battery-connected converter operates with duty cycles $\delta 2$ and $\delta 3$, and the ultracapacitor-connected converter operates with duty cycles $\delta 4$ and $\delta 5$. The duty cycles are adjusted dynamically by additional control inputs to meet the charging and discharging requirements of the battery and ultracapacitor. The dynamic model of the battery is represented as:

$$\frac{di_{bat}}{dt} = -\delta_{23}\frac{V_{dc}}{L_2} - \frac{R_2}{L_2}i_{bat} + \frac{v_{bat}}{L_2} \tag{7}$$

Similar to the UC model which is given as:

$$\frac{di_{uc}}{dt} = -\delta_{45}\frac{V_{dc}}{L_3} - \frac{R_2}{L_3}i_{uc} + \frac{v_{uc}}{L_3} \tag{8}$$

The variables $\delta_{23}$ and $\delta_{45}$ are given as:

$$\delta_{23} = K(1-\delta_2) + (1-K)\delta_3, \delta_{45} = K(1-\delta_4) + (1-K)\delta_5 \tag{9}$$

where value of K is based on charging and discharging mode. For discharging mode K=1, otherwise it is zero.

The effective design and analysis of the hybrid power system within the powertrain of a fuel cell electric vehicle requires a comprehensive dynamic model. The overall hybrid power system model captures the interactions among the fuel cell, the battery, and the ultracapacitor, and characterizes their response to various driving conditions and load demands. The mathematical formulations describe the dynamic behavior and performance of the hybrid power system, enabling precise control and optimization of energy distribution and utilization.

$$\dot{z}_1 = -\frac{R_1}{L_1}Z_1 + \frac{1}{L_1}(v_{fc} + \Delta v_{fc}) - \frac{1 - u_1}{L_1}Z_4 \tag{10a}$$

-continued $$\dot{z}_2 = -\frac{R_2}{L_2}z_2 + \frac{1}{L_2}(v_{bat} + \Delta v_{bat}) - \frac{u_{23}}{L_2}z_4 \tag{10b}$$

$$\dot{z}_3 = -\frac{R_3}{L_3}z_3 + \frac{1}{L_3}(v_{uc} + \Delta v_{uc}) - \frac{u_{45}}{L_3}z_4 \tag{10c}$$

$$\dot{z}_4 = \frac{1-u_1}{C}z_1 + \frac{u_{23}}{C}z_2 + \frac{u_{45}}{C}z_3 - \frac{1}{C}i_o \tag{10d}$$

The state variables are represented by $z_1$, $z_2$, $z_3$, and $z_4$, denoting the fuel cell current, battery current, ultracapacitor current, and DC bus voltage, respectively. Similarly, the control inputs are $u_1$, $u_{23}$, and $u_{45}$, corresponding to the duty cycles of PWM signals controlling the switches. The average values of fuel cell current, battery current, ultracapacitor current, and DC bus voltage are denoted by $\langle i_{fc}\rangle$, $\langle i_{bat}\rangle$, $\langle i_{sc}\rangle$, and $\langle v_{dc}\rangle$, while $\langle u_1\rangle$, $\langle u_{23}\rangle$, and $\langle u_{45}\rangle$ represent the control inputs such that;

$$[z_1z_2z_3z_4]^T = [\langle i_{fc}\rangle \langle i_{bat}\rangle \langle i_{sc}\rangle \langle V_{dc}\rangle]^T \tag{20}$$

and $$[u_1u_{23}u_{45}]^T = [\langle \delta_1\rangle \langle \delta_{23}\rangle \langle \delta_{45}\rangle]^T \tag{11}$$

Suppose $z_{1\ ref}$ is the reference value of fuel cell current $i_{fc}$, $z_{2\ ref}$ is the reference value of $i_{bat}$, $z_{3\ ref}$ is the reference value of $i_{uc}$ and $z_4$ ref being the reference value of $v_{fc\text{-}ref}$. Moreover, the relationship between $Z_{1\ ref}$ and $Z_{4\ ref}$ is given as:

$$z_{1ref} = \sigma\left(\frac{z_{4ref}I_o - v_{sc}i_{sc} - v_{bat}i_{bat}}{v_{fc}}\right) \tag{12}$$

where $\sigma$ is the idealilty factor of the boost converter. The relation in (12) reveals that if $Z_1$ reaches the $Z_{1\ ref}$, the variable $Z_4$ also approaches to its reference value $Z_{4\ ref}$ i.e., the DC bus voltage error $\varepsilon_4 = Z_4 - Z_{4\ ref}$ will converge to zero.

Considering errors in the fuel cell current ($\varepsilon_1$), battery current ($\varepsilon_2$), and UC current ($\varepsilon_3$) as:

$$\varepsilon_1 = z_1 - z_{1ref} \in \mathbb{R}, \varepsilon_2 = z_2 - z_{2ref} \in \mathbb{R}, \text{ and } \varepsilon_3 = z_3 - z_{3ref} \in \mathbb{R} \tag{13}$$

The time derivative of error variables (13) can be obtained using the system dynamic equations (10) as:

$$\dot{\varepsilon}_1 = -\frac{R_1}{L_1}z_1 + \frac{1}{L_1}(v_{fc} + \Delta v_{fc}) - \frac{u_1}{L_1}z_4 - \dot{z}_{1ref} \tag{14a}$$

$$\dot{\varepsilon}_2 = -\frac{R_2}{L_2}z_2 + \frac{1}{L_2}(v_{bat} + \Delta v_{bat}) - \frac{u_{23}}{L_2}z_4 - \dot{z}_{2ref} \tag{14b}$$

$$\dot{\varepsilon}_3 = -\frac{R_3}{L_3}z_3 + \frac{1}{L_3}(v_{sc} + \Delta v_{sc}) - \frac{u_{45}}{L_3}z_4 - \dot{z}_{3ref} \tag{14c}$$

The above error dynamics (14) can also be represented in matrix form as:

$$\dot{\varepsilon} = \mathcal{A}\,Z - \mathcal{B}\,U + \Phi + \mathcal{D} - \dot{z}_{ref} \tag{15}$$

where $\varepsilon = [\varepsilon_1\ \varepsilon_2\ \varepsilon_3]^T \in \mathbb{R}^3$, $Z = [Z_1Z_2Z_3]^T \in \mathbb{R}^3$, $U = [\bar{u}_1\ \bar{u}_{23}\ \bar{u}_{45}]^T \in \mathbb{R}^3$, $\bar{u}_1 = 1 - u_1 \in \mathbb{R}$, $\dot{z}_{ref} = [\dot{z}_{1\ ref}\dot{z}_{2\ ref}\dot{z}_{3\ ref}]^T \in \mathbb{R}^3$, $\Phi = [v_{fc}/L_1 v_{bat}/L_2 v_{sc}/L_3]^T \in \mathbb{R}^3$, $\mathcal{D} = [\Delta v_{fc}/L_1 \Delta v_{bat}/L_2 \Delta v_{sc}/L_3]^T \in \mathbb{R}^3$, $$\mathcal{A} = \begin{bmatrix} -\dfrac{R_1}{L_1} & 0 & 0 \\ 0 & -\dfrac{R_2}{L_2} & 0 \\ 0 & 0 & -\dfrac{R_3}{L} \end{bmatrix} \in \mathbb{R}^{3\times3}, \tag{16}$$

$$\mathcal{B} = \begin{bmatrix} \dfrac{Z_4}{L_1} & 0 & 0 \\ 0 & \dfrac{Z_4}{L_2} & 0 \\ 0 & 0 & \dfrac{Z_4}{L_3} \end{bmatrix} \in \mathbb{R}^{3\times3}$$

Assumption 1: The uncertainty $\mathcal{D}$ is assumed to be bounded, such that $\|\mathcal{D}\| \le \bar{D}$, and $\bar{D}$ is a positive constant.

Assumption 2: All the state variables $Z \in \mathbb{R}^4$ are available for the feedback controller design. Moreover, the de bus voltage $Z_4$ is nonsingular.

Remark 1: In view of Assumption 2, the diagonal input matrix $\mathcal{B}$ will always have non-zero positive entries. Therefore, the inverse of matrix $\mathcal{B}$ will always exist.

The objective of the present disclosure is to construct a robust control scheme with faster convergence characteristics to regulate a common DC bus voltage in a hybrid power system subjected to multiple uncertainties. The proposed controller is directed to enhancing the reliability and performance of the hybrid power system in a fuel cell electric vehicle, ensuring consistent voltage regulation even under dynamic variations and uncertain operating conditions.

In this regard, an integral sliding mode controller with a fixed-time convergence design is developed to ensure robustness from the initial operating instant. The fixed-time convergence concept guarantees that the system states reach their respective reference values within a fixed time independent of the initial condition. Mathematically, this is expressed as:

$$\lim_{t \to t_{fx}} \varepsilon_1 = 0; \ \lim_{t \to t_{fx}} \varepsilon_2 = 0; \ \lim_{t \to t_{fx}} \varepsilon_3 = 0; \ \lim_{t \to t_{fx}} \varepsilon_4 = 0$$

where $t_{fx}$ represents the fixed time.

The design and analysis of the proposed Lyapunov-based controller for DC bus voltage regulation in a hybrid power system for fuel cell electric vehicles is described in detail below. The description begins with an overview of the controller architecture and functionality, highlighting the role of the Lyapunov function in achieving robust voltage regulation. The description then sets forth the necessary preliminaries, including key concepts, system modeling, and relevant assumptions, to provide a foundation for understanding the control strategy. Finally, a stability analysis using Lyapunov's direct method is presented to establish that the DC bus voltage remains stable, thereby demonstrating the effectiveness of the proposed controller under multiple uncertainty conditions.

Figure 5:
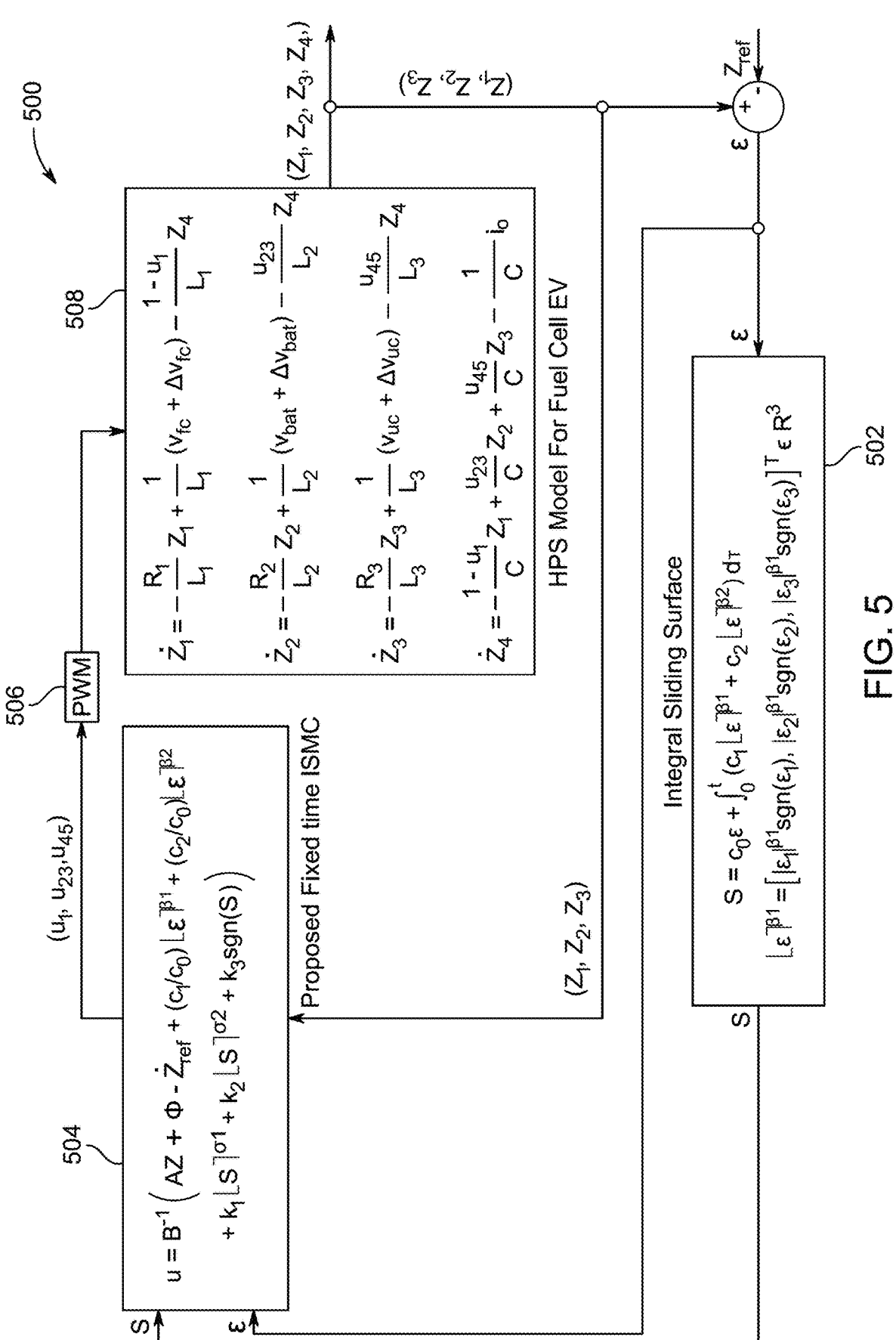
FIG. 5 is a block diagram of a fixed-time integral sliding mode controller strategy in accordance with an exemplary aspect of the disclosure.

FIG. 5 illustrates a block diagram 500 of a proposed fixed-time integral sliding mode control (ISMC) strategy for a hybrid power system (HPS) model of a fuel cell electric vehicle (FCEV). The architecture is configured to regulate a DC bus voltage of the HPS while ensuring robust control of the fuel cell current, battery current, and ultracapacitor current against input and system uncertainties.

The figure shows an integral sliding surface block 502 configured to generate a sliding surface variable(S) using an error vector ($\varepsilon$). The error vector ($\varepsilon$) comprises differences between state variables of the system, such as a fuel cell current, a battery current, and an ultracapacitor current, and their respective reference values.

The proposed sliding surface $\mathcal{S} = [\mathcal{S}_1 \, \mathcal{S}_2 \, \mathcal{S}_3]^T \in \mathbb{R}^3$ (17), is defined as $$S = c_0\varepsilon + \int_0^\tau \left( c_1 |\varepsilon|^{\beta_1} + c_2 |\varepsilon|^{\beta_2} \right) d\tau \tag{18}$$

where ($\mathcal{S}$) is the integral sliding surface, $C_0$, $C_1$, $C_2$ are positive constants and a value of $\beta_1$ is between 0 and 1 and $\beta_2$ is between 1 and 2, and where $c_0 > 0$, $c_1 > 0$, and $c_2 > 0$ are the scalar constants, and function $\lfloor \varepsilon \rfloor^{\beta_1}$ is defined as:

$$|\varepsilon|^{\beta_1} = [|\varepsilon_1|^{\beta_1} \mathrm{sgn}(\varepsilon_1), |\varepsilon_2|^{\beta_1} \mathrm{sgn}(\varepsilon_2), |\varepsilon_3|^{\beta_1} \mathrm{sgn}(\varepsilon_3)]^T \in \mathbb{R}^3 \tag{19}$$

and $\mathrm{sgn}(\varepsilon)$ is the standard signum function.

The derivative of $\mathcal{S}$ with respect to time is expressed as:

$$\dot{\mathcal{S}} = c_0 \dot{\varepsilon} + c_1 \lfloor \varepsilon \rfloor^{\beta_1} + c_2 \lfloor \varepsilon \rfloor^{\beta_2} \tag{20}$$

$$\dot{\mathcal{S}} = c_0 (\mathcal{A}_z - \mathcal{B}\,\mathcal{U} + \mathcal{D} + \Phi - \dot{z}_{ref}) + c_1 \lfloor \varepsilon \rfloor^{\beta_1} + c_2 \lfloor \varepsilon \rfloor^{\beta_2} \tag{21}$$

The proposed fixed-time ISMC block 504 receives the sliding surface variable(S), the state variables ($Z_1$, $Z_2$, $Z_3$), and the error vector ($\varepsilon$), and determines at least one control input (U) for each of the respective power converters by computing the at least one control input using an inverse dynamics technique with Lyapunov stability analysis to cause convergence of the plurality of state variables to the respective reference values within the fixed time. The control input (U) is computed according to:

$$\mathcal{U} = \mathcal{B}^{-1}(\mathcal{A}_Z + \Phi - \dot{Z}_{ref} + (c_1/c_0) \lfloor \varepsilon \rfloor^{\beta_1} + (c_2/c_0) \lfloor \varepsilon \rfloor^{\beta_2} + k_1 \lfloor \mathcal{S} \rfloor^{\sigma_1} + k_2 \lfloor \mathcal{S} \rfloor^{\sigma_2} + k_3 \, \mathrm{sgn}(\mathcal{S})); \tag{22}$$

where AZ, $\Phi$, and $\dot{z}$ref denote system model parameters, $k_1$, $k_2$, and $k_3$ are positive controller gains, $\sigma_1$ is between 0 and 1, $\sigma_2$ is between 1 and 2, and $B^{-1}$ represents an invertible diagonal input matrix associated with the converters. This structure ensures that the sliding manifold S and the error vector $\varepsilon$ converge to zero within a fixed time independent of the initial state.

The control input (U), which corresponds to duty cycles ($u_1$, $u_{23}$, $u_{45}$), is transmitted to the PWM block 506. The PWM block 506 generates controlled pulse-width modulation signals that govern the switching operations of the respective power converters. The duty cycle $\delta_1$ is applied to the unidirectional boost converter interfacing the fuel cell, $\delta_2$ and $\delta_3$ determine $\delta_{23}$ for the bidirectional converter interfacing the battery, and $\delta_4$ and $\delta_5$ determine $\delta_{45}$ for the bidirectional converter interfacing the ultracapacitor.

The HPS model block 508 represents the averaged dynamic equations of the fuel cell, the battery, the ultracapacitor, and the DC bus. These dynamics are expressed as shown in Eq. (10) where $z_1$, $z_2$, and $z_3$ denote the fuel cell current, the battery current, and the ultracapacitor current, respectively, and ZA denotes the DC bus voltage. The values $\Delta v_{fc}$, $\Delta V_{bat}$, and $\Delta v_{uc}$ account for uncertainties in the input voltages.

The outputs of the HPS model block 508, represented as state variables ($Z_1$, $z_2$, $z_3$, $Z_4$), are fed back to both the integral sliding surface block 502 and the proposed fixed-time ISMC block 504, forming a closed-loop structure. The reference values $Z_{ref}$ for the fuel cell current, battery current, ultracapacitor current, and DC bus voltage are also provided as inputs to ensure accurate current tracking and bus voltage regulation.

The mathematical foundation for the implementation of the proposed control strategy illustrated in FIG. 5 is described as below.

The following lemmas are used to prove stability.

Lemma 1. If $v_1, v_2, \ldots, v_n \geq 0$, $a \in (0,1]$, and $b > 1$, then the following pair of properties are valid.

$$\mathrm{i)} \; \sum_{i=1}^n v_i^a \geq \left( \sum_{i=1}^n v_i \right)^a ; \; \mathrm{ii)} \; \sum_{i=1}^n v_i^b \geq n^{1-b} \left( \sum_{i=1}^n v_i \right)^b \tag{23}$$

Lemma 2. [34], [41] Consider a nonlinear continuous system with state variable $\upsilon(t) \in \mathbb{R}^n$ and $\upsilon(0) = \upsilon_0$:

$$\dot{\upsilon}(t) = f(\upsilon(t)); \text{ and } f(0) = 0 \tag{24}$$

Suppose a Lyapunov function exists $V: \mathbb{R}^n \to \mathbb{R}^+$ such that:

$$\dot{V}(\upsilon) \leq -c_1 V^a(\upsilon) - c_2 V^b(\upsilon), \tag{25}$$

where $c_1 > 0$, $c_2 > 0$, and $0 < b < 1 < a$, then the state $\upsilon(t)$ will converge to zero within fixed time, and the origin will be called a fixed time stable point. The maximum time of convergence for the state $\upsilon(t)$ will be bounded by:

$$T = T_{max} \leq \frac{1}{c_1(a-1)} + \frac{1}{c_2(1-b)} \tag{26}$$

In one aspect, stability analysis is performed to evaluate the stability of the model. In Theorem 1, the error dynamics expressed in equation (15) for the hybrid power system model under Assumption 1 and Assumption 2 are considered. With the application of the proposed fixed-time integral sliding mode control strategy defined in equation (22), the sliding surface is forced to converge to zero within a fixed time. Following this, the error trajectories also converge to the origin within another fixed time. Accordingly, the state variables track the desired reference values within a fixed time that is independent of the initial condition.

The proof is structured in two stages. In the first stage, it is demonstrated that the sliding manifold S converges to zero within a fixed time, such that the sliding phase is achieved within the specified fixed time. In the second stage, it is established that the state error vector E also achieves fixed-time stability.

Part 1: A Lyapunov candidate function V1 is considered as follows:

$$V_1 = \frac{1}{2} S^T S \tag{27}$$

Using (21) and (15) in the time derivative of $V_1$ yields $$\dot{V}_1 = S^T(c_0(\mathcal{A}\,\varepsilon - \mathcal{B}\,\mathcal{U} + \mathcal{D} + \Phi - \dot{z}_{ref}) + c_1 |\varepsilon|^{\beta_1} + c_2 |\varepsilon|^{\beta_2}) \tag{28}$$

After substituting $\mathcal{U}$ from (22) in above equation results in $$\dot{V}_1 = S^T(-k_1 |S|^{\sigma_1} - k_2 |S|^{\sigma_2} - k_3 \mathrm{sign}(S) + c_0 \mathcal{D}) \tag{29}$$

$$= -k_1 \|S\|^{\sigma_1+1} - k_2 \|S\|^{\sigma_2+1} - k_3 \|S\| + c_0 S^T \mathcal{D}$$

$$\leq -k_1 \|S\|^{\sigma_1+1} - k_2 \|S\|^{\sigma_2+1} - k_3 \|S\| + \|S\| \|c_0 \mathcal{D}\|$$

21

-continued $$\leq -k_1 \|S\|^{\sigma_1+1} - k_2\|S\|^{\sigma_2+1} - (k_3 - \bar{D})\|S\|$$

$$\leq -k_1 2 \frac{\sigma_1+1}{2} \left(\frac{\|S\|^2}{2}\right)^{\frac{\sigma_1+1}{2}} - k_2 2 \frac{\sigma_2+1}{2} \left(\frac{\|S\|^2}{2}\right)^{\frac{\sigma_2+1}{2}} - k_d\|S\|$$

$$\leq -\eta_1 V_1^{\gamma_1} - \eta_2 V_1^{\gamma_2}$$

where $$\eta_1 = k_1 2 \frac{\sigma_1+1}{2} > 0, \eta_2 = k_2 2 \frac{\sigma_2+1}{2} > 0,$$

$$\gamma_1 = \frac{\sigma_1+1}{2} \in (0, 1), \gamma_2 = \frac{\sigma_2+1}{2} \in (1, 2).$$

Consequently, as per Lemma 2, the inequality (29) satisfies the fixed time convergence condition. Therefore, the proposed integral sliding surface will converge to zero within a fixed time and its settling time will be given as:

$$T_1 = T_{max1} \leq \frac{1}{\eta_1(1-\gamma)} + \frac{1}{\eta_2(\gamma_2-1)} \tag{30}$$

The first part of the convergence proof is completed.

Part 2: Since the sliding manifold S and its time derivative reaches zero in fixed time and stays there, the given expression can be obtained from (20) as:

$$\dot{S} = C_0\dot{\varepsilon} + c_1|\varepsilon|^{\beta_1} + c_2|\varepsilon|^{\beta_2} = 0$$

or $\dot{\varepsilon} = -c_1/c_0\lfloor\varepsilon\rceil^{\beta_1} - c_2/c_0\lfloor\varepsilon\rceil^{\beta_2};$ \hfill (31)

To prove that the error vector $\varepsilon$ approaches zero within the fixed time, a new Lyapunov function $V_2$ is selected as:

$$V_2 = \frac{1}{2}\varepsilon^T\varepsilon \tag{32}$$

Taking the time derivative of $V_2$ and substituting (31) to obtain:

$$\dot{V}_2 = \varepsilon^T\dot{\varepsilon} \tag{33}$$

$$= \varepsilon^T\left(-c_1/c_0|\varepsilon|^{\beta_1} - c_2/c_0|\varepsilon|^{\beta_2}\right)$$

$$= -c_1/c_0\|\varepsilon\|^{\beta_1+1} - c_2/c_0\|\varepsilon\|^{\beta_2+1}$$

$$= -\frac{c_1}{c_0}2^{\frac{\beta_1+1}{2}}\left(\frac{\|\varepsilon\|^2}{2}\right)^{\frac{\beta_1+1}{2}} - \frac{c_2}{c_0}2^{\frac{\beta_2+1}{2}}\left(\frac{\|\varepsilon\|^2}{2}\right)^{\frac{\beta_2+1}{2}}$$

$$\leq -2^{\frac{\beta_1+1}{2}}\frac{c_1}{c_0}V_2^{\frac{\beta_1+1}{2}} - 2^{\frac{\beta_2+1}{2}}\frac{c_2}{c_0}V_2^{\frac{\beta_2+1}{2}}$$

$$\leq -\zeta_1 V_2^{\varphi_1} - \zeta_2 V_2^{\varphi_2}$$

where $$\zeta_1 = 2^{\frac{\beta_1+1}{2}}c_1/c_0 > 0, \zeta_2 = 2^{\frac{\beta_2+1}{2}}c_2/c_0 > 0,$$

$$\varphi_1 = (\beta_1+1)/2 \in (0, 1), \text{ and } \varphi_2 = (\beta_2+1)/2 \in (1, 2).$$

Similar to the previous case, inequality (33) also satisfies the fixed time stability criteria of Lemma 2. Therefore, error

22 vector $\varepsilon$ will be forced to zero within the fixed time, and the bound of settling time will be $$T_2 = T_{max2} \leq T_1 + \frac{1}{\zeta_2(\varphi_2-1)} + \frac{1}{\zeta_1(1-\varphi_1)} \tag{34}$$

Hence, the overall stability of the closed loop system is fixed time stable, and this completes the proof of Theorem 1.

Remark 2. As the error vector $\varepsilon \in \mathbb{R}^3$ converges to zero within the fixed time, the direct relationship between $Z_1$ $ref$ and $Z_4$ $ref$, as defined in Equation (12), ensures that the DC bus voltage, $Z_4$, will also converge to the desired $Z_4$ $ref$ value within fixed time.

Figures 6A, 6B:
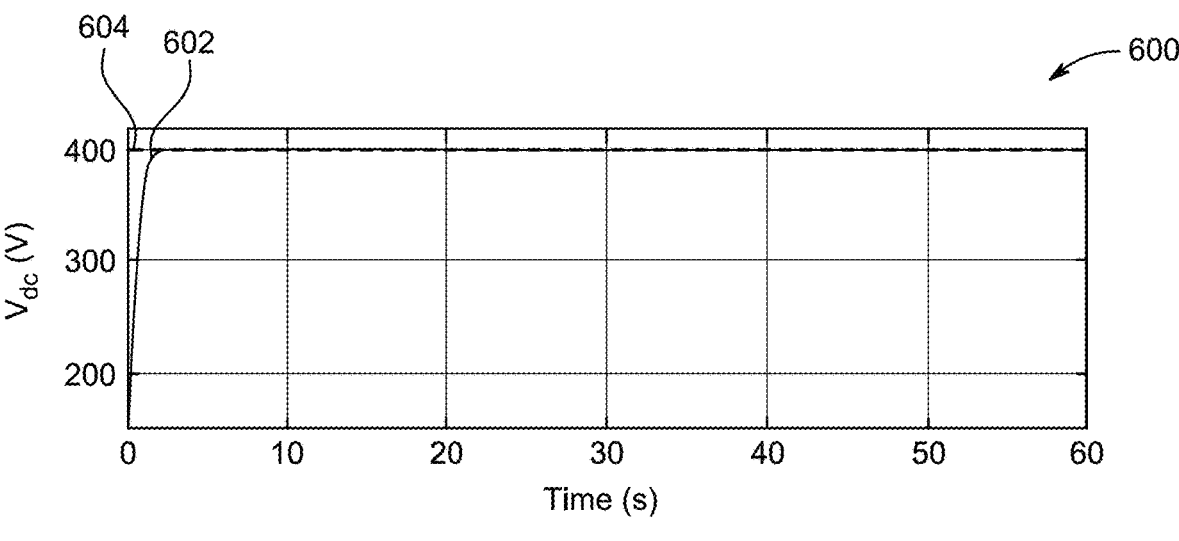
FIG. 6A is a graph illustrating the simulation results of the hybrid power system under battery voltage perturbations, showing the DC bus voltage and fuel cell current response, according to certain embodiments.
FIG. 6B is an enlarged view of the DC bus voltage waveform of FIG. 6A, highlighting transient deviations during battery voltage variations, according to certain embodiments.

FIG. 6A illustrates simulation results 600 of the hybrid power system when the battery voltage is perturbed under the proposed fixed-time integral sliding mode control strategy. A first curve 602 shows the DC bus voltage $V_{dc}$ and a second curve 604 shows the reference voltage at 400 V. The simulation was conducted under a load current profile $I_o$ dynamically set according to the European Extra Urban Driving Cycle. The load current $I_o$ is defined by the following expression:

$$I_o = \frac{1}{0.75 \times 400}\left[0.5 p_a v_t^2 A C_x + M_g C_r + M\frac{dv_t}{dt}\right]v_t \tag{35}$$

where $I_o$ represents the load current, $p_a$ denotes the air density, $v_t$ signifies the vehicle speed, A represents the frontal area of the vehicle, $C_x$ denotes the coefficient of aerodynamic drag, $M_g$ represents the gradient resistance, $C_r$ denotes the rolling resistance coefficient, M represents the vehicle mass, and $$\frac{dv_t}{dt}$$

signifies the rate of change of vehicle speed.

The simulation shows that the DC bus voltage $V_{dc}$ follows the reference voltage 604 of 400 V with minimal deviation even when the battery voltage fluctuates.

FIG. 6B illustrates an enlarged portion of simulation results 600 of FIG. 6A, focusing on the regulated DC bus voltage $V_{dc}$. The enlarged view highlights transient regions during which the battery voltage is perturbed. As shown, the DC bus voltage 602 remains tightly regulated around the reference voltage 604, confirming the controller's ability to mitigate the effect of battery disturbances and maintain voltage alignment with minimal transient deviation.

Figure 6C:
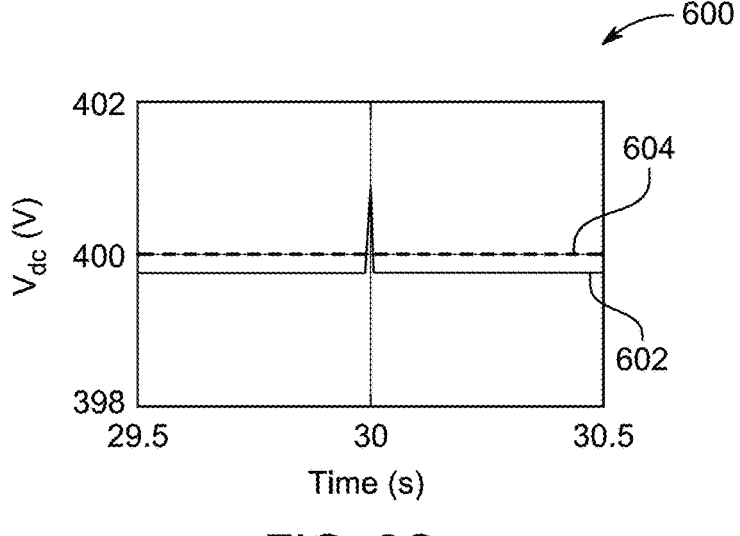
FIG. 6C is an enlarged view of the DC bus voltage waveform of FIG. 6A, further emphasizing the corrective action of the controller during battery voltage perturbations, according to certain embodiments.

FIG. 6C illustrates another enlarged portion of simulation results 600 of FIG. 6A, further emphasizing localized regions of the regulated DC bus voltage $V_{dc}$ 602 relative to the reference voltage 604. This figure provides detailed evidence of the controller's rapid corrective response, wherein voltage deviations are immediately compensated to restore alignment with the reference, thereby ensuring stable operation across dynamic scenarios.

Figure 6D:
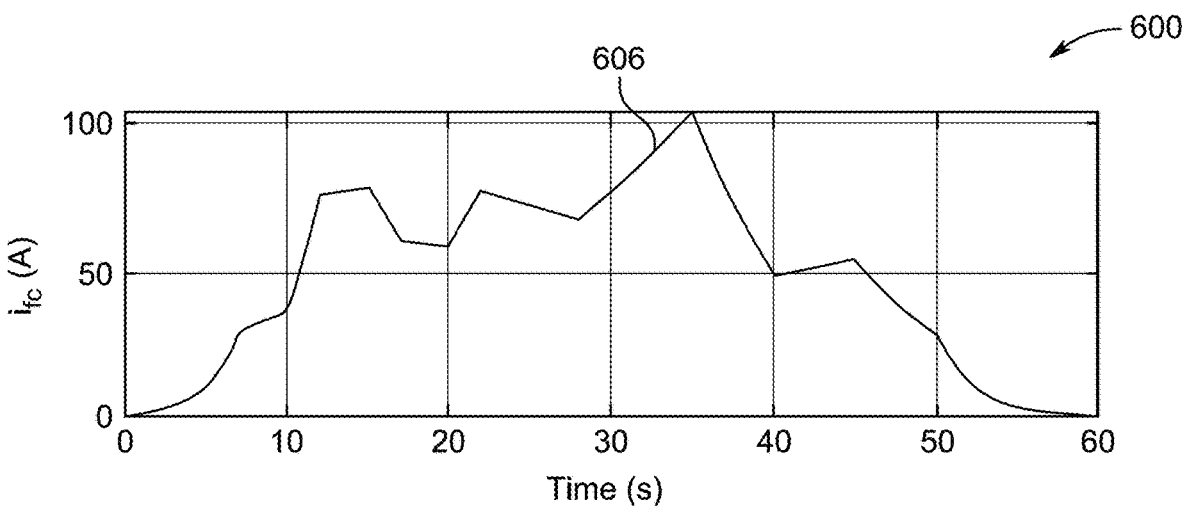
FIG. 6D is a graph illustrating the fuel cell current response corresponding to FIG. 6A, according to certain embodiments.

FIG. 6D illustrates the detailed waveform 606 of the fuel cell current $i_{fc}$ corresponding to the simulation results 600 of FIG. 6A. The current response follows the transient load pattern while ensuring the stability of the DC bus voltage, validating the effectiveness of the proposed fixed-time integral sliding mode control strategy.

Figures 6E, 6F:
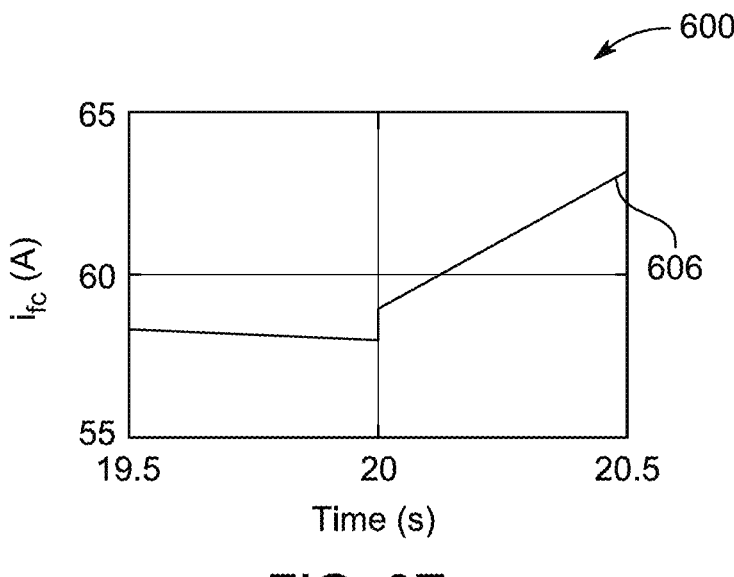
FIG. 6E is an enlarged view of the fuel cell current waveform of FIG. 6D, highlighting current adaptation during perturbations, according to certain embodiments.
FIG. 6F is a further enlarged view of the fuel cell current waveform of FIG. 6D, emphasizing transient adaptation under battery voltage variation, according to certain embodiments.

FIG. 6E illustrates an enlarged portion of the fuel cell current waveform 606 of FIG. 6D corresponding to the simulation results 600 of FIG. 6A during a transient event when the battery voltage is varied, showing the dynamic adjustment of the fuel cell current $i_{fc}$ to compensate for the perturbation. The results demonstrate that the proposed fixed-time integral sliding mode control strategy enables the fuel cell current to rise and stabilize rapidly, thereby contributing to the maintenance of the DC bus voltage close to its reference value.

FIG. 6F illustrates another enlarged portion of the fuel cell current waveform 606 of FIG. 6D corresponding to the simulation results 600 of FIG. 6A. As shown, the fuel cell current $i_{fc}$ exhibits a compensatory adjustment in response to further variations in the battery terminal voltage. The localized view confirms that the current waveform adapts to transient load demands and perturbations, ensuring that the DC bus voltage remains stabilized around the reference value despite external disturbances.

Figure 6G:
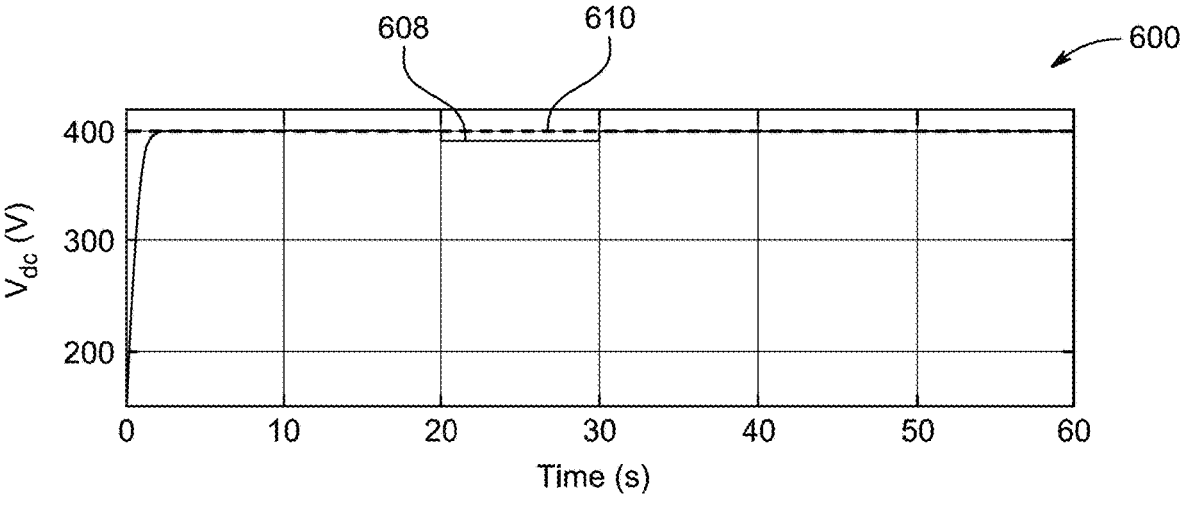
FIG. 6G is a graph illustrating the simulation results of the hybrid power system under ultracapacitor voltage perturbations, showing the DC bus voltage and fuel cell current response, according to certain embodiments.

FIG. 6G illustrates simulation results 600 when the ultracapacitor voltage $V_{UC}$ is perturbed. A first curve 608 shows the DC bus voltage $V_{dc}$ and a second curve 610 shows the reference voltage. When the ultracapacitor voltage deviates from its nominal value, the DC bus voltage $V_{dc}$ demonstrates a momentary deviation from the reference voltage 610. The results indicate that the controller maintains regulation but with a small reduction in DC bus voltage, attributable to the fast transient response of the ultracapacitor and its impact on short-term power delivery.

Figure 6H:
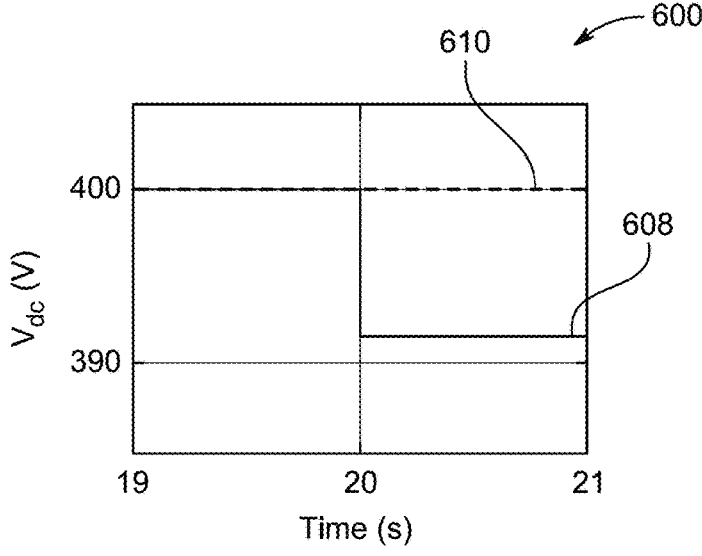
FIG. 6H is an enlarged view of the DC bus voltage waveform of FIG. 6G, highlighting transient deviation during ultracapacitor voltage fluctuations, according to certain embodiments.

FIG. 6H illustrates an enlarged section of the upper waveform 608 of simulation results 600 shown in FIG. 6G, highlighting the localized deviation of the DC bus voltage Vdc following an ultracapacitor perturbation. The magnified waveform clearly shows the transient departure from the reference voltage 610.

Figure 6I:
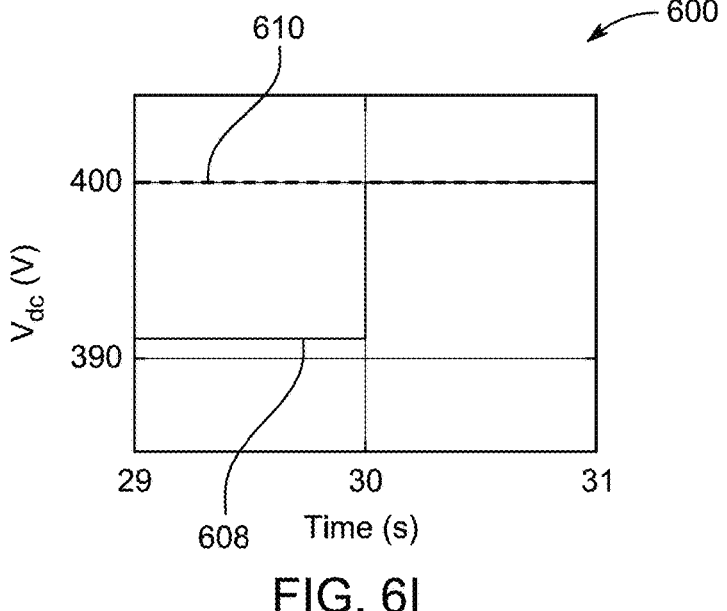
FIG. 6I is a further enlarged view of the DC bus voltage waveform of FIG. 6G, emphasizing the restoration of bus voltage toward the reference value, according to certain embodiments.

FIG. 6I illustrates another enlarged section of the upper waveform 608 of simulation results 600 shown in FIG. 6G, showing the restoration of the DC bus voltage Vdc back toward the reference voltage 610. This detailed view demonstrates the rapid corrective action of the proposed controller and its ability to minimize steady-state error.

Figure 6J:
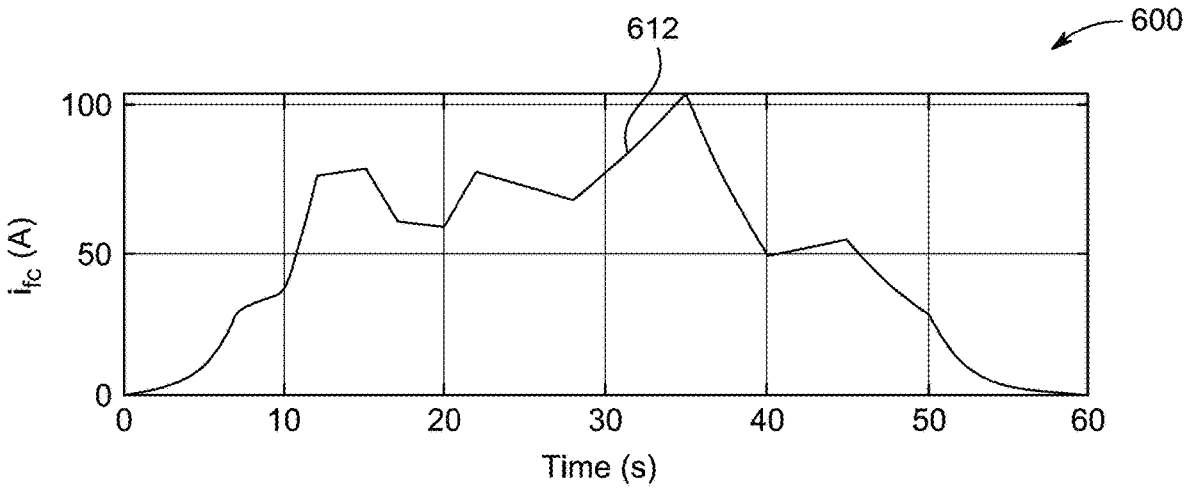
FIG. 6J is a graph illustrating the fuel cell current response corresponding to FIG. 6G, according to certain embodiments.

FIG. 6J illustrates an enlarged section of the lower waveform 612 of simulation results 600 shown in FIG. 6G, focusing on the fuel cell current $i_{fc}$ response when the ultracapacitor voltage changes. The waveform demonstrates how the fuel cell current compensates for the ultracapacitor's reduced support by adjusting its amplitude to stabilize the system.

Figure 6K:
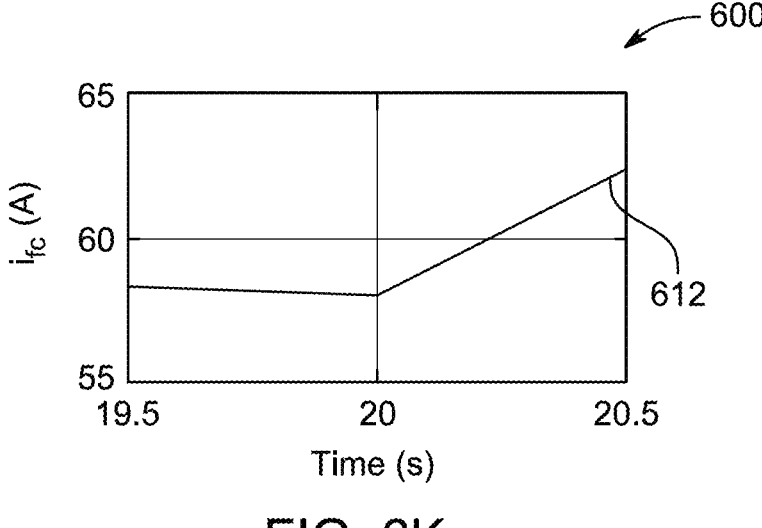
FIG. 6K is an enlarged view of the fuel cell current waveform of FIG. 6J, showing dynamic adjustment under ultracapacitor perturbations, according to certain embodiments.

FIG. 6K illustrates a further enlarged section of simulation results 600 shown in FIG. 6J, capturing the transient oscillations of the fuel cell current $i_{fc}$ immediately after the ultracapacitor voltage disturbance. The waveform 612 emphasizes the dynamic modulation of current during the disturbance event.

Figure 6L:
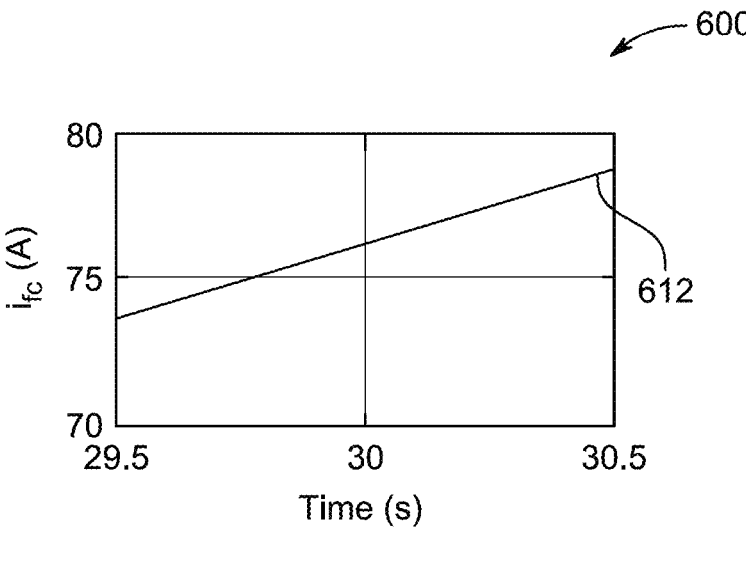
FIG. 6L is a further enlarged view of the fuel cell current waveform of FIG. 6J, highlighting transient compensation during ultracapacitor voltage changes, according to certain embodiments.

FIG. 6L illustrates another further enlarged section of simulation results 600 shown in FIG. 6J, showing how the fuel cell current $i_{fc}$ settles back toward a stable trajectory. The waveform 612 shows the effectiveness of the proposed control in achieving load sharing and voltage regulation despite ultracapacitor voltage fluctuations.

Figure 6M:
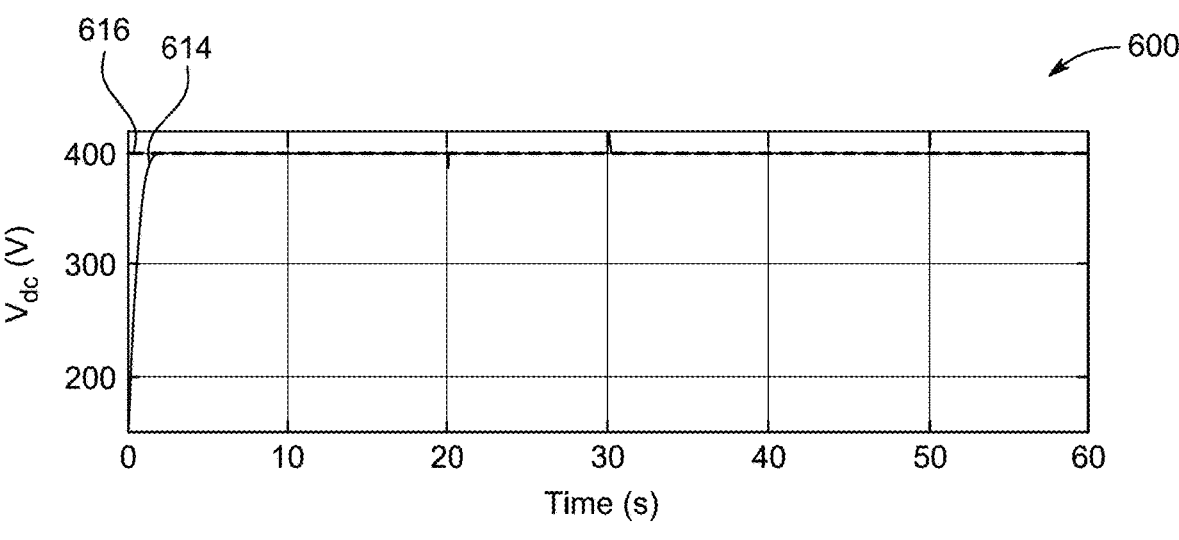
FIG. 6M is a graph illustrating the DC bus voltage response of the hybrid power system under fuel cell voltage perturbations, according to certain embodiments.

FIG. 6M illustrates simulation results 600 of the hybrid power system when the fuel cell voltage $V_{FC}$ is varied, showing the regulated DC bus voltage $V_{dc}$ 614 and the reference voltage 616. The results demonstrate that despite fluctuations in the fuel cell voltage, the DC bus voltage rapidly converges back to the reference value of 400 V with negligible steady-state error.

Figure 6N:
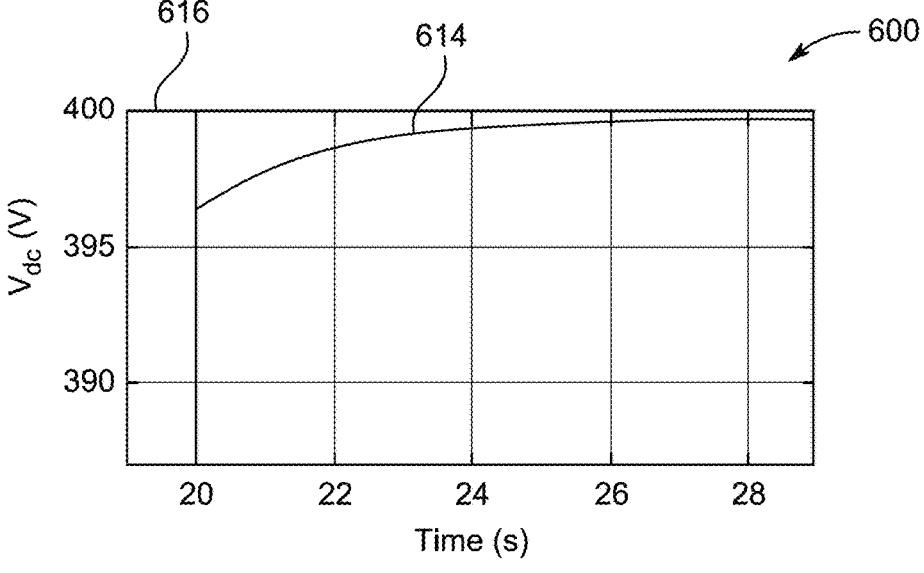
FIG. 6N is an enlarged view of the DC bus voltage waveform of FIG. 6M, showing the rapid return to the reference voltage, according to certain embodiments.

FIG. 6N illustrates an enlarged section of the waveform of simulation results 600 shown in FIG. 6M, highlighting the transient deviation of the DC bus voltage $V_{dc}$ 614 when the fuel cell voltage experiences a disturbance and the reference voltage 616. The detailed view confirms that the deviation remains limited and the voltage stabilizes within a short duration.

Figure 6O:
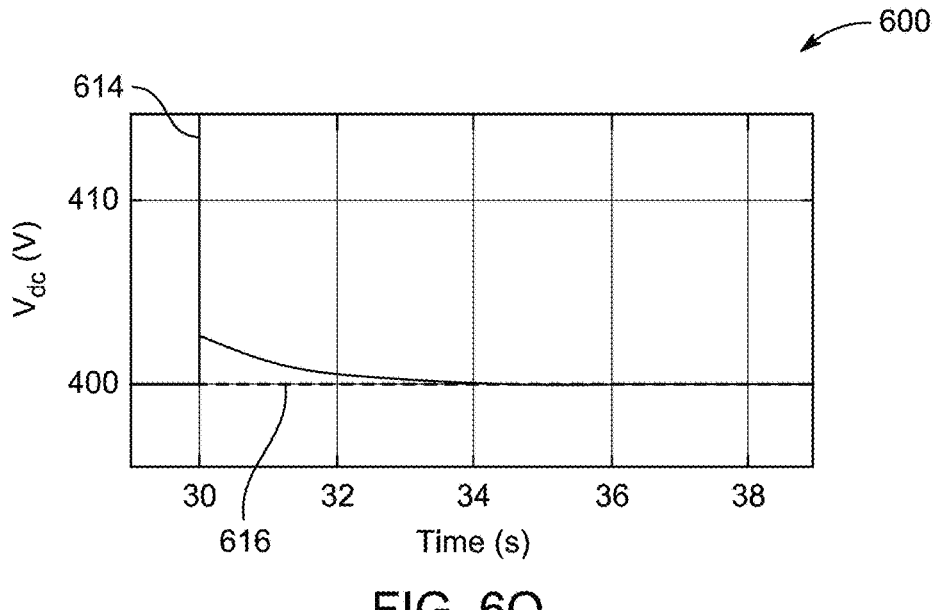
FIG. 6O is a further enlarged view of the DC bus voltage waveform of FIG. 6M, emphasizing convergence to the reference, according to certain embodiments.

FIG. 6O illustrates another enlarged section of the waveform of simulation results 600 shown in FIG. 6M, focusing on the recovery of the DC bus voltage $V_{dc}$, waveform 614, to the reference voltage, waveform 616. The results demonstrate the rapid response of the proposed control strategy in restoring voltage stability following a disturbance in fuel cell voltage.

Figure 6P:
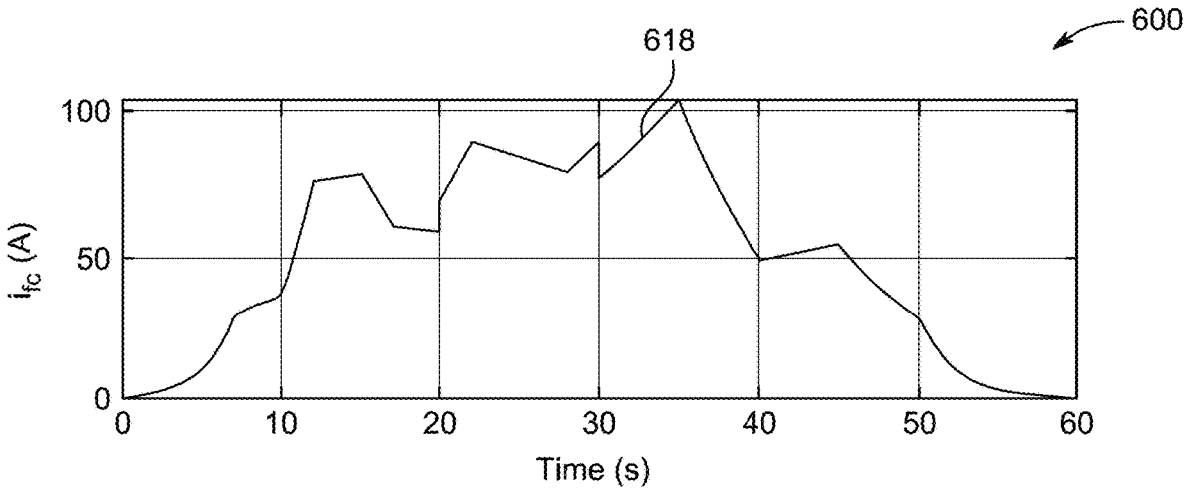
FIG. 6P is a graph illustrating the fuel cell current response of the hybrid power system under fuel cell voltage perturbations, according to certain embodiments.

FIG. 6P illustrates simulation results 600 of the hybrid power system under variation of the fuel cell voltage $V_{FC}$, showing the corresponding fuel cell current $i_{fc}$ by waveform 618. The fuel cell current dynamically adjusts to counterbalance the disturbance and ensure that the load current requirement is met.

Figure 6Q:
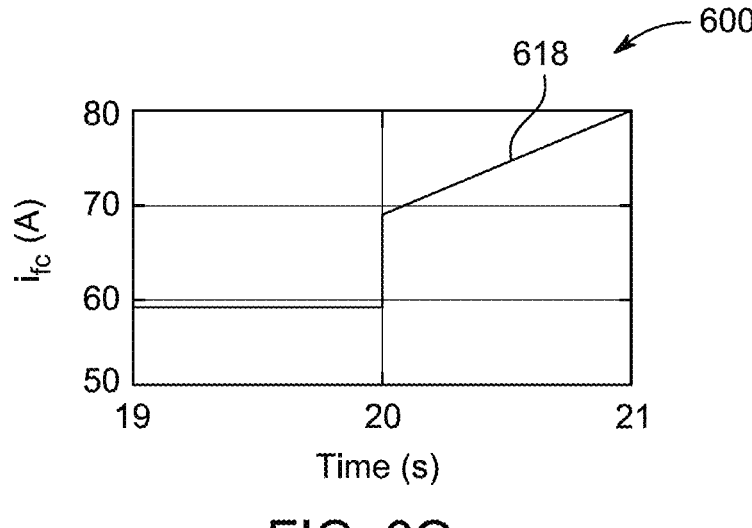
FIG. 6Q is an enlarged view of the fuel cell current waveform of FIG. 6P, showing current adaptation under fuel cell disturbances, according to certain embodiments.

FIG. 6Q illustrates an enlarged section of the waveform of simulation results 600 shown in FIG. 6P, showing the adaptation of the fuel cell current $i_{fc}$ by waveform 618 during the onset of a fuel cell voltage variation. The detailed view highlights the transient behavior of the current response.

Figure 6R:
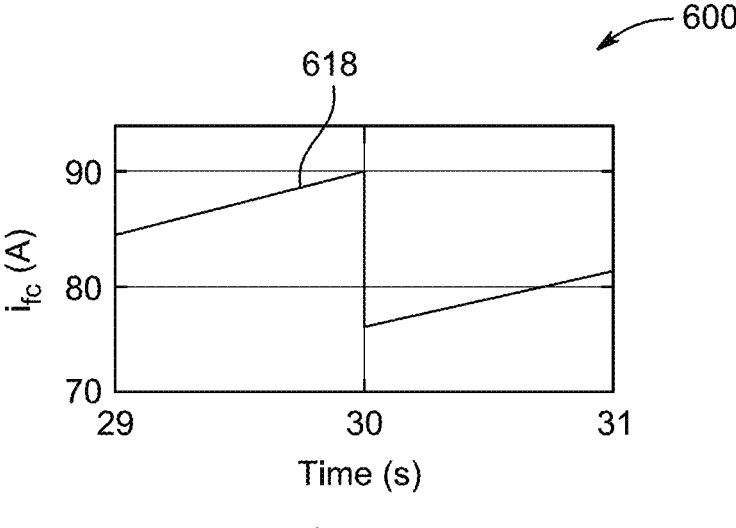
FIG. 6R is a further enlarged view of the fuel cell current waveform of FIG. 6P, highlighting fixed-time convergence of the current response, according to certain embodiments.

FIG. 6R illustrates another enlarged section of the waveform of simulation results 600 shown in FIG. 6P, showing the stabilization of the fuel cell current $i_{fc}$ 618 after the disturbance, T.

Figure 7A:
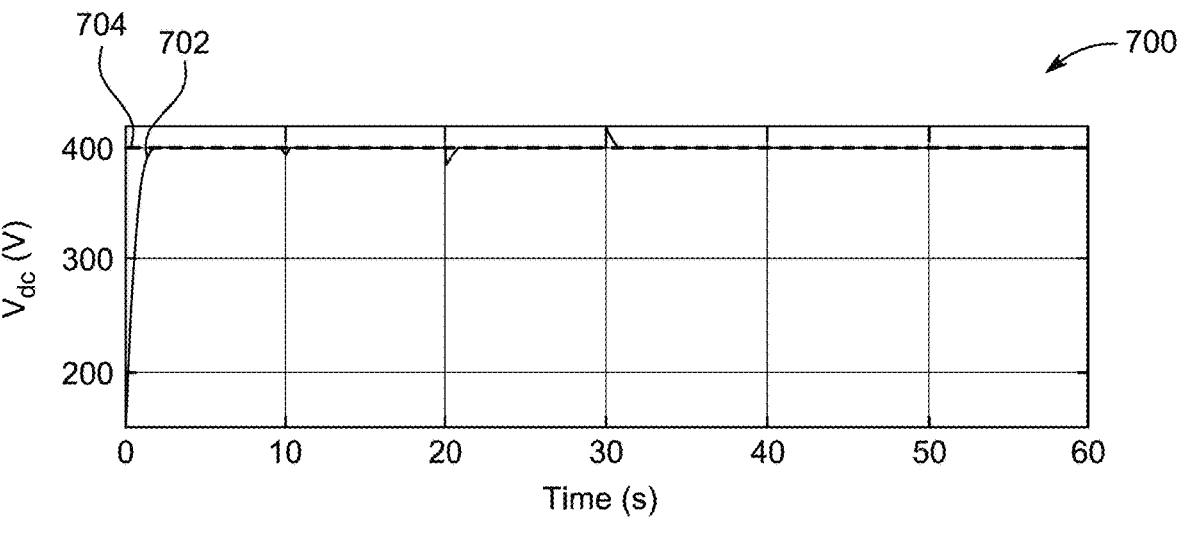
FIG. 7A is a graph illustrating the DC bus voltage response of the hybrid power system when the fuel cell voltage is perturbed, according to certain embodiments.

FIG. 7A illustrates simulation results 700 of the hybrid power system under the proposed fixed-time integral sliding mode control strategy when the fuel cell voltage $V_{fc}$ is varied. The waveform 702 shows the DC bus voltage $V_{dc}$, and the waveform 704 shows the corresponding reference voltage. The results demonstrate that even when the fuel cell voltage undergoes significant changes, the DC bus voltage rapidly converges back to the reference value of 400 V with negligible steady-state error.

Figure 7B:
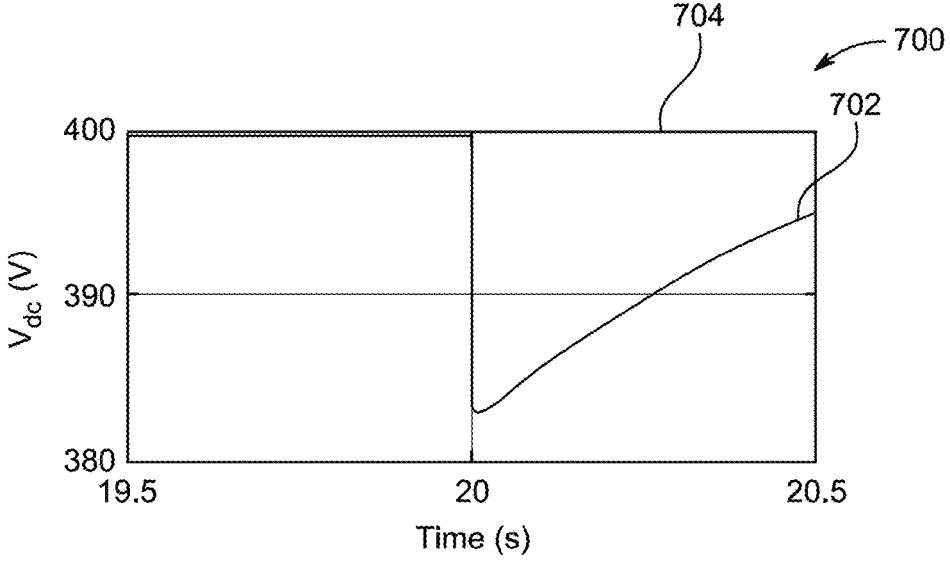
FIG. 7B is an enlarged view of the DC bus voltage waveform of FIG. 7A, highlighting transient deviation during perturbations, according to certain embodiments.

FIG. 7B is an enlarged section of the waveform of simulation results 700 of FIG. 7A illustrating a first perturbation in the fuel cell voltage $i_{fc}$. The DC bus voltage 702 momentarily deviates but quickly stabilizes and returns to the reference voltage 704, validating the disturbance rejection capability of the proposed control strategy.

Figure 7C:
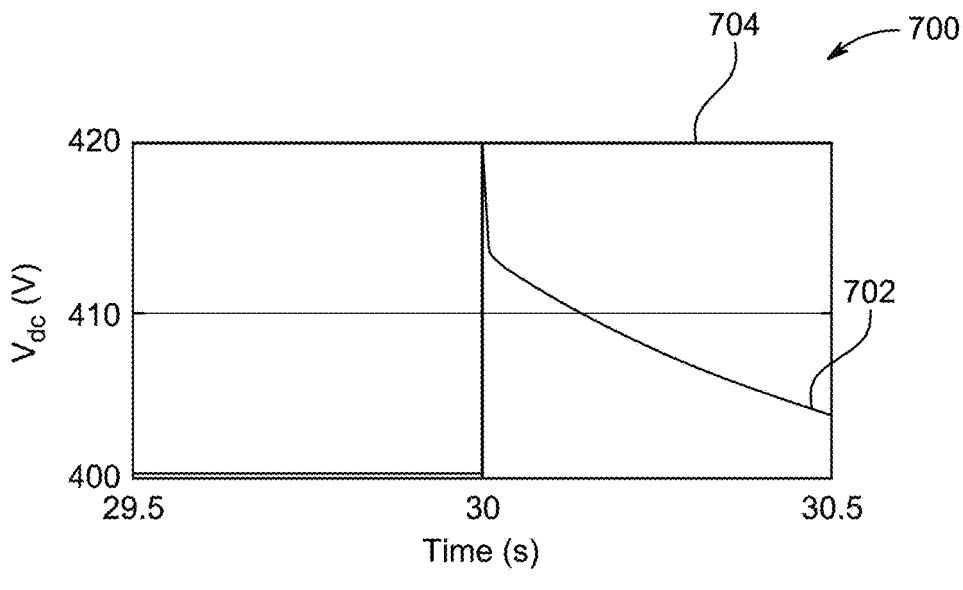
FIG. 7C is a further enlarged view of the DC bus voltage waveform of FIG. 7A, showing restoration toward the reference voltage, according to certain embodiments.

FIG. 7C is another enlarged section of the waveform of simulation results 700 of FIG. 7A illustrating a second perturbation in the fuel cell voltage. The DC bus voltage 702 again exhibits a short deviation but rapidly converges to the reference voltage 704, further demonstrating the robustness of the controller under repeated disturbances.

Figure 7D:
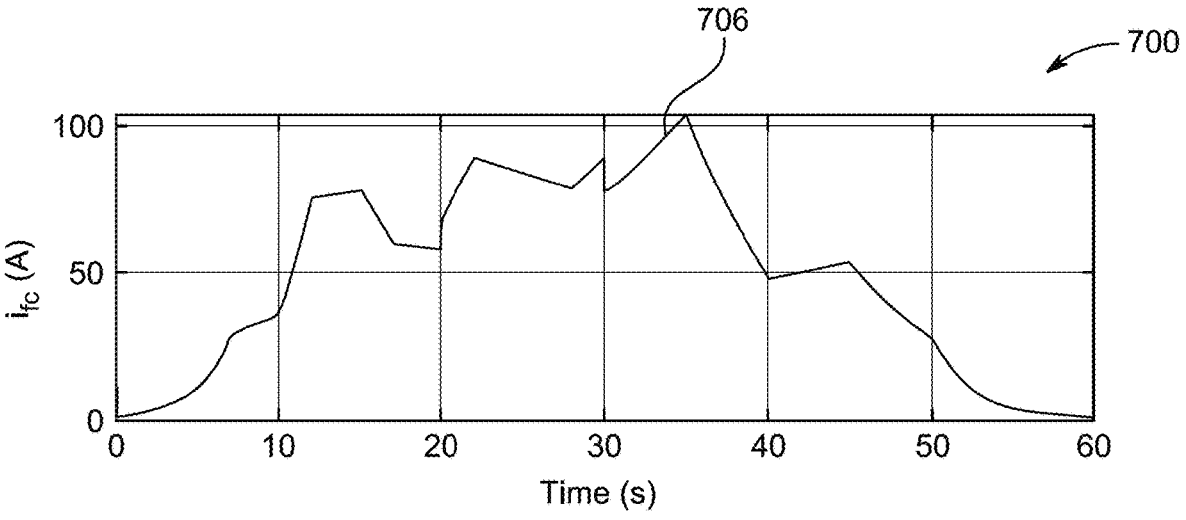
FIG. 7D is a graph illustrating the fuel cell current response corresponding to FIG. 7A, according to certain embodiments.

FIG. 7D illustrates the lower waveform from the simulation results 700 of FIG. 7A. The curve 706 represents the fuel cell current $i_{fc}$, which dynamically adjusts in response to variations in the fuel cell voltage. The adaptation of the fuel cell current ensures balanced power distribution and maintains the load current profile.

Figure 7E:
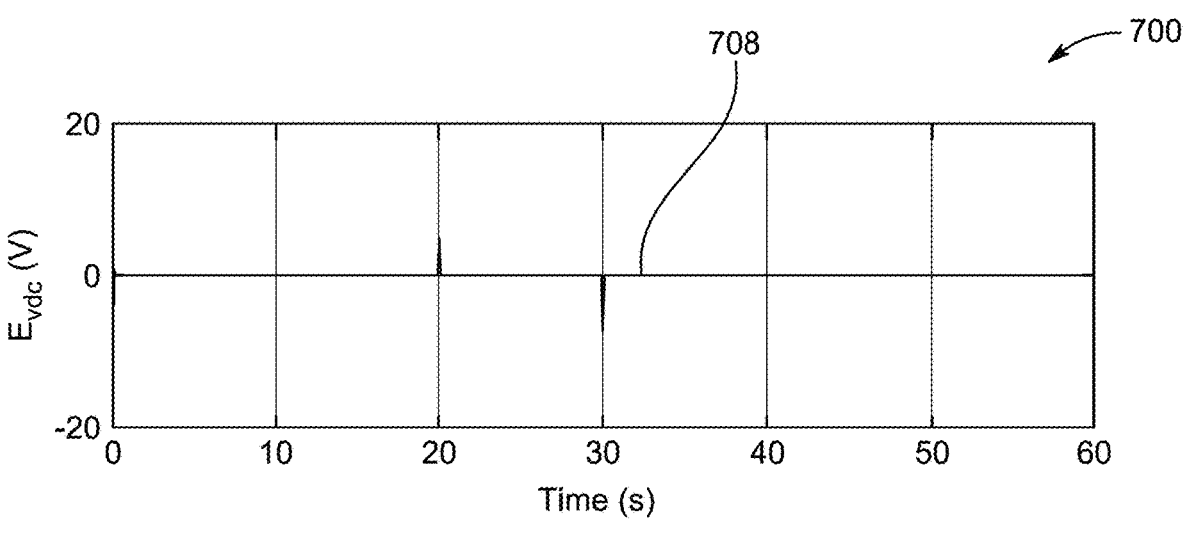
FIG. 7E is a graph illustrating the error in the DC bus voltage under fuel cell voltage variations, according to certain embodiments.

FIG. 7E illustrates simulation results 700 of error convergence corresponding to the DC bus voltage when the fuel cell voltage is varied. The curve 708 represents the error in the DC bus voltage $EV_{dc}$, which rapidly converges to zero after each disturbance, confirming the fixed-time stability of the control strategy.

Figure 7F:
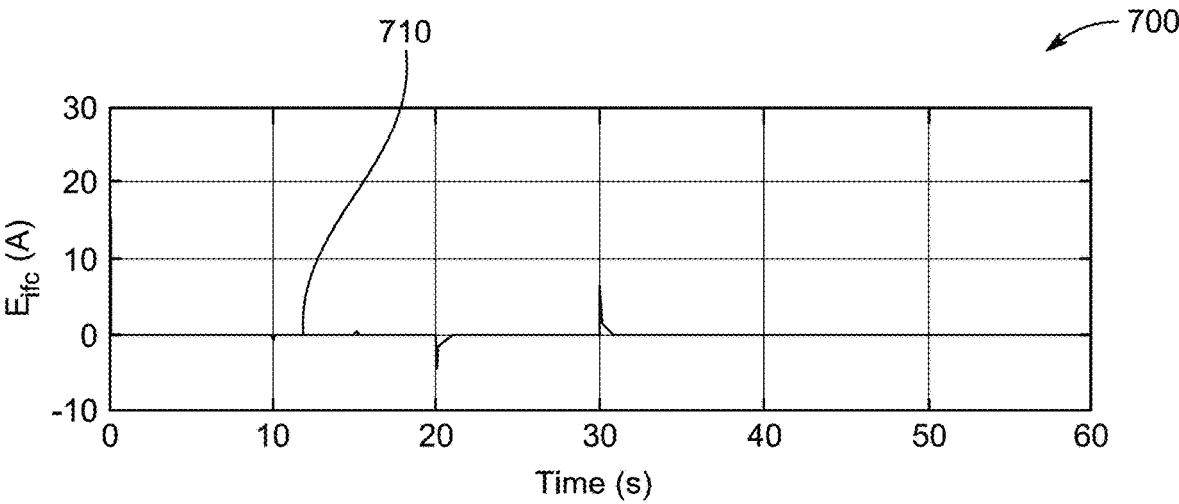
FIG. 7F is a graph illustrating the error in the fuel cell current under fuel cell voltage variations, according to certain embodiments.

FIG. 7F illustrates simulation results 700 of error convergence corresponding to the fuel cell current when the fuel cell voltage is varied. The curve 710 represents the error in the fuel cell current $E\,i_{fc}$, which also converges rapidly to zero with negligible overshoot, validating the accuracy of the proposed controller in tracking the reference current under uncertainty conditions.

The simulations of FIGS. 6A-6R and 7A-7F were implemented using MATLAB models of the hybrid power system, including the fuel cell, the boost converter, the bidirectional buck-boost converters for the battery and ultracapacitor, and the DC bus. The reference voltage was set at 400 V. Converter parameters were selected according to Table I, and control parameters were selected according to Table II. These tables define values of inductances L1, L2, L3, resistances R1, R2, R3, the DC-link capacitor $C_{dc}$, controller gains k1 and k2, and vehicle parameters including air density pa, frontal area A, drag coefficient $C_x$, rolling resistance $C_r$, gradient resistance $M_g$, and vehicle mass M. The parameters ensure that the hybrid power system operates under realistic conditions reflective of a European Extra Urban Driving Cycle.

The performance indices, including steady-state error, convergence time, and transient response, are compared in Table III. Table III shows that the proposed fixed-time integral sliding mode controller yields faster convergence, reduced steady-state error, and superior robustness compared to conventional integral sliding mode control. In particular, Table III highlights the improvement in disturbance rejection and stabilization time across different voltage perturbation scenarios.

Figure 8A:
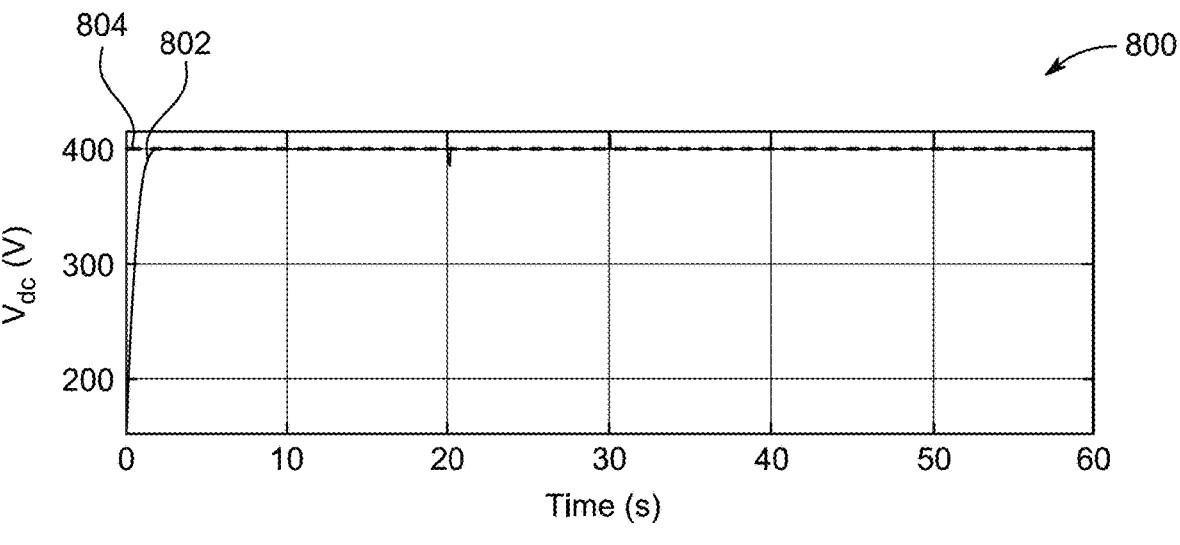
FIG. 8A is a graph illustrating the DC bus voltage and fuel cell current response of the hybrid power system when the battery voltage is perturbed, according to certain embodiments.

FIG. 8A illustrates simulation results 800 of the hybrid power system when the battery voltage $v_{bat}$ is perturbed under the proposed fixed-time integral sliding mode control strategy. A first curve 802 represents the DC bus voltage $V_{dc}$ and a second curve 804 represents the reference voltage set at 400 V. The results show that the waveforms corresponding to DC bus voltage Vdc 802 remains closely aligned with that of the reference voltage 804 despite changes in the battery voltage. The fuel cell current $i_{fc}$ adapts to these variations, ensuring that the DC bus voltage regulation is maintained. The perturbation points show that even when the battery voltage shifts significantly, the controller compensates to preserve stability of the DC bus voltage.

Figure 8B:
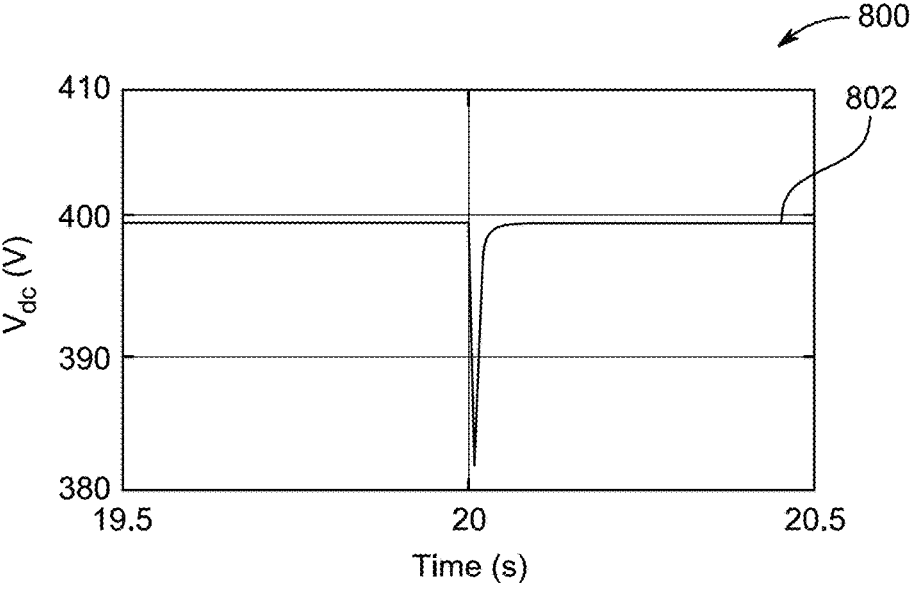
FIG. 8B is an enlarged view of the DC bus voltage waveform of FIG. 8A, highlighting transient deviation, according to certain embodiments.

FIG. 8B is an enlarged subset of the waveform of simulation results 800 shown in FIG. 8A, focusing on the perturbation interval around 19.5-20.5 seconds. The curves demonstrate how the DC bus voltage $V_{dc}$ 802 and the reference voltage 804 remain nearly aligned.

Figure 8C:
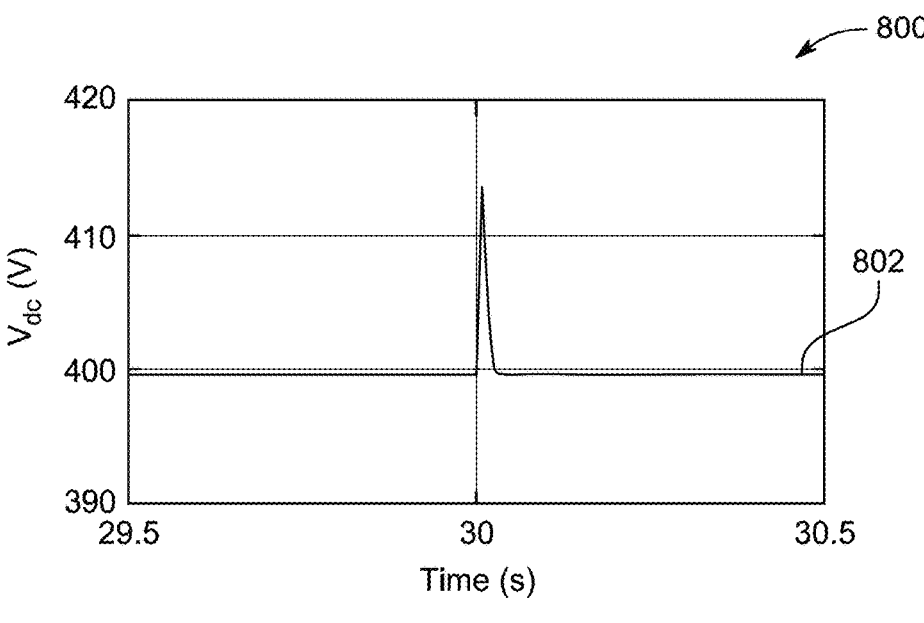
FIG. 8C is a further enlarged view of the DC bus voltage waveform of FIG. 8A, showing restoration toward the reference voltage, according to certain embodiments.

FIG. 8C is another enlarged subset of simulation results 800 shown in FIG. 8A, focusing on the perturbation interval around 29.5-30.5 seconds. The curves confirm the ability of the proposed control strategy to restore the DC bus voltage 802 toward the reference 804 within a fixed time.

Figure 8D:
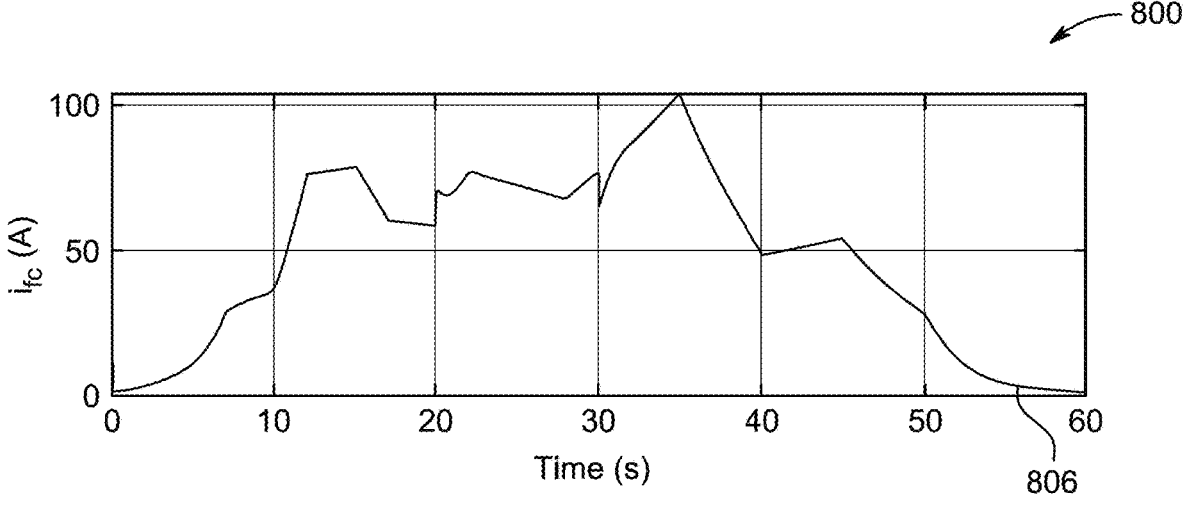
FIG. 8D is a graph illustrating the fuel cell current response corresponding to FIG. 8A, according to certain embodiments.

FIG. 8D illustrates the lower waveform of simulation results 800 shown in FIG. 8A, specifically showing the dynamic trajectory of the fuel cell current 806 across the entire 60-second interval. The waveform demonstrates the adaptation of the current profile according to the load demand, while ensuring DC bus voltage stability.

Figure 8E:
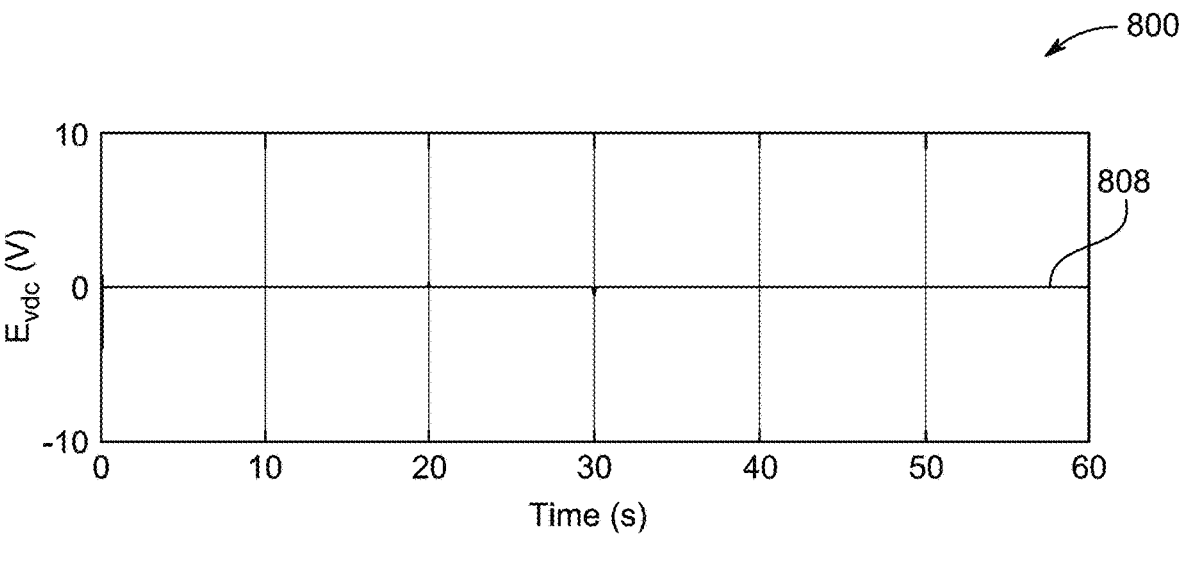
FIG. 8E is a graph illustrating the error in the DC bus voltage when the battery voltage is perturbed, according to certain embodiments.

FIG. 8E illustrates error convergence characteristics 800 when the battery voltage $v_{bat}$ is changed. A first curve 808 shows the error in the DC bus voltage $V_{dc}$. The errors converge to zero within a fixed time irrespective of the initial conditions.

Figure 8F:
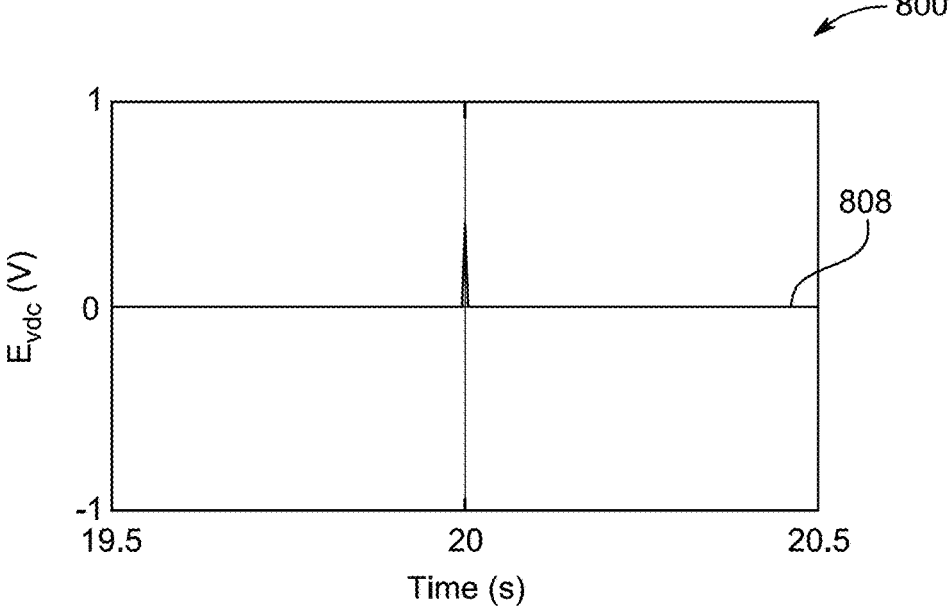
FIG. 8F is a graph illustrating the error in the fuel cell current when the battery voltage is perturbed, according to certain embodiments.

FIG. 8F is an enlarged subset of the error convergence results from the convergence characteristics 800 of FIG. 8E focusing on the interval around 19.5-20.5 seconds. The error in the DC bus voltage 808 demonstrates the ability of the controller to reject battery voltage disturbances.

Figure 8G:
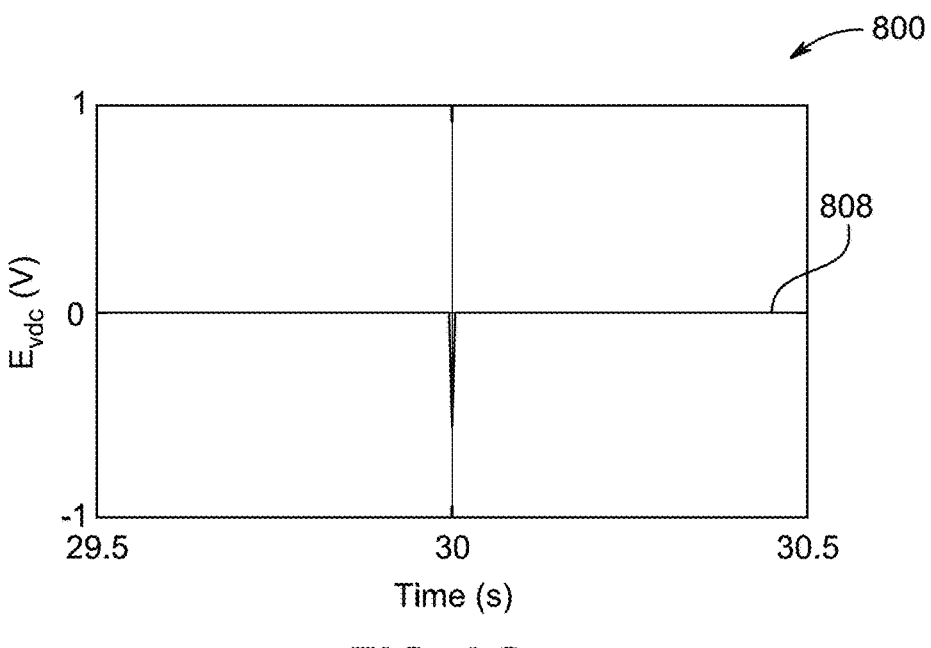
FIG. 8G is an enlarged view of the error waveform of FIG. 8E, highlighting convergence characteristics, according to certain embodiments.

FIG. 8G is another enlarged subset of convergence characteristics 800 of FIG. 8E focusing on the interval around 29.5-30.5 seconds. Similar to FIG. 8F, the error convergence curves 808 illustrate the rapid stabilization of the system after the battery voltage perturbation, confirming disturbance rejection capability.

Figure 8H:
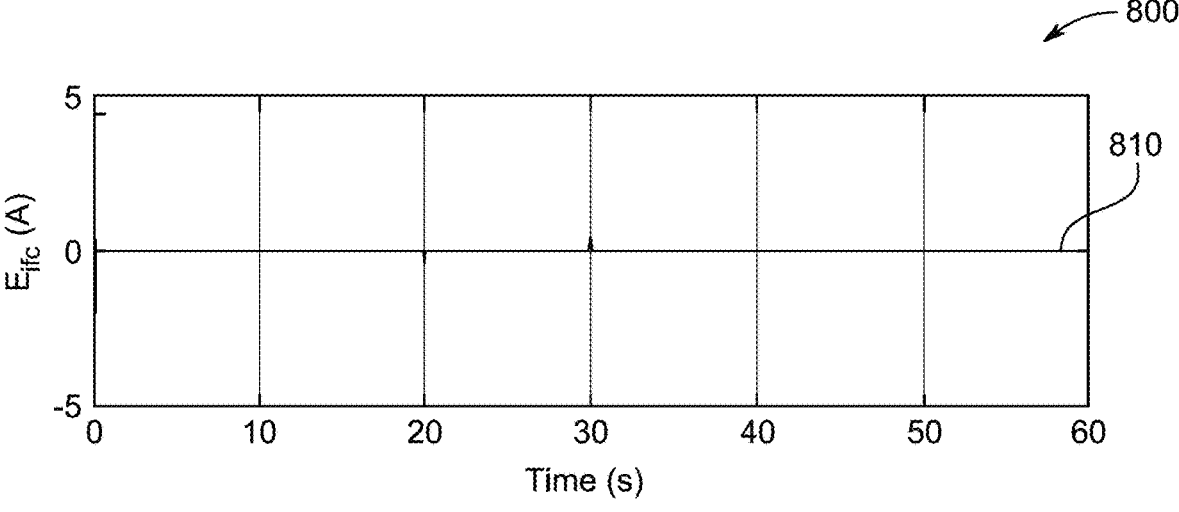
FIG. 8H is an enlarged view of the error waveform of FIG. 8E, showing fixed-time convergence of current error, according to certain embodiments.

FIG. 8H illustrates the lower waveform corresponding to convergence characteristics 800 of FIG. 8E, showing the fuel cell current error 810 across the complete time interval. The results confirm that despite perturbations, the fuel cell current error converges consistently to zero within fixed time, maintaining closed-loop stability.

Figure 9A:
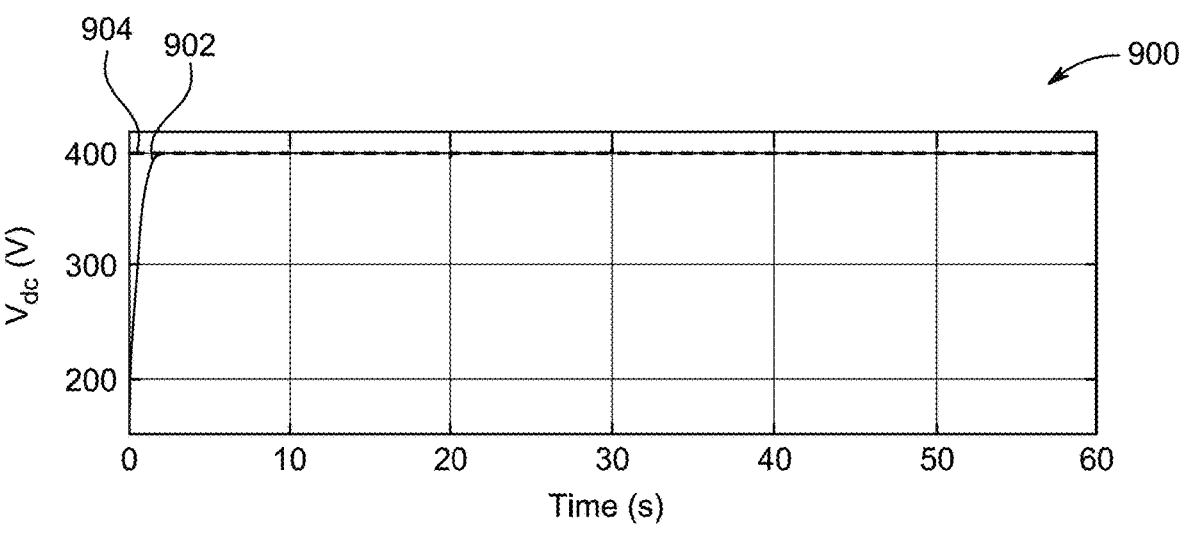
FIG. 9A is a graph illustrating the DC bus voltage and fuel cell current response of the hybrid power system when the ultracapacitor voltage is perturbed, according to certain embodiments.

FIG. 9A illustrates simulation results 900 of the hybrid power system when the ultracapacitor voltage Vuc is perturbed. A first curve 902 represents the DC bus voltage $V_{dc}$ and a second curve 904 represents the reference voltage of 400 V. The simulation results indicate that when the ultracapacitor voltage changes, the DC bus voltage Vdc deviates slightly below the reference voltage for a short duration. This deviation occurs because ultracapacitors are highly sensitive to voltage fluctuations due to their rapid charge and discharge behavior. Despite this, the proposed controller restores the DC bus voltage close to the reference value, while the fuel cell current $i_{fc}$ compensates dynamically to maintain system balance.

Figure 9B:
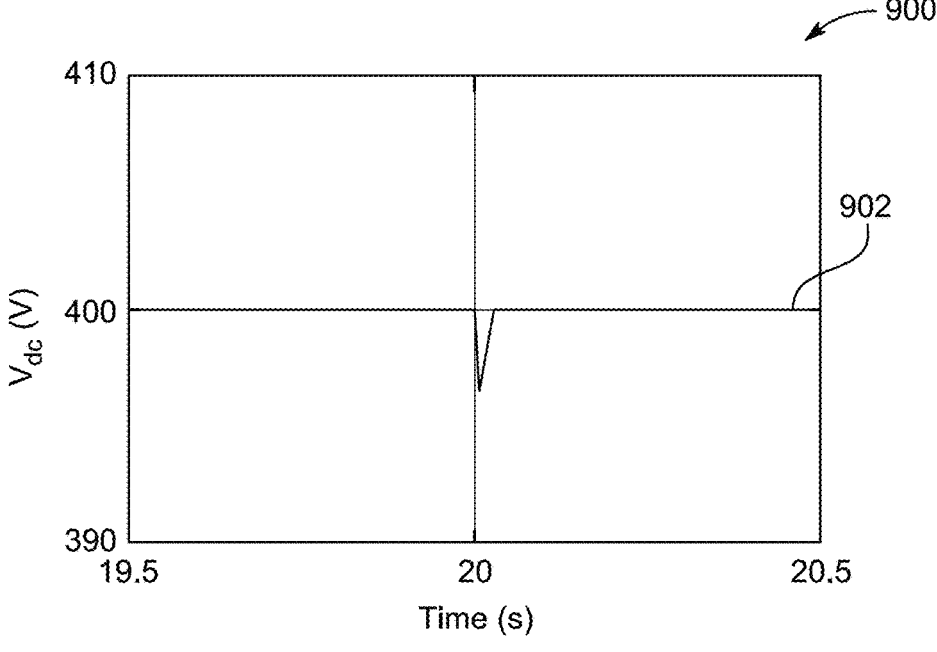
FIG. 9B is an enlarged view of the DC bus voltage waveform of FIG. 9A, highlighting transient deviation under ultracapacitor fluctuations, according to certain embodiments.

FIG. 9B illustrates an enlarged section of the DC bus voltage Vdc 902 shown in the simulation results 900 of FIG. 9A. The zoomed region highlights the deviation of the bus voltage from the reference voltage 904, confirming the transient sensitivity caused by ultracapacitor voltage fluctuations.

Figure 9C:
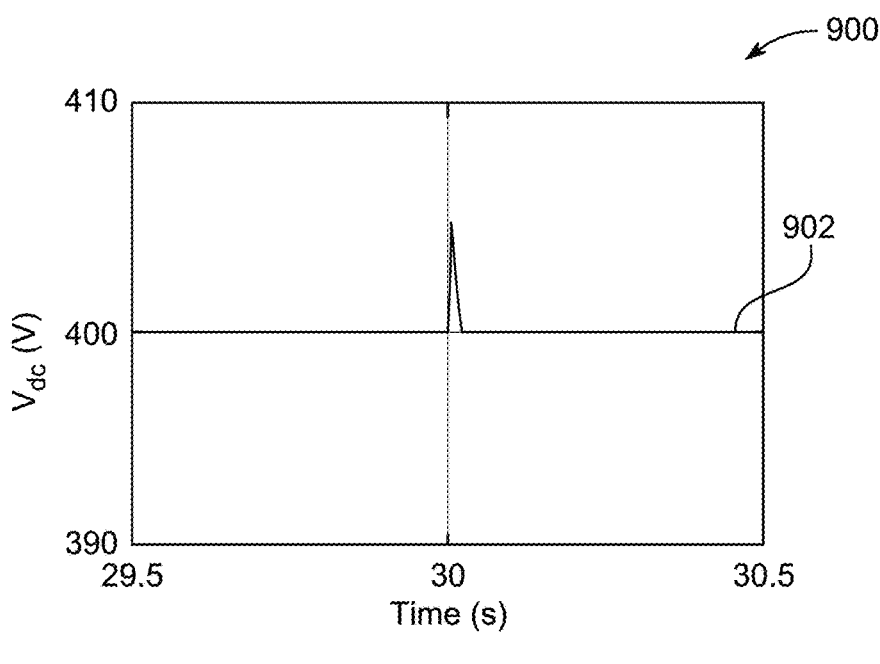
FIG. 9C is a further enlarged view of the DC bus voltage waveform of FIG. 9A, emphasizing restoration toward the reference voltage, according to certain embodiments.

FIG. 9C illustrates a further enlarged section of the DC bus voltage Vdc 902 from the simulation results 900 of FIG. 9A, emphasizing the transient response and the rapid corrective action of the proposed control strategy to restore the bus voltage close to the reference value.

Figure 9D:
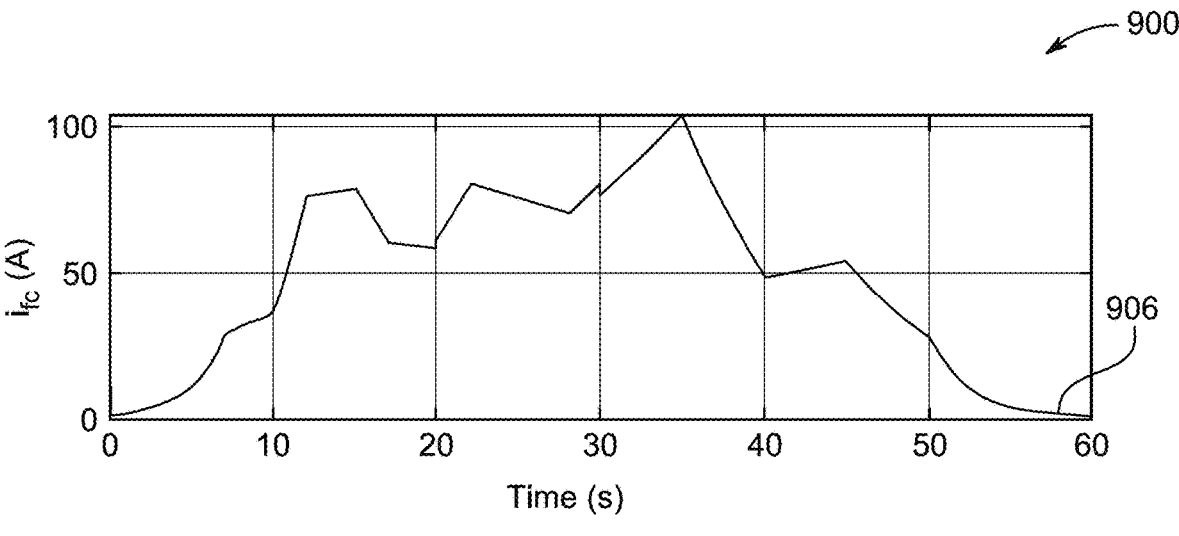
FIG. 9D is a graph illustrating the fuel cell current response corresponding to FIG. 9A, according to certain embodiments.

FIG. 9D illustrates the fuel cell current $i_{fc}$ corresponding to the simulation results 900 of FIG. 9A. The waveform 906 demonstrates that the fuel cell current dynamically adjusts to counteract disturbances from ultracapacitor voltage variations, ensuring continuity of power supply and balance within the hybrid power system.

Figure 9E:
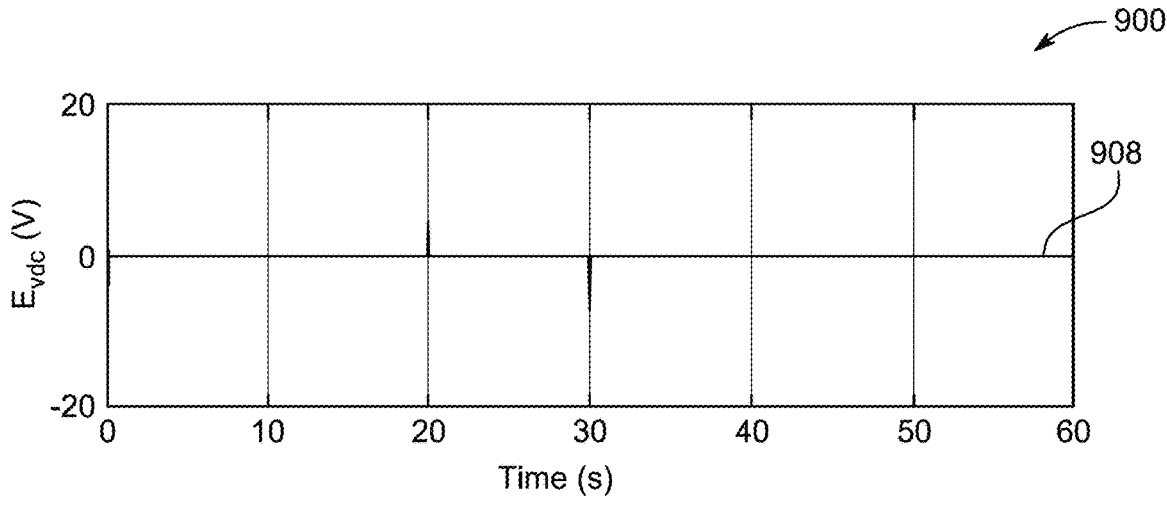
FIG. 9E is a graph illustrating the error in the DC bus voltage when the ultracapacitor voltage is perturbed, according to certain embodiments.

FIG. 9E illustrates error convergence 900 of the DC bus voltage Vdc when the ultracapacitor voltage $V_{uc}$ is varied. Waveform 908 shows the error in the DC bus voltage $V_{dc}$, converging to zero within a bounded fixed time. The results confirm the fixed-time stability property of the proposed controller for voltage regulation.

Figure 9F:
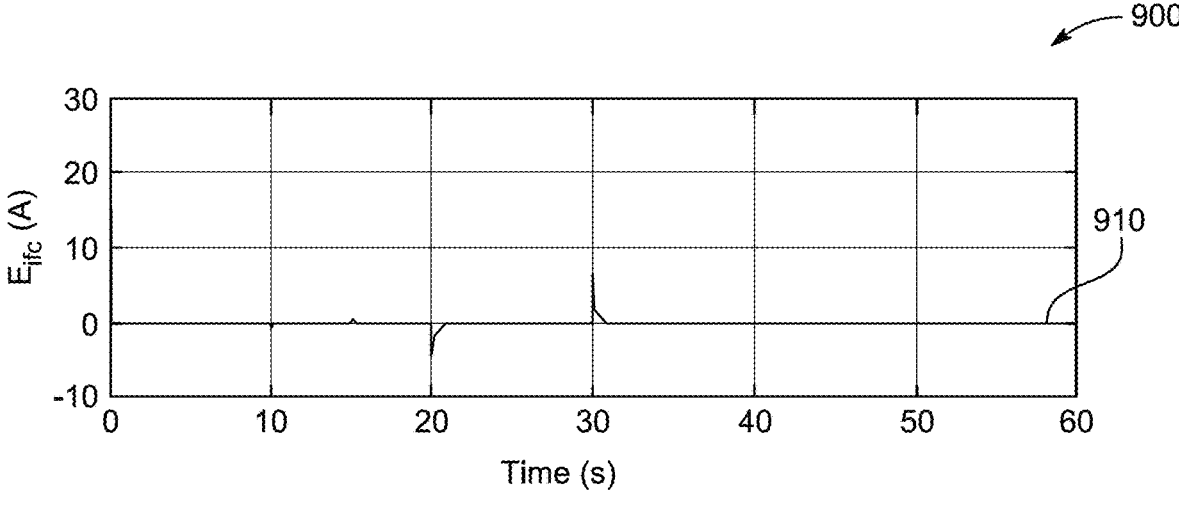
FIG. 9F is a graph illustrating the error in the fuel cell current when the ultracapacitor voltage is perturbed, according to certain embodiments.

FIG. 9F illustrates error convergence 900 of the fuel cell current $i_{fc}$ under ultracapacitor voltage variation. Waveform 910 shows the error in the fuel cell current $i_{fc}$, which converges to zero within a bounded fixed time. The results demonstrate robust current regulation and negligible steady-state error despite rapid ultracapacitor voltage fluctuations.

Converter parameters for simulation were selected from Table I and controller parameters were selected from Table II. Performance indices including convergence speed, steady-state error, and transient deviation were compared against baseline controllers as summarized in Table III. These indices confirm that the proposed fixed-time integral sliding mode controller achieves faster convergence, negligible steady-state error, and superior robustness to disturbances compared to conventional integral sliding mode control.

TABLE I

Parameter values of the converter components

| Parameters | Value | Parameters | Value | Parameters | Value |
|---|---|---|---|---|---|
| $L_1$ | 3.3 mH | $L_2$ | 1.5 mH | $L_3$ | 1.5 mH |
| $R_1$ | 10Ω | $R_2$ | 5Ω | $R_2$ | 5Ω |

TABLE II

Parameter values of the vehicle and controller

| Parameters | Value | Parameters | Value | Parameters | Value |
|---|---|---|---|---|---|
| $p_a$ | 1.225 | $C_x$ | 0.2 | $M_g$ | 1058 |
| $C_r$ | 0.0046 | A | 1.8 | M | |
| $k_1$ | 2000 | $k_2$ | 1500 | σ | 1.05 |

| Control Schemes | DC bus voltage error ($\varepsilon_4$) performance | Current error vector ($\varepsilon$)performance |
|---|---|---|
| 2-9 | ISE IAE ITSE ITAE | ISE IAE ITSE ITAE |
| CASE 1 | Without any voltage variation at the power sources | |

TABLE III

Error Performance

| Control Schemes | DC bus voltage error ($\varepsilon_4$) performance Current error vector (E)performance | | | | | | | |
|---|---|---|---|---|---|---|---|---|
| ISMC [42] | 0.0352 | 0.0655 | 0.0017 | 2.4305 | $2e^{-4}$ | 0.0083 | $4e^{-5}$ | 0.2106 |
| Proposed FXT | 0.0183 | 0.0435 | $8.5703e^{-4}$ | 1.2107 | $1.6535e^{-4}$ | 0.0067 | $2.0216e^{-5}$ | 0.1906 |
| Case 2 | With uncertainties in fuel cell voltage | | | | | | | |
| ISMC [42] | 0.6581 | 3.0326 | 0.7767 | 2.0844 | $1.1986e^{-4}$ | 0.0355 | 0.0027 | 0.8761 |
| Proposed FXT | 0.6140 | 1.8993 | 0.7373 | 1.1229 | $1.8214e^{-4}$ | 0.0068 | $4.7441e^{-4}$ | 0.1951 |
| Case 3 | With uncertainties in battery voltage | | | | | | | |
| ISMC [42] | 0.0058 | 0.1926 | 0.0266 | 5.7361 | $1.3430e^{-4}$ | 0.0057 | $2.9004e^{-5}$ | 0.1605 |
| Proposed FxT ISMC | 0.0184 | 0.0438 | 0.0035 | 1.2182 | $1.2536e^{-4}$ | 0.0067 | $2.0455e^{-5}$ | 0.1905 |
| Case 4 | With uncertainties in UC voltage | | | | | | | |
| ISMC [42] | 0.0109 | 0.3887 | 0.1543 | 10.8252 | $8.0201e^{-4}$ | 0.0270 | 0.0017 | 0.6943 |
| Proposed FXT ISMC | 0.0183 | 0.0435 | $8.5702e^{-4}$ | 6.2107 | $1.6535e^{-4}$ | 0.0067 | $2.0216e^{-4}$ | 0.1906 |

[42] A. U. Rahman, I. Ahmad, and A. S. Malik, "Variable structure-based control of fuel cell-supercapacitor battery based hybrid electric vehicle," Journal of Energy Storage, vol. 29, p. 101365, 2020, incorporated herein by reference in its entirety.

Figure 10:
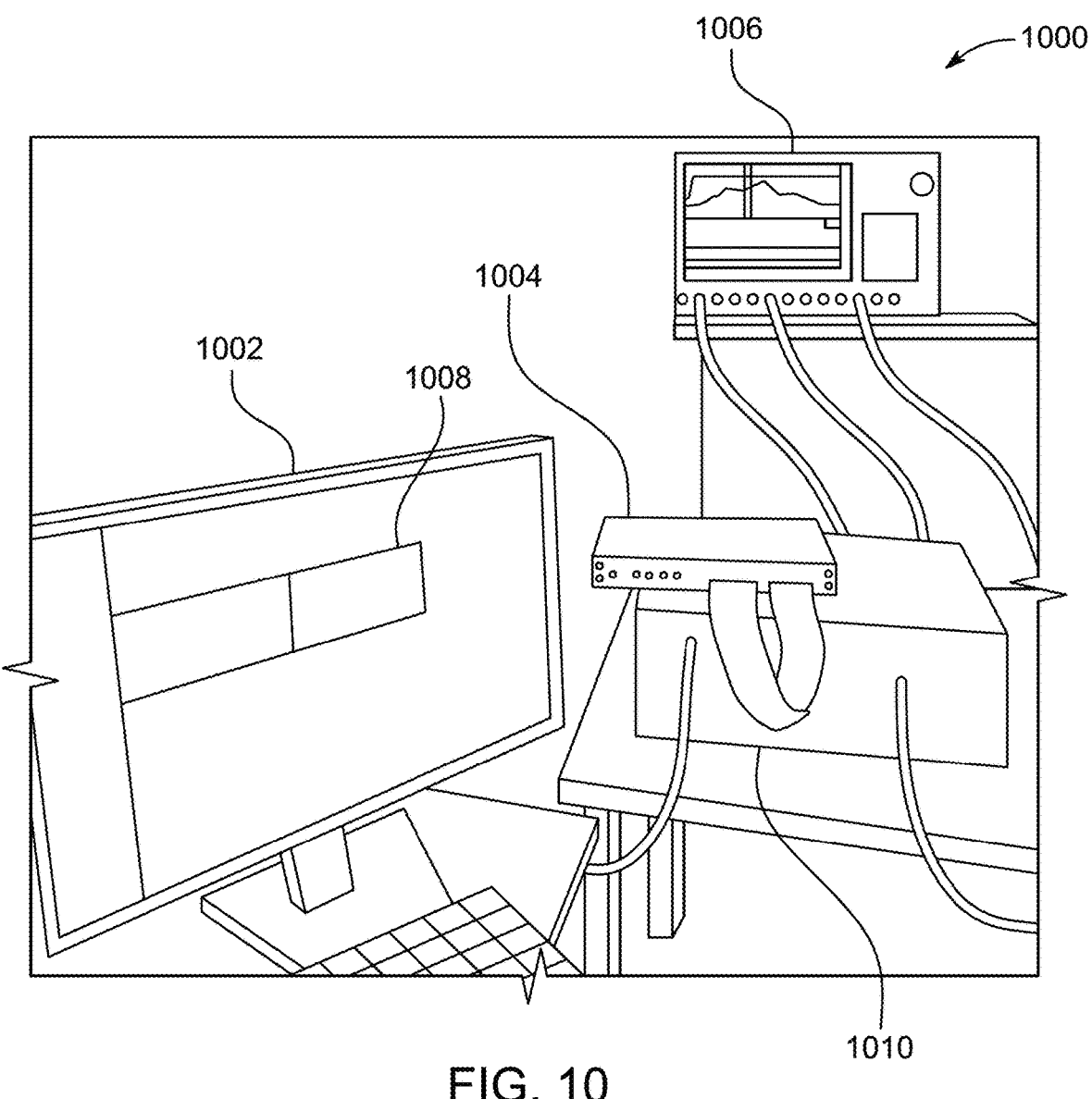
FIG. 10 is a hardware-in-the-loop experimental setup in accordance with an exemplary aspect of the disclosure.

FIG. 10 illustrates a real-time hardware-in-the-loop (HIL) setup 1000 configured for experimental validation of the hybrid power system (HPS) control strategy in a fuel cell electric vehicle. The setup 1000 comprises a computer 1002 operably configured with dSPACE ControlDesk 1008 software for real-time monitoring, visualization, and supervisory control of the test system. The computer 1002 communicates with a PE-RCB DSP controller box 1004 that executes the fixed-time integral sliding mode control (FxT ISMC) algorithm. The controller box 1004 includes a digital signal processor (DSP) board, such as the Texas Instruments F28379D, that generates pulse width modulation (PWM) duty cycles in accordance with the control inputs determined by the proposed control law. The DSP controller box 1004 is interconnected with a dSPACE SCALEXIO 1010 real-time simulator that models the nonlinear dynamics of the fuel cell, the bidirectional buck-boost converters interfacing the battery and ultracapacitor, and the unidirectional boost converter interfacing the fuel cell. The SCALEXIO 1010 platform simulates the plant in real-time, providing feedback of state variables including fuel cell current, battery current, ultracapacitor current, and DC bus voltage to the DSP controller box 1004. A digital oscilloscope 1006 is integrated into the HIL setup 1000 to capture transient responses of the DC bus voltage and source currents under disturbance conditions, thereby validating the real-time dynamic behavior of the HPS and the robustness of the proposed controller. The coordinated operation of the computer 1002, the DSP controller 1004, the dSPACE SCALEXIO simulator 1010, and the oscilloscope 1006 enables real-time emulation of FCEV conditions for verifying the control strategy against source voltage perturbations and load variations.

Figure 11A:
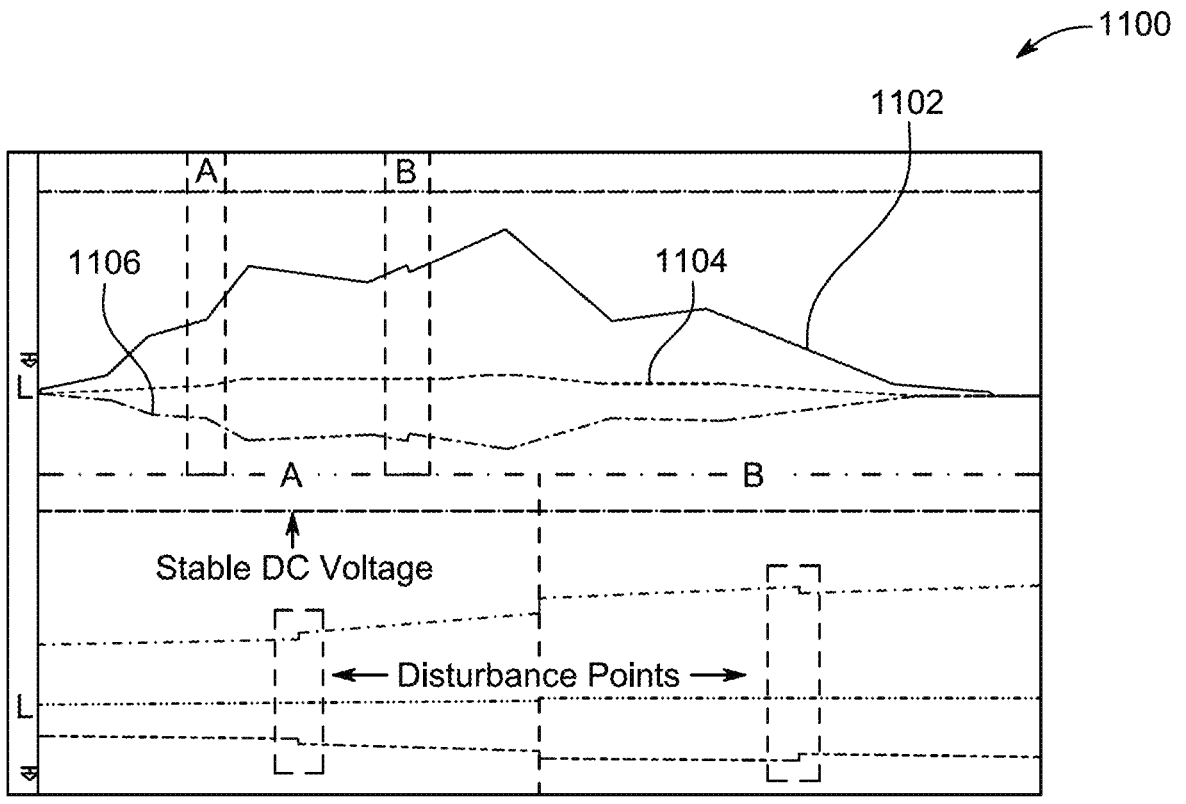
FIG. 11A is a graph of experimental results under fuel cell voltage perturbation in accordance with an exemplary aspect of the disclosure.

FIG. 11A illustrates experimental waveform results 1100 of DC bus voltage 1102, fuel cell current 1104, battery current 1106, and ultracapacitor current under changes in the fuel cell voltage. The results 1100 demonstrate that, despite disturbances introduced at points A and B, the DC bus voltage 1102 remains stable at its reference value of 400 V, confirming the ability of the proposed controller to regulate the bus voltage while coordinating power contributions among the fuel cell, battery, and ultracapacitor.

Figure 11B:
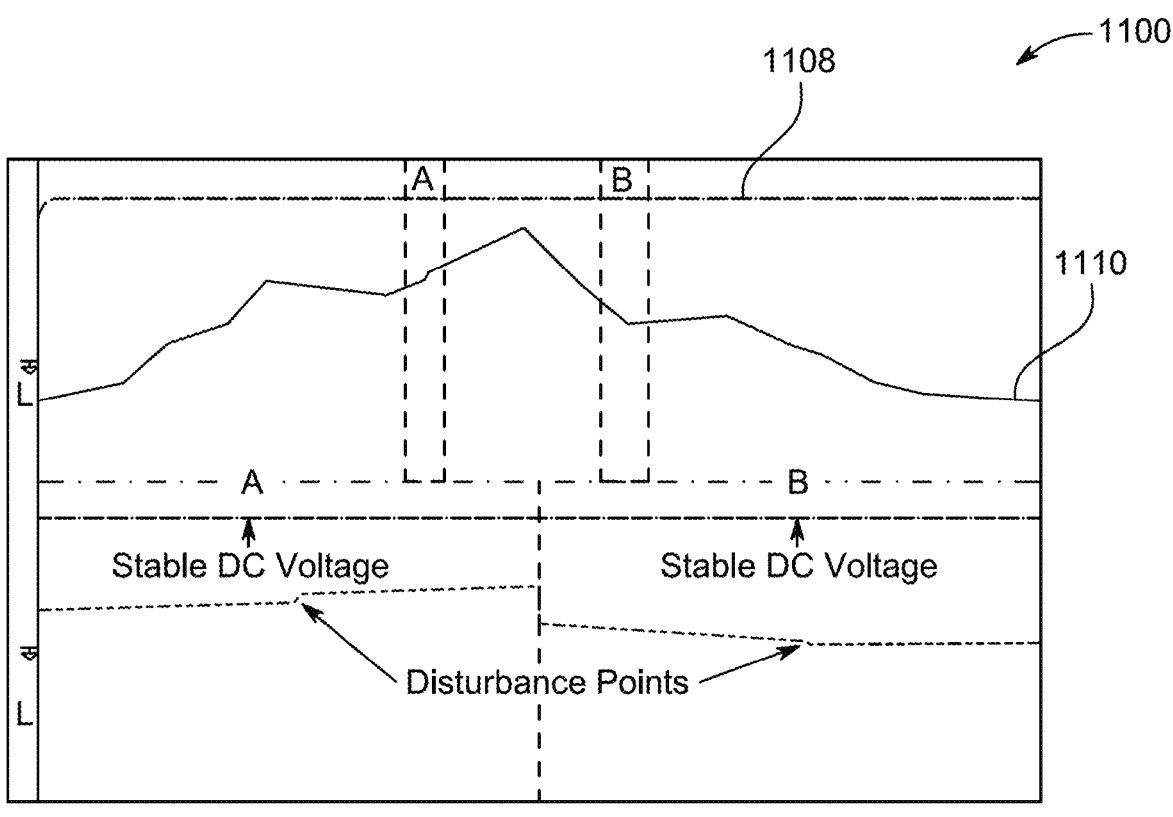
FIG. 11B is a graph of experimental results under battery voltage perturbation in accordance with an exemplary aspect of the disclosure.

FIG. 11B illustrates the experimental results 1100 of DC bus voltage 1108 and fuel cell current 1110 under changes in the battery voltage. Disturbance points are introduced at locations A and B, simulating deviations in the input battery voltage. The results confirm that the DC bus voltage 1108 is maintained at 400 V with negligible transient fluctuations, while the fuel cell current 1110 dynamically adjusts to compensate for the variation in the battery voltage, thereby ensuring stability of the HPS.

Figure 11C:
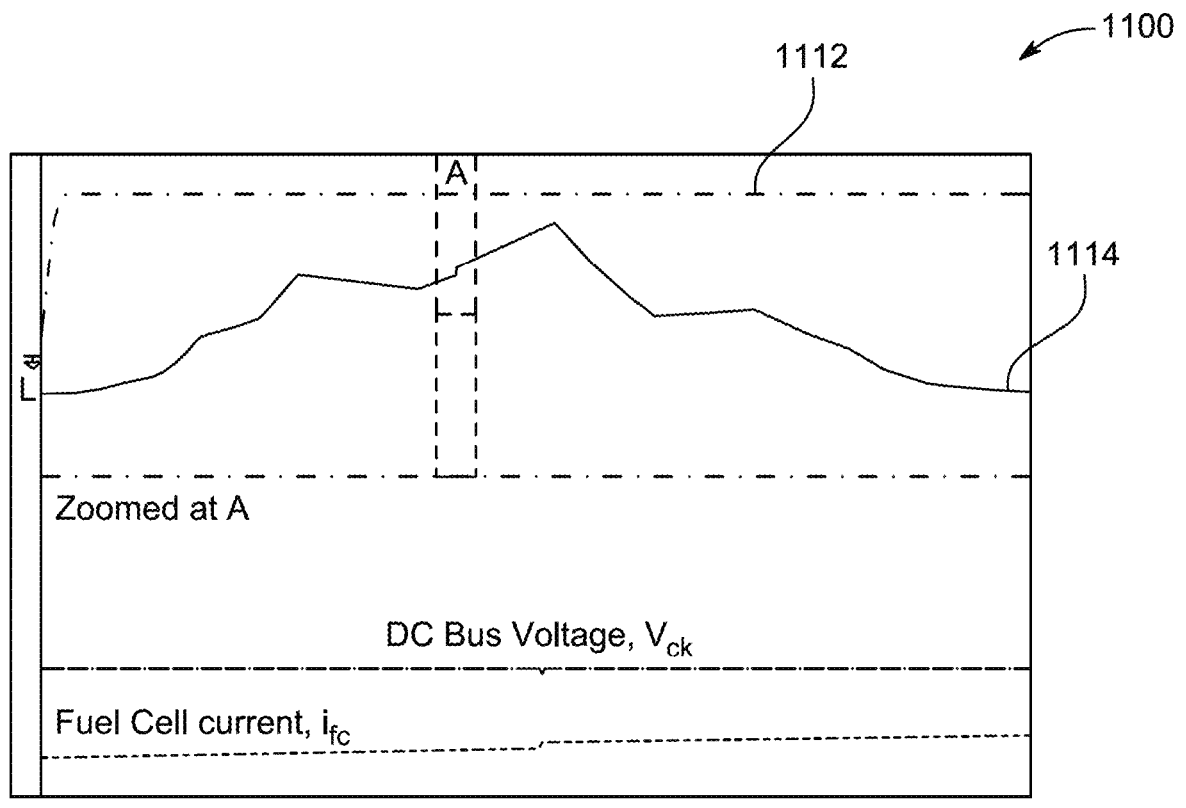
FIG. 11C is a graph of experimental results under ultracapacitor voltage perturbation in accordance with an exemplary aspect of the disclosure.

FIG. 11C illustrates the experimental waveform results 1100 of DC bus voltage 1112 and fuel cell current 1114 under changes in the ultracapacitor voltage. At disturbance point A, a deviation is applied to the ultracapacitor voltage, but the DC bus voltage 1112 is maintained within close bounds of the 400 V reference. The fuel cell current 1114 adapts in response to the change, thereby confirming that the proposed FxT ISMC scheme achieves robustness in maintaining DC bus stability and source current regulation even under ultracapacitor voltage fluctuations.

The experimental results 1100 validate the real-time performance of the proposed fixed-time integral sliding mode control strategy when applied to the hybrid powertrain of a fuel cell electric vehicle. The plant design incorporates a unidirectional boost converter for the fuel cell, as well as bidirectional buck-boost converters for the ultracapacitor and the battery. The controller is implemented on a PE-RCB DSP board (F28379D), and the plant is simulated in real-time using a dSPACE system, enabling hardware-in-the-loop implementation. The dSPACE SCALEXIO platform is utilized for real-time execution of the plant model, while dSPACE ControlDesk provides the monitoring and data acquisition interface. A digital oscilloscope is employed to capture the dynamic responses of the hybrid powertrain.

The experiments are conducted under multiple disturbance scenarios, including variations in fuel cell voltage, ultracapacitor voltage, and battery voltage. The results demonstrate the ability of the proposed controller to regulate the DC bus voltage to a stable reference of 400 V. In particular, when the fuel cell voltage is perturbed from 120 V to 110 V and then restored from 110 V to 120 V at two distinct instants A and B, the DC bus voltage remains stable at the 400 V reference. Similarly, changes in the battery voltage between 48 V and 55 V and variations in ultracapacitor voltage from 290 V to 320 V highlight the disturbance points and their impact on system stability. Despite such perturbations, the proposed controller achieves rapid convergence to the reference DC bus voltage, minimizes transient fluctuations, and maintains negligible steady-state error. The experimental outcomes are consistent with the simulation studies and analytical results, thereby confirming the robustness and effectiveness of the proposed control strategy in mitigating uncertainties in the hybrid powertrain.

The present disclosure introduces a fixed-time integral sliding mode control strategy for managing the hybrid powertrain of a fuel cell electric vehicle, with emphasis on addressing model uncertainties and input fluctuations in both voltage and current. The examined uncertainties include variations in fuel cell voltage from 120 V to 108 V, ultracapacitor voltage variations with a baseline of 290 V experiencing a 12.5% increase, and battery voltage changes from 48 V to 52 V, representing an 8.3% increase. A comprehensive dynamic model of the fuel cell, unidirectional boost converter, and bidirectional converters for the ultracapacitor and battery is developed to accurately capture hybrid power system behavior.

By utilizing the fixed-time integral sliding mode control scheme, the proposed method effectively regulates the DC-link voltage at a constant 400 V, ensures accurate tracking of source currents, and maintains closed-loop stability across a wide range of operating conditions. Both MATLAB-based simulations and hardware-in-the-loop validation using the dSPACE platform confirm that the proposed controller sustains voltage stability in the presence of multiple uncertainties. The results further underscore the roles of the ultracapacitor and battery in augmenting the performance of the fuel cell, thereby improving energy sharing and dynamic response. The methodology therefore demonstrates significant promise for enhancing stability, robustness, efficiency, and overall real-world performance of fuel cell electric vehicles.

Figure 12:
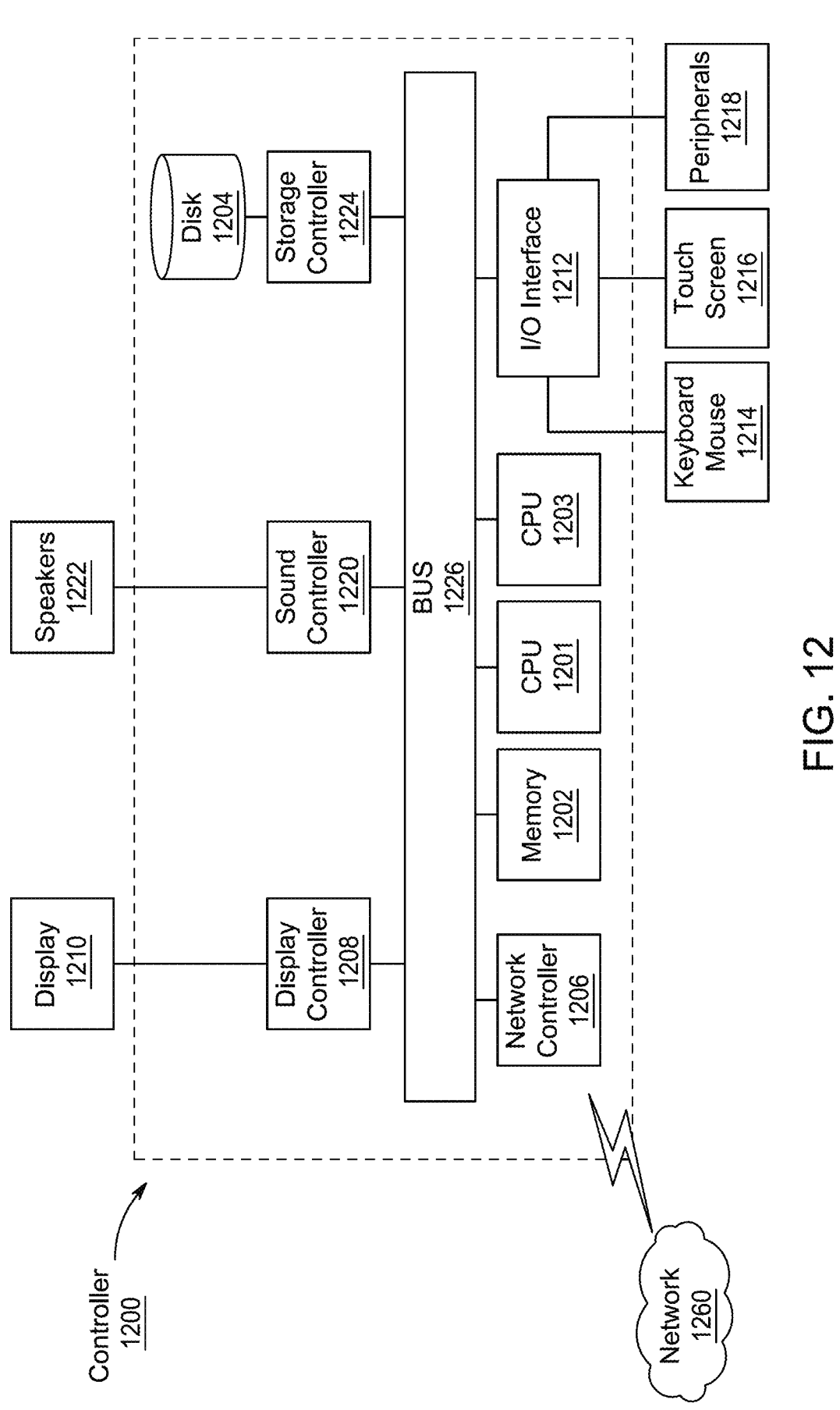
FIG. 12 is an illustration of a non-limiting example of details of computing hardware used in the computing system, according to certain embodiments.

Next, further details of the hardware description of the computing environment according to exemplary embodiments is described with reference to FIG. 12. In FIG. 12, a controller 1200 is described is representative of the system 100 of FIG. 1 in which the controller is a computing device which includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1201, 1203 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1208, such as a NVIDIA Geforce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
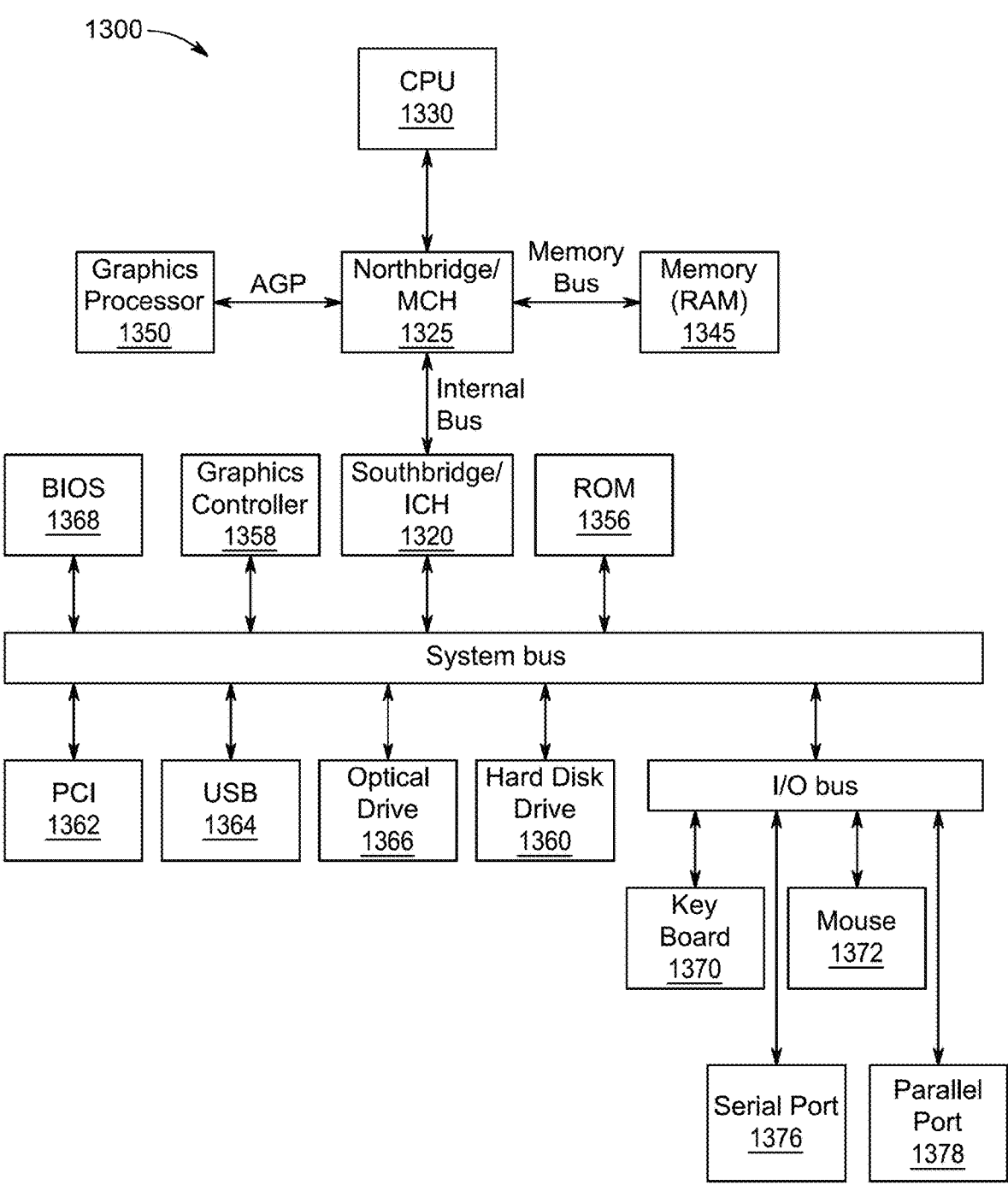
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
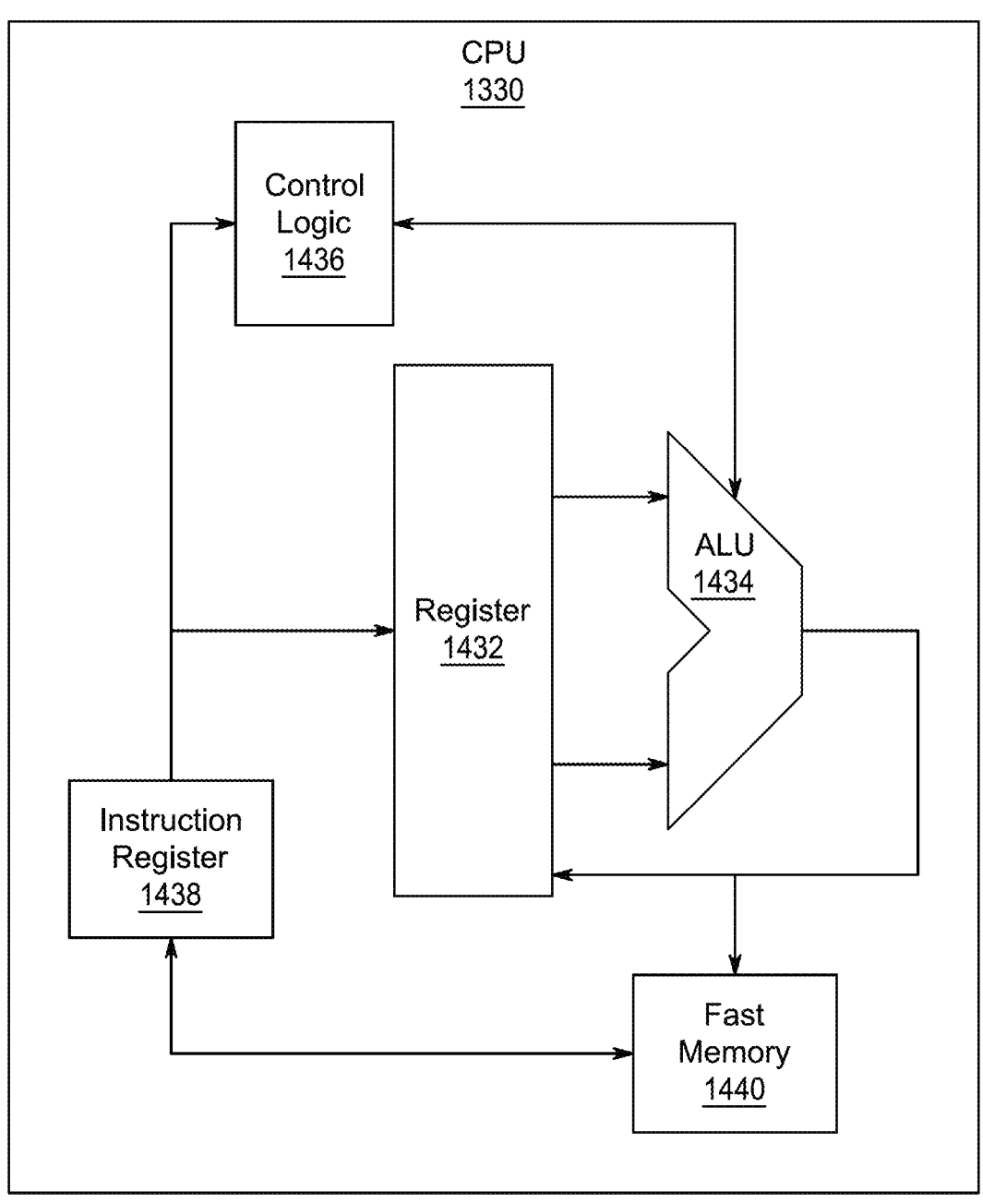
FIG. 14 is an exemplary schematic diagram of a processor used with the computing system, according to certain embodiments.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1388 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 15:
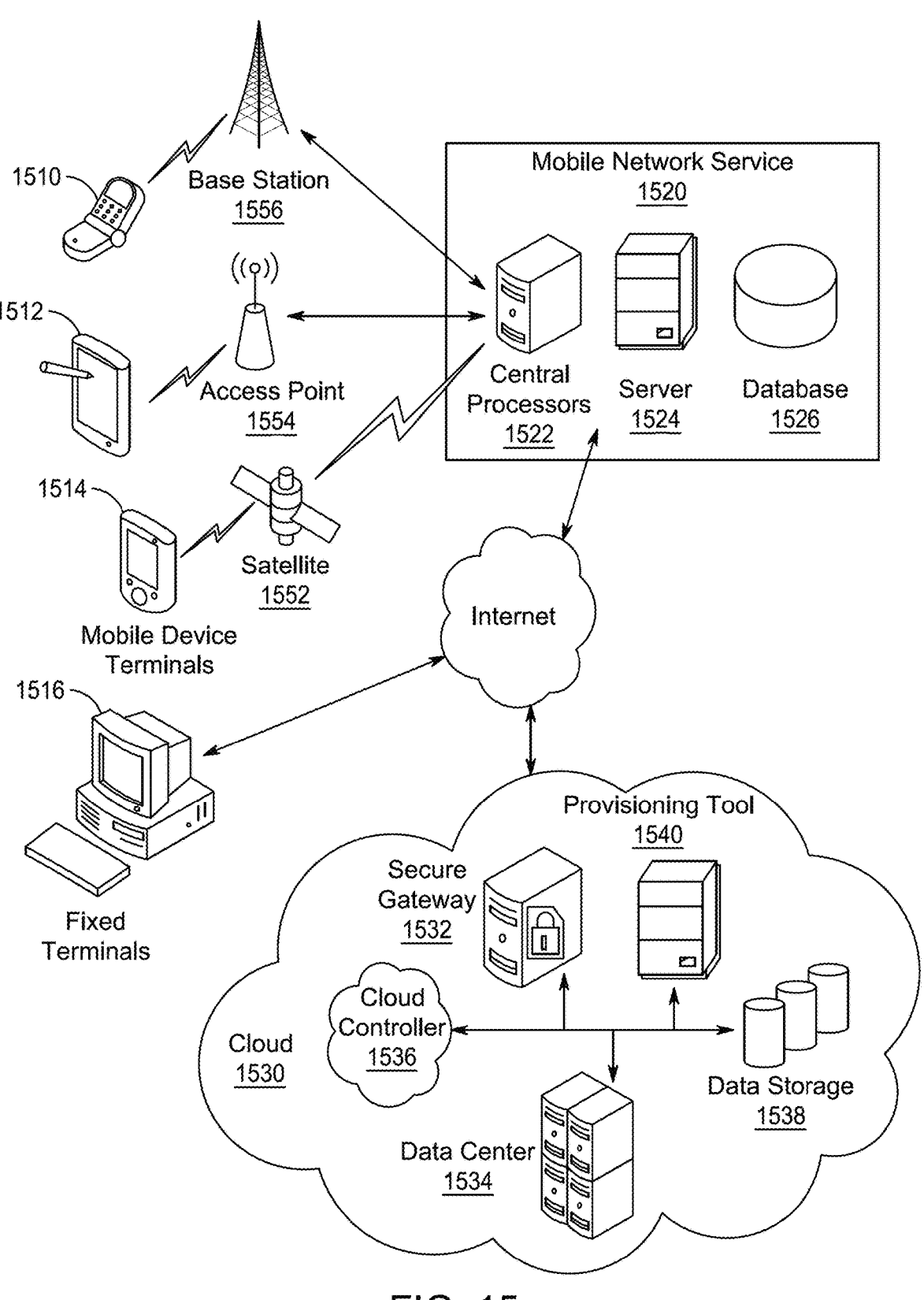
FIG. 15 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 15, in addition to various human interface and communication devices (e.g., display monitors, smart phones, tablets, personal digital assistants (PDAs)). More specifically, FIG. 15 illustrates client devices including a smart phone 1531, a tablet 1532, a mobile device terminal 1534 and fixed terminals 1536. These client devices may be commutatively coupled with a mobile network service 1540 via a base station 1556, an access point 1554, a satellite 1552 or via an internet connection. The mobile network service 1540 may comprise central processors 1542, a server 1544 and a database 1546. The fixed terminals 1536 and the mobile network service 1540 may be commutatively coupled via an internet connection to functions in cloud 1550 that may comprise a security gateway 1552, a data center 1554, a cloud controller 1556, a data storage 1558 and a provisioning tool 1560. The network may be a 5 private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method for controlling a hybrid power system comprising a plurality of energy sources, comprising:

obtaining, by at least one processor, a plurality of state variables associated with the hybrid power system;

determining a reference value for each of the plurality of state variables;

computing an error vector comprising a difference between each of the plurality of state variables and the corresponding reference value;

generating an integral sliding surface using the error vector;

determining, based on the integral sliding surface and a system model of the hybrid power system, at least one control input for respective power converters associated with the plurality of energy sources to cause each of the plurality of state variables to converge to the corresponding reference value within a fixed time independent of an initial state of the hybrid power system; and applying the at least one control input to the respective power converters to control distribution of energy from the plurality of energy sources to the hybrid power system.

2. The method of claim 1, wherein the obtaining comprises obtaining the plurality of state variables associated with the plurality of energy sources including a fuel cell, a battery, and an ultracapacitor coupled to a DC bus via the respective power converters.

3. The method of claim 2, wherein the obtaining comprises obtaining the plurality of state variables comprising a fuel cell current, a battery current, an ultracapacitor current and a DC bus voltage.

4. The method of claim 2, further comprising:

determining the at least one control input for each of the respective power converters by computing the at least one control input for the respective power converters including a unidirectional boost converter of the fuel cell and one or more bi-directional converters of the battery and the ultracapacitor.

5. The method of claim 1, further comprising:

computing the error vector by computing a fuel cell current error, a battery current error, an ultracapacitor current error and a DC bus voltage error.

6. The method of claim 1, further comprising:

generating the integral sliding surface by calculating a linear combination of the error vector and an integral of a nonlinear function of the error vector.

7. The method of claim 1, further comprising:

generating the integral sliding surface using the error vector comprises using an equation:

$$S = C_0\varepsilon + \int_0^t (C_1\lfloor\varepsilon\rceil^{\beta_1} + C_2\lfloor\varepsilon\rceil^{\beta_2})d\tau$$

where ($S$) is the integral sliding surface, $C_0$, $C_1$, $C_2$ are positive constants and a value of $\beta_1$ is between 0 and 1 and $\beta_2$ is between 1 and 2.

8. The method of claim 1, further comprising:

determining the at least one control input for each of the respective power converters by computing the at least one control input using an inverse dynamics technique with Lyapunov stability analysis to cause convergence of the plurality of state variables to the respective reference values within the fixed time.

9. The method of claim 1, further comprising updating the respective reference values in real-time based on a reference values or an operating condition of a fuel cell electric vehicle with the hybrid power system.

10. The method of claim 1, wherein applying the at least one control input comprises applying pulse-width modulation (PWM) duty cycle signals to the respective power converters.

11. A method for control of a hybrid power system comprising a plurality of energy sources in a fuel cell electric vehicle (FCEV), the plurality of energy sources comprising a fuel cell, a battery and an ultracapacitor, each coupled to a DC bus via a respective power controller, the method comprising:

obtaining a plurality of state variables associated with the hybrid power system using at least one processor, the plurality of state variables comprising a fuel cell current, a battery current, an ultracapacitor current and a DC bus voltage;

determining a reference value for each of the plurality of state variables;

computing an error vector comprising a difference between each of the state variables and the corresponding reference value, the error vector comprises a fuel cell current error, a battery current error, an ultracapacitor current error and a DC bus voltage error;

generating an integral sliding surface using the error vector;

determining, based on the integral sliding surface and a system model of the hybrid power system, at least one control input for each of the respective power converters associated with the plurality of energy sources to cause each of the plurality of state variables to converge to the corresponding reference value within a fixed time independent of an initial state of the hybrid power system; and applying the at least one control input to the respective power converters to independently control a distribution of energy from the plurality of energy sources to the hybrid power system and to maintain a stable DC bus voltage at the reference value.

12. The method of claim 11, wherein generating the integral sliding surface comprises calculating a linear combination of the error vector and an integral of a nonlinear function of the error vector using an equation:

$$S = C_0\varepsilon + \int_0^t (C_1\lfloor\varepsilon\rceil^{\beta_1} + C_2\lfloor\varepsilon\rceil^{\beta_2})d\tau$$

where ($S$) is the integral sliding surface $C_0$, $C_1$, $C_2$ are positive constants and a value of $\beta_1$ is between 0 and 1 and $\beta_2$ is between 1 and 2.

13. The method of claim 11, wherein determining the at least one control input for each of the respective power converters comprises computing the at least one control input using an inverse dynamics technique with Lyapunov stability analysis to cause convergence of the plurality of state variables to the respective reference values within the fixed time.

14. A hybrid power system for a fuel cell electric vehicle (FCEV) comprising:

a plurality of energy sources;
   a plurality of measurement devices configured to measure a plurality of state variables of the plurality of energy sources;
   at least one processor configured to:
   determine a reference value for each of the state variables;
   compute an error vector comprising a difference between each of the state variables and the corresponding reference value;
   generate an integral sliding surface based on the error vector;
   determine, based on the integral sliding surface and a system model of the hybrid power system, at least one control input for respective power converters associated with the plurality of energy sources to cause each of the plurality of state variables to converge to the corresponding reference value within a fixed time independent of an initial state of the hybrid power system; and
   apply the at least one control input to the respective power converters to control distribution of energy from the plurality of energy sources to the hybrid power system.

15. The hybrid power system of claim 14, wherein the plurality of state variables associated with the plurality of energy sources including a fuel cell, a battery and an ultracapacitor coupled to a DC bus via the respective power converters, comprises a fuel cell current, a battery current, an ultracapacitor current and a DC bus voltage.

16. The hybrid power system of claim 14, wherein the processor is configured to generate the integral sliding surface as a linear combination of the error vector and an integral of a nonlinear function of the error vector.

17. The hybrid power system of claim 14, wherein the processor is configured to generate the integral sliding surface ($S$) using:

$$S = C_0 \varepsilon + \int_0^t \left( C_1 \lfloor \varepsilon \rceil^{\beta_1} + C_2 \lfloor \varepsilon \rceil^{\beta_2} \right) d\tau$$

where $C_0$, $C_1$, $C_2$ are positive constants and a value of $\beta_1$ is between 0 and 1 and $\beta_2$ is between 1 and 2.

18. The hybrid power system of claim 14, wherein the processor is configured to compute the at least one control input using an inverse dynamics technique with Lyapunov stability analysis to cause convergence of the plurality of state variables to the respective reference values within the fixed time, wherein the at least one control input applied to the respective power converters comprise respective pulse-width modulation (PWM) duty cycle signals.

19. The hybrid power system of claim 14, wherein the respective power converters comprise a unidirectional boost converter for a fuel cell and bi-directional converters for a battery and an ultracapacitor.

20. The hybrid power system of claim 14, wherein the processor is configured to update the reference values in real-time based on a load requirement or an operating condition of the fuel cell electric vehicle.

\* \* \* \* \*